US012272946B2

(12) United States Patent
Nickolson et al.

(10) Patent No.: US 12,272,946 B2
(45) Date of Patent: *Apr. 8, 2025

(54) HAZARDOUS ENERGY CONTROL SYSTEM

(71) Applicant: AUTOLOTO, INC., Traverse City, MI (US)

(72) Inventors: Kenneth David Nickolson, Derry, NH (US); Daniel Lawrance Furbush, Herndon, VA (US)

(73) Assignee: AUTOLOTO, INC., Traverse City, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/520,844

(22) Filed: Nov. 28, 2023

(65) Prior Publication Data
US 2024/0097487 A1    Mar. 21, 2024

Related U.S. Application Data

(63) Continuation of application No. 17/684,625, filed on Mar. 2, 2022, now Pat. No. 11,876,372, which is a continuation-in-part of application No. 16/868,621, filed on May 7, 2020, now Pat. No. 11,455,851.

(60) Provisional application No. 62/895,169, filed on Sep. 3, 2019.

(51) Int. Cl.
*H02J 13/00*   (2006.01)
(52) U.S. Cl.
CPC .... *H02J 13/0004* (2020.01); *H02J 13/00001* (2020.01); *H02J 13/00028* (2020.01)

(58) Field of Classification Search
CPC .............. H02J 13/0004; H02J 13/00028
USPC .................................................. 700/292
See application file for complete search history.

(56) References Cited

U.S. PATENT DOCUMENTS

| 2009/0140856 | A1* | 6/2009 | George | G07C 9/00896 340/542 |
| 2009/0241615 | A1* | 10/2009 | Hansknecht | E05B 47/0676 70/224 |
| 2020/0339064 | A1* | 10/2020 | Gengler | G07C 9/00571 |
| 2023/0140092 | A1* | 5/2023 | Moore | G09F 21/06 40/583 |

* cited by examiner

*Primary Examiner* — Allyson N Trail
(74) *Attorney, Agent, or Firm* — Jonathan B. Soike; BrownWinick Law Firm

(57) ABSTRACT

A hazardous energy control system is presented. The system includes a back-end system and a personal electronic device communicatively connected to the back-end system. The personal electronic device provides a user interface for a user to select a set of equipment from the pieces equipment at the worksite for electrical isolation from hazardous energy sources via lockout/tagout (LOTO). The back-end system is configured to dynamically the back-end system is configured to dynamically determine a LOTO procedure for electrical isolation of the set of equipment from the hazardous energy sources based on the electrical node data set indicating pieces of equipment, energy isolation devices (EIDs), and electrical connections between the pieces of equipment and EIDs on a worksite.

20 Claims, 71 Drawing Sheets

FIG. 29

HAZARDOUS ENERGY CONTROL SYSTEM

CROSS REFERENCE TO RELATED APPLICATION

This application is a continuation of U.S. patent application Ser. No. 17/684,625 filed on Mar. 2, 2022, titled "HAZARDOUS ENERGY CONTROL SYSTEM" and published as Pub. No. US 2022/0255,347, which is a continuation-in-part of U.S. patent application Ser. No. 16/868,621 filed on May 7, 2020, titled "HAZARDOUS ENERGY CONTROL SYSTEM" and issued as U.S. Pat. No. 11/455,851 on Sep. 27, 2022, which claims the benefit of U.S. Provisional Application No. 62/895,169 filed on Sep. 3, 2019, the contents of each of which is hereby incorporated by reference in their entirety.

FIELD OF THE DISCLOSURE

The present disclosure generally relates to systems for managing access to hazardous energy sources and more particularly to lock-out-tag-out systems.

OVERVIEW

Commercial and industrial settings often have equipment requiring maintenance that may expose workers to many forms of hazardous energy, such as from electrical, mechanical, pneumatic, hydraulic, and others. In order to make equipment safe to work on, the equipment must be disconnected from all energy sources to place the equipment in isolation.

Presently, there exist safety procedures used in industry and research settings to ensure that dangerous energy sources have been properly shut down and are incapable of being started up again prior to the completion of construction, maintenance, or servicing work. The procedures generally require that all hazardous energy sources are identified, isolated, and rendered inoperative to prevent the release of potentially hazardous energy prior to the start of any construction, repair, or maintenance procedures by locking and tagging all energy sources.

Most commonly, safety procedures utilize lockout/tagout (LOTO) processes, which require workers to place locks on energy isolation devices (EIDs) that are switched off in order to isolate a piece of equipment to be serviced. The locks ensure that the energy isolation devices are not accidentally switched on until a worker completes servicing of the equipment and removes their lock from the EID.

Previous systems utilize static pre-defined lock-out-tag-out procedures that are created for each piece of equipment. Such static pre-defined LOTO procedures list all the steps required for a worker to switch off and lock energy isolation devices required to isolate the piece of equipment.

The process to manually create static LOTO procedures is time consuming, and subject to human error. Typically, to create a new LOTO procedure for a single piece of equipment, a trained professional visually traces connections to and from the equipment in project design files (e.g., electrical single line drawings, one-line drawings, electrical architectural drawings, and/or other electrical design schematics, drawings, and/or specifications) electrical one-line drawing), which can be very large and challenging to follow, in order to determine which EIDs 56 must be switched off in order to isolate the equipment.

This review and determination must be performed for each piece of equipment in order to create the required LOTO procedure. As projects often include large numbers of individual pieces of equipment, creating LOTO procedures can take a significant amount of time. Furthermore, when a system is modified or retrofitted, existing lockout tagout procedures must be reviewed to ensure that the procedures were not affected by the modification/retrofit. Manually updating electrical project design files to reflect current status of energy sources and updating LOTO procedures is also time consuming and subject to human error.

Static pre-defined LOTO procedures are also overly time consuming to perform in the field. For example, when a worker must isolate multiple pieces of equipment, an EID 46 may be listed in two or more LOTO process. In order to compete each such LOTO process, a unique lock must be placed on the shared EID 46 for each of the LOTO processes to be performed. As a result, multiple unnecessary locks may be placed on the same EID 46. Each unnecessary lock that is placed requires the worker to perform various logging, authorization checks, voltage testing and equipment checks as part of the LOTO process.

As electricity on a job site is the most dangerous and has the highest mortality rate of all construction related injuries, a modernized system that addresses current problems is needed in the industry.

Thus, it is a primary object of the disclosure to provide a system for management of LOTO processes that improves upon the state of the art.

Another object of the disclosure is to provide a system for management of LOTO processes that is safe to use and reduces injuries.

Yet another object of the disclosure is to provide a system for management of LOTO processes that is more accurate and less time consuming.

Another object of the disclosure is to provide a system for management of LOTO processes that improves functionality.

Yet another object of the disclosure is to provide a system for management of LOTO processes that saves time.

Another object of the disclosure is to provide a system for management of LOTO processes that is less error prone.

Yet another object of the disclosure is to provide a system for management of LOTO processes that is easy to use.

Another object of the disclosure is to provide a system for management of LOTO processes that determines LOTO procedures for isolation of a selected set of equipment dynamically on demand based on an electrical node data set.

Yet another object of the disclosure is to provide a system for management of LOTO processes that optimizes determined LOTO procedures to minimize the number of locks required to be placed.

Another object of the disclosure is to provide a system for management of LOTO processes that reduces time required to generate and maintain electrical node data sets for a project.

These and other objects, features, or advantages of the present disclosure will become apparent from the specification, claims and drawings.

SUMMARY

In one or more arrangements, a system for managing access to hazardous energy sources is presented. The system includes a back-end system and a personal electronic device communicatively connected to the back-end system. The back-end system is configured to store an electrical node data set indicating pieces of equipment, energy isolation devices (EIDs), and electrical connections between the pieces of equipment and EIDs on a worksite. The personal electronic device provides a user interface for a user to select a set of equipment from the pieces of equipment at the worksite for electrical isolation from hazardous energy sources. In response to the user selecting the set of equipment, the personal electronic device communicates the selected set of equipment to the back-end system. In one or more arrangements, in response to receiving the selected set of equipment, the back-end system is configured to dynamically determine a LOTO procedure for isolation of the set of equipment from the hazardous energy sources based on the electrical node data set. In one or more arrangements, in response to receiving the selected set of equipment, the back-end system is additionally or alternatively configured to dynamically determine if a LOTO for the selected equipment already exists and, if so, provides an option for a user to join the existing LOTO. The back-end system then causes the personal electronic device to guide the user through LOTO of the set of equipment for the determined LOTO procedure or joined LOTO.

BRIEF DESCRIPTION OF THE DRAWINGS

Figure 29:
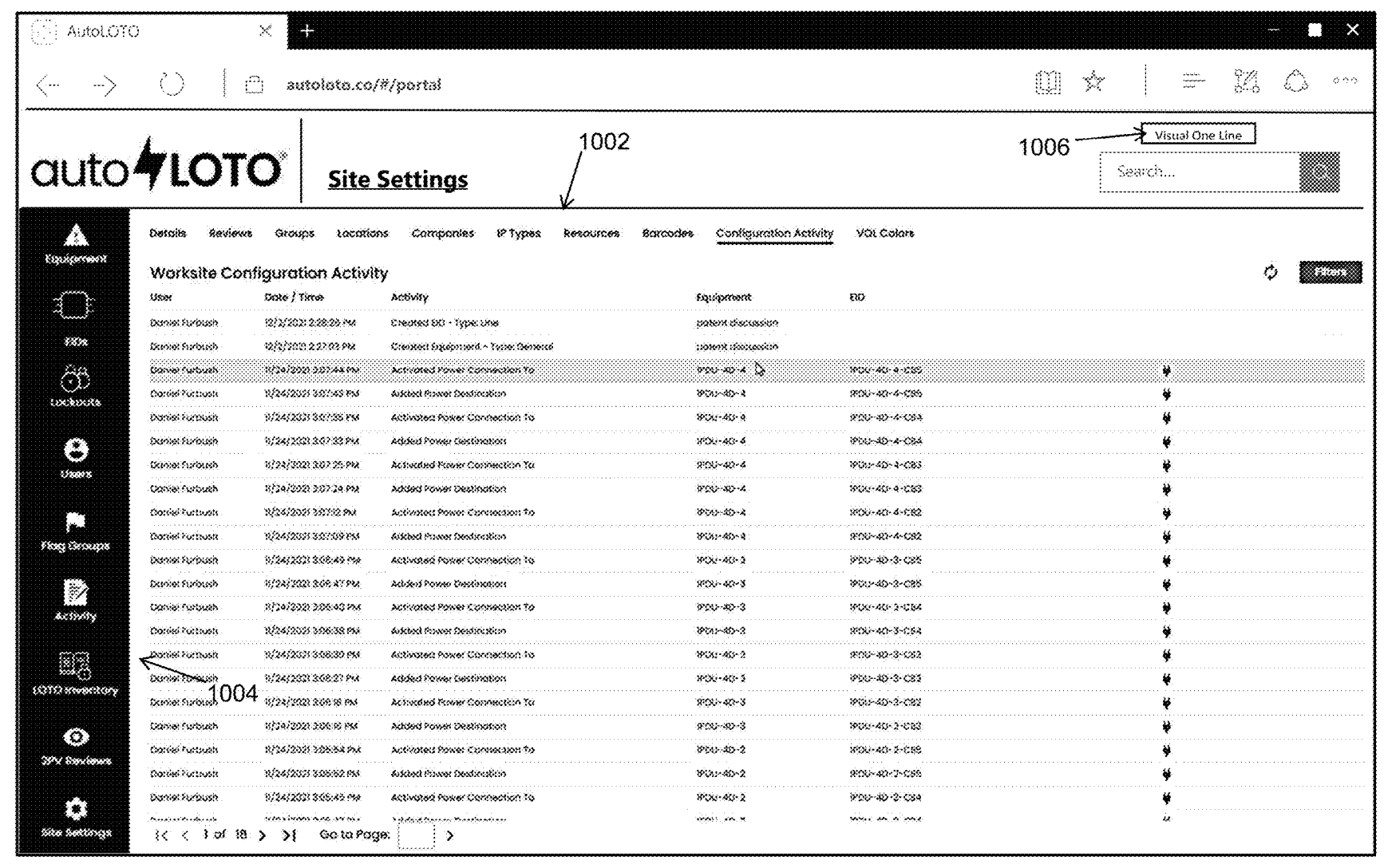

FIG. 29 shows a screen shot view of the interface shown in FIG. 23 the view showing another tab of the interface showing details of the worksite; the tab configured to show a record of configuration activity of the worksite via the management software of the back-end system.

FIG. 68 shows a screen shot view of an example graphical user interface provided by an application on a personal electronic device communicatively connected to a back-end system of the system shown in FIG. 5, in accordance with one or more arrangements; the view showing an interface screen that is presented when a user selects to transfer a LOTO from the interface screen for review and management of a LOTO as is shown in FIG. 62; the interface providing the ability to search for an select user(s) to transfer the LOTO to.

DETAILED DESCRIPTION

Figure 1:
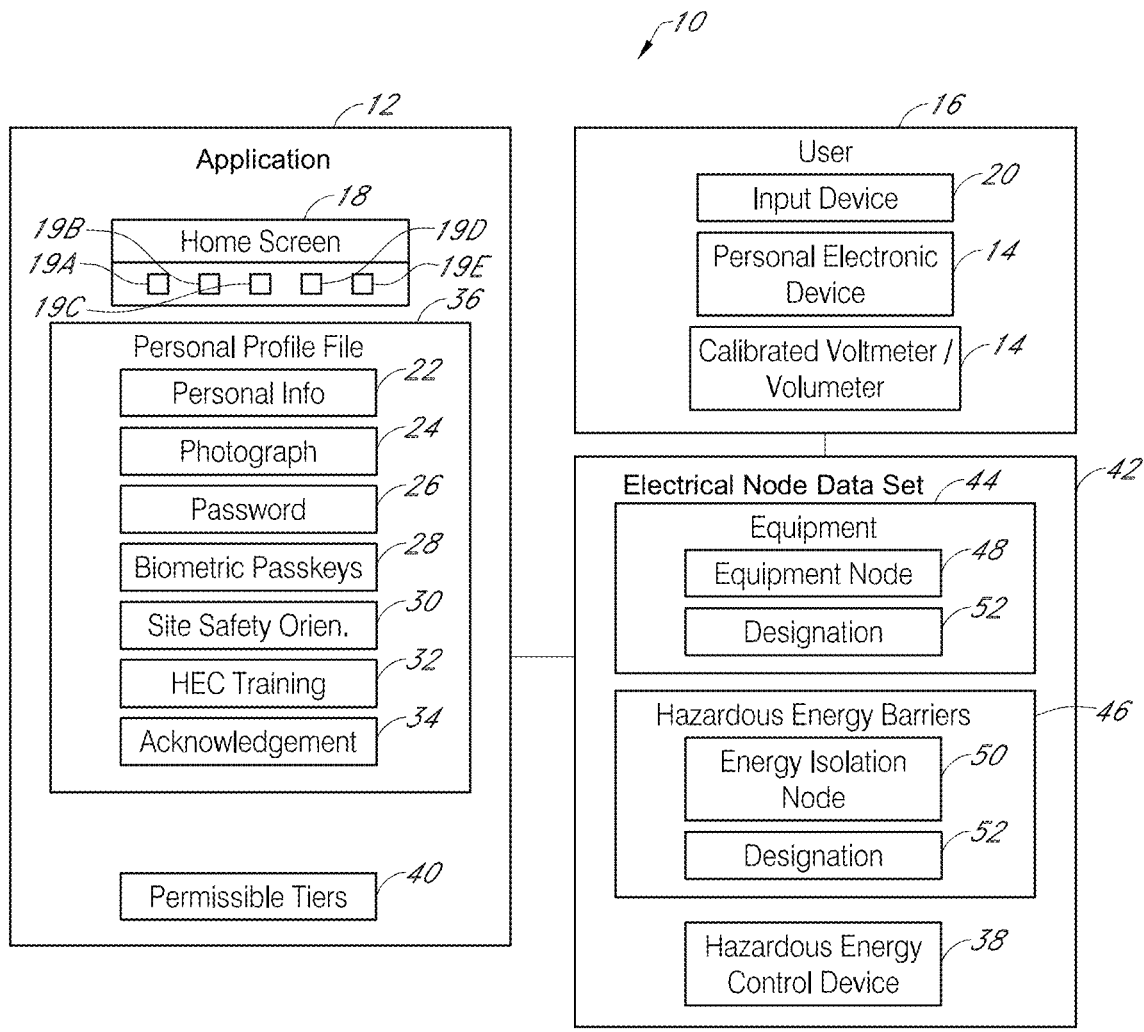
FIG. 1 is a schematic view of a hazardous energy control system, in accordance with one or more arrangements.
Figure 2:
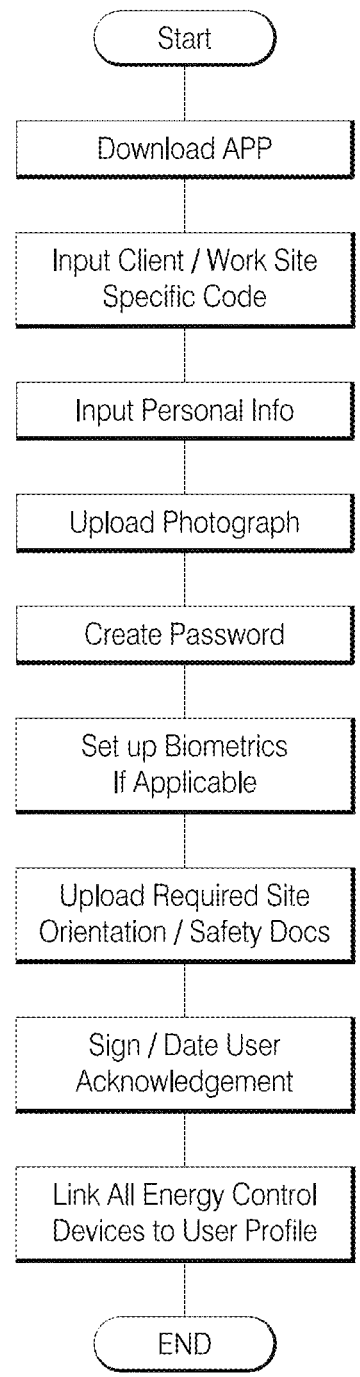
FIG. 2 is a flowchart diagram of a hazardous energy control system, in accordance with one or more arrangements.
Figure 3:
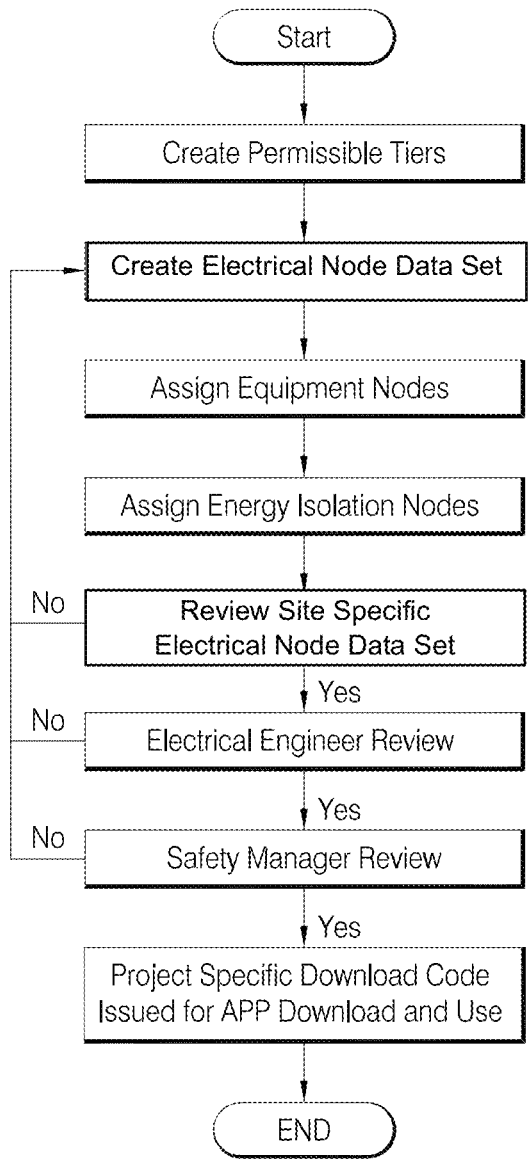
FIG. 3 is a flowchart diagram of a hazardous energy control system, in accordance with one or more arrangements.
Figure 4:
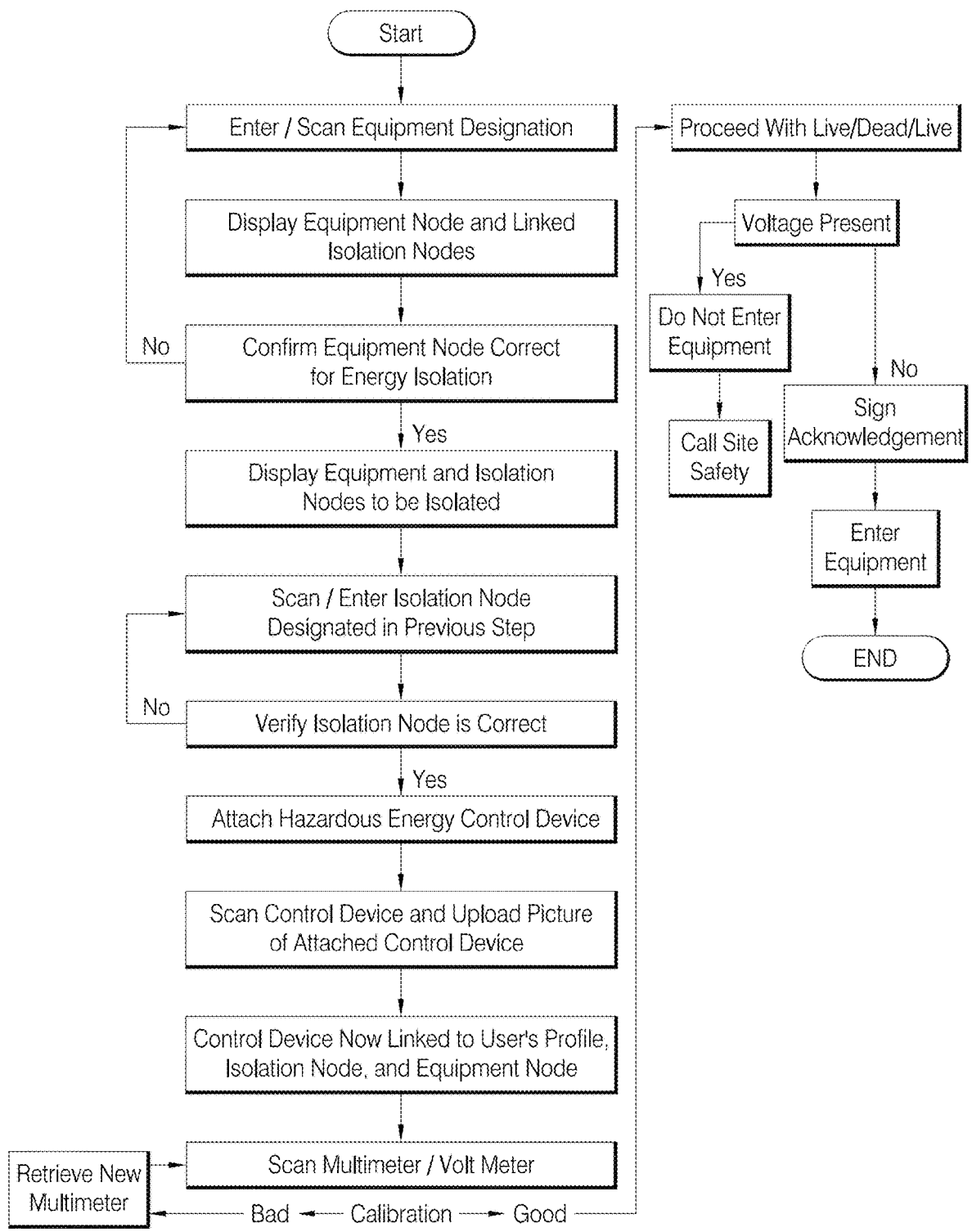
FIG. 4 is a flowchart diagram of a hazardous energy control system, in accordance with one or more arrangements.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the disclosure. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. In the depicted embodiments, like reference numbers refer to like elements throughout the various drawings.

It should be understood that any advantages and/or improvements discussed herein may not be provided by various disclosed embodiments, or implementations thereof. The contemplated embodiments are not so limited and should not be interpreted as being restricted to embodiments which provide such advantages or improvements. Similarly, it should be understood that various embodiments may not address all or any objects of the disclosure or objects of the disclosure that may be described herein. The contemplated embodiments are not so limited and should not be interpreted as being restricted to embodiments which address such objects of the disclosure. Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure.

It is to be understood that the terms such as "left, right, top, bottom, front, back, side, height, length, width, upper, lower, interior, exterior, inner, outer, and the like as may be used herein, merely describe points of reference and do not limit the present disclosure to any particular orientation or configuration.

As used herein, "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously introduced and not, while definite articles like "the" refer to a same previously introduced term; as such, it is understood that "a" or "an" modify items that are permitted to be previously introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof, unless expressly indicated otherwise. For example, if an embodiment of a system is described at comprising an article, it is understood the system is not limited to a single instance of the article unless expressly indicated otherwise, even if elsewhere another embodiment of the system is described as comprising a plurality of articles.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively", such as when used as "operatively connected" or "operatively engaged" is to be interpreted as connected or engaged, respectively, in any manner that facilitates operation, which may include being directly connected, indirectly connected, electronically connected, wirelessly connected or connected by any other manner, method or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments or methods.

Similarly, the structures and operations discussed herein may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

As used herein, various disclosed embodiments may be primarily described in the context of applications using lock-out-tag-out procedures. However, the embodiments are not so limited. It is appreciated that the embodiments may be adapted for use in other applications and/or systems, which may be improved by the disclosed structures, arrangements and/or methods. The system is merely shown and described in the context of applications using lock-out-tag-out procedures for ease of description and as one of countless examples.

Referring to the Figures, a hazardous energy control system 10 has a web-based or local application 12 adapted to be downloaded to a personal electronic device 14 such as a mobile phone, computer, mobile tablet, or the like. To download the application, a user 16 gives the application permission for the application 12 to use the devices 14 capabilities. The application has a home page 18 with a plurality of buttons that include a scan function 19A, a lockout review tab 19B, a personalized worksite activity tab 19C, and equipment tracking tab 19D, and a unique user profile tab 19E. The user 16 is then prompted to input personal information 20 via the user profile tab 19E on the home page 18. The personal information 20 is of any type and includes the user's 16 name, work phone number, personal phone number, work e-mail, current employer, direct report/supervisor/manager, company safety representative and the like.

Next, the user 16 is prompted by the application 12 to take or upload a head shot photograph 24 of the user 16 preferably without head gear or glasses, unless glasses are always worn. The user 16 is then prompted by the application 12 to create a password 26 and apply any additional biometric passkeys 28 supported by the device 14.

The user 16 is also prompted by the application 12 to upload the user's site safety orientation certification 30 and hazardous energy control training 32. The application 12 will then prompt the user 16 to electronically sign and date an acknowledgement 34 that they have completed all site safety orientation, including lock out tag out and hazardous energy control training.

All this information, the personal information 22, the photograph 24, the password 26 and biometric passkeys 28, safety orientation certification 30, hazardous energy control training 32, and training acknowledgement 34 are stored in a personal profile file 36 created by the application 12. The personal profile 36 is completed when the user 16, prompted by the application 12, links specific hazardous energy control devices 56 to the user's personal profile file 36. The hazardous energy control devices 56 include, but are not limited to, personal life and safety locks, lock boxes, equipment control locks, proprietary electronic life and safety locks specific to the application 12, calibrated electrical equipment such as multimeters and voltmeters 108, and additional training certification required to access permissible tiers 40.

Permissible tiers 40 are created by the application 12 to permit different access to the system 10. For example, a tradesman would be provided lowest access such as individual lockout/tagout (LOTO) permissions only. For a foreman, additional permissions for control boxes with two-party verification would be granted. Added to these permissions, a general foreman and/or general contractor supervisor would also be given control access lock permissions/energizations. These permissions might also be granted to quality assurance/quality control team, CX-Commissioning, trade partner safety managers and/or general contractor safety managers. Lock removal permissions would be added to a tier including the overall site safety manager and/or the project administrators.

An electrical node data set 42 (also referred to as energy matrix 42), created from project drawings and documents, is input to, uploaded to, or generated by the system and includes the location of equipment 44 and hazardous energy barriers 46. Each piece of equipment 44 is assigned an equipment node or an identification number (e.g., QR/bar code) 52. Each hazardous energy barrier 46, (i.e. Energy Isolation Device 46 (EID) that includes, but is not limited to, a circuit breaker, valve, or the like and each piece of each piece of equipment 44 is assigned an device code 50 used by the system for tracking and identification. The device codes 50 provide an anchor for the energy matrix 42 between the equipment 44 and energy pathways. Device codes are similarly assigned to locks, lockboxes, voltmeter, and other components used by the system 10.

To initiate a LOTO procedure or view the status of a piece of equipment, the user 16, scans the equipment identification number (e.g., QR/barcode) 52 of the specific piece of equipment 44 using the scan function 19A, enters the identification number 52 placed on the piece of equipment 44, or otherwise identifies the piece of equipment 44 (e.g., using a search, lookup, browsing of other interface on application 12). Once entered, the application 12 displays all line sources of power entering the selected equipment 44, all load sources the selected equipment 44 is powering, and any redundant or parallel power sources that the selected equipment 44 may share with another piece of equipment. The application 12 also displays the status of the selected equipment 44 (i.e., live) preferably in both text and color code (e.g., an icon—Red indicating energy source live/present/on-danger, Yellow indicating energy source off/isolated, and Green indicating safe, proven no hazardous energy present).

When the selected equipment 44 is live and unsafe, the user clicks on the EID 46 on the application 12 screen that controls power entering the selected equipment 44 to determine the type of EID 46, the current status for the EID 46, and whether any locks 38 are currently installed on the EID 46. Also displayed is a link upstream to the piece of equipment 44 the EID 46 received power from. The user 16 then specifies a desire to begin the LOTO process by selecting the type of LOTO the user wishes to initiate (e.g., individual LOTO, group LOTO, or subject matter expert LOTO).

The user 16 then scans or otherwise identifies the piece of equipment 44 that the user 16 wishes to isolate and ultimately enter (e.g., using the scan function 19A or enters the equipment's identification number 52). The application 12, then presents the user 16 with a user acknowledgement page 54. In order to ensure the user's safety, they must acknowledge that they have been trained in Lockout/Tagout, Live Dead Live, NFPA 70E, and OSHA guidelines and regulations. To proceed the user 16 acknowledges he/she has the necessary training for the selected piece of equipment 44 and agrees to the displayed terms.

The application 12 then, having reviewed the electrical one-line drawing for the worksite, automatically determines and displays a preview of the EID(s) 46 that the user 16 will need to hang his/her lock 38 on to render inoperable and be able to safely enter the user's selected piece of equipment 44 after completing LOTO procedures. The application 12, through a display, asks the user 16 if he/she is in the correct position and at the correct EID 46 in order to hang the lock 38 on the EID 46. The user 16 then scans or otherwise identifies the EID that he/she believes to be correct (e.g., using the scan function 19A so scan the isolation code 50 for the EID 46). The application 12 will verify and indicate whether the user 16 has scanned/identified the correct EID 46. If not correct, the user will be instructed to rescan/identify a different EID 46 until the correct EID 46 is identified. The application 12, through an icon that turns a given color, indicates that the correct EID 46 has been located. In one or more arrangements, application 12 may also switch between different icons that are displayed to indicate additional statuses. For example, in one or more arrangements, application changes from an open lock icon to a closed lock icon for lock placements and from a closed lock to an open lock for lockout removals.

The application 12 then prompts the user 16 to scan or otherwise identify the lock 38 that will be hung on the EID 46 to link the user's personal profile 36 to the lock 38 on the selected equipment 44. If the user 16 scans/identifies a lock 38 not linked to his/her personal profile 36, the application 12 will notify the user 16 to select a different lock 38. Once a correct lock 38 is selected and hung on the EID 46, the application 12 prompts the user to take a photograph of the lock to prove to the system that the EID 46 has been locked out satisfactorily and provide documentation of the lock 38 hung at the correct EID 46. At this point the user 16 will have the option to provide comments explaining the need for the lock (i.e. monthly scheduled maintenance, inspection, etc.).

Next, the user 16 must prove that the selected piece of equipment 44 is safe to enter. The application 12 automatically displays a preview of the worksite and displays a preview of the line side(s) of the EID(s) 46 that provide power into the selected piece of equipment 44. The application 12 then prompts and verifies the user 16 to ensure he/she is in the correct position (e.g., by requiring user to scan/identify location, equipment, or EID the user intends to test) to perform a Live Dead Live (LDL) test to prove the selected piece of equipment 44 is electrically safe to enter. The application will also display a status bar that is partially blue to indicate that the user 16 has successfully completed the first half of the LOTO process and has successfully hung his/her lock 38. The process of identifying the correct EID 46 is repeated for the LDL test.

A user 16 may exit in the middle of the LOTO sequence, and the application 12 will return the user to a safe starting point to continue when the user 16 is ready. This is done by returning to the home screen 18 and accessing a lockout tab 19B. This takes the user to a page where he/she may review all active LOTOs. Also, by accessing the personal profile tab 19E, a user can view which locks 38 are in use and which are still available. By clicking on any of the locks 38 in use the user 16 is immediately taken to the selected piece of equipment 44 and the specific EID 46 that the lock 38 is hung on. Also displayed are voltmeters 108 registered to the user profile that indicate whether they are available and within calibration dates or overdue for calibration and not usable on site. The user profile will also include a unique activity log where all actions are tracked to the second and displayed to the minute by the application 12. However, the embodiments are not so limited. Rather, it is contemplated that in some various arrangement, may track activity and/or update status displayed by application 12 at any frequency.

A lockout review page will permit the user to access a page for each LOTO process that denotes the type of lockout completed, the owner of the lockout, the date and time the lockout was started, the date and time the lockout was completed, and the record of the Live Dead Live testing to prove the equipment was free of electrical hazardous energy. For an incomplete LOTO process, the user 16 has the option of abandoning the LOTO process, resuming and picking up where the process was left off or transferring the LOTO process to another user 16 that has adequate permissions.

The locks tab within the lockout details page will indicate which locks 38 are currently in use to complete an ongoing LOTO process. If the user 16 wishes to resume, a confirmation page is displayed to ensure that the user has correctly selected the LOTO process he/she wishes to continue. The application will then orient the user 16 to the correct EID 46 to start his LDL testing. The user 16 repeats the process for identifying the correct EID 46. Once confirmation is obtained that the correct EID 46 has been identified, the application prompts the user 16 to scan or otherwise identifies the voltmeter 108 he/she will use in order to check for the presence of hazardous electrical energy. The user 16 scans/identifies the voltmeter 108 to ensure that the voltmeter 108 has been successfully registered on the worksite and is within the required calibration window. After taking a voltage reading of the selected equipment 44, the application 12 will analyze the voltage reading to determine if the user 16 can continue with each test. If the user 16 records a voltage reading of 0V he/she has not adequately satisfied the requirements and in fact may be testing a live source to prove to himself and the application that his voltmeter 108 is operational. A reading above 50 Volts constitutes a pass for the first Live portion of the Live Dead Live testing procedure. To pass the second Dead portion, a reading of less than 1 Volt must be obtained. Finally, to pass the last Live portion, a reading greater than 50 Volts must be received. Once the LDL test is completed the user 16 may leave a comment. At this point, the application 12 provides confirmation that the user 16 has successfully completed the LOTO process and proved that it is electrically safe to enter the selected equipment 44.

The user 16 can review all active LOTOs from the Lockouts review tab at the bottom of the home screen. From this page the user can select and review all active LOTOs in the worksite that he/she is involved with.

To remove a lock 38, the user 16 engages the lockout tagout tab which leads him/her to the lockout details page where he/she is given the option of removing a lock from the LOTO process. By clicking on a locks tab within the lockout detail page the application 12 will indicate all locks 38 currently in use to complete a present LOTO process. By selecting a remove locks icon a user begins the lock removal process. The application 12 then presents the user 16 with an acknowledgement page that requires the user to read and agree to before being able to remove his/her locks 38 from the LOTO process. The application 12 has kept track of the exact location of the lock for the duration of the LOTO process and upon acknowledgement, provided the user 16 with the exact physical EID location that the lock is currently hanging on. The user 16 then scans or otherwise identifies what is believed to be the correct EID 46. If incorrect, the user 16 will be instructed to retry with a different EID. Once correct, the user 16 is prompted by the application 12 to scan or otherwise identify the lock prior to removal. This permits the lock to be deregistered from the piece of equipment 44 and the specific EID 46 that it was placed on. The lock will then be visible on the application as being available in the user's unique personal profile. If the correct lock is scanned/identified the user 16 has success-fully broken down his/her LOTO process to isolate the selected equipment 44 and his/her lock is returned back into active status in his/her unique personal profile and the status equipment selected in the LOTO will be updated to an unsafe status. This information will also be reflected on the user's activity log.

To view information related to different worksites 42, the user 16 selects the personalized activity tab 19C which provides a listing of each worksite, the company associated with the worksite, the number of pieces of equipment 44 used with the worksite, the number of EIDs 46 used with the worksite and the number of users associated with the work site. Also included is a contact name and phone number and a screen where users can be selected to be given access to the site as well as assigning the users role.

To manage the equipment 44 for a worksite, the user 16 selects the equipment number associated with the worksite and is provided with a list that includes the name of the equipment 44, the location, the barcode, the number of lines, the number of loads, the number in parallel, whether the equipment 44 is passive, and whether the relationship is complete. The same can be done with EIDs 46 and locks 38.

Figure 5:
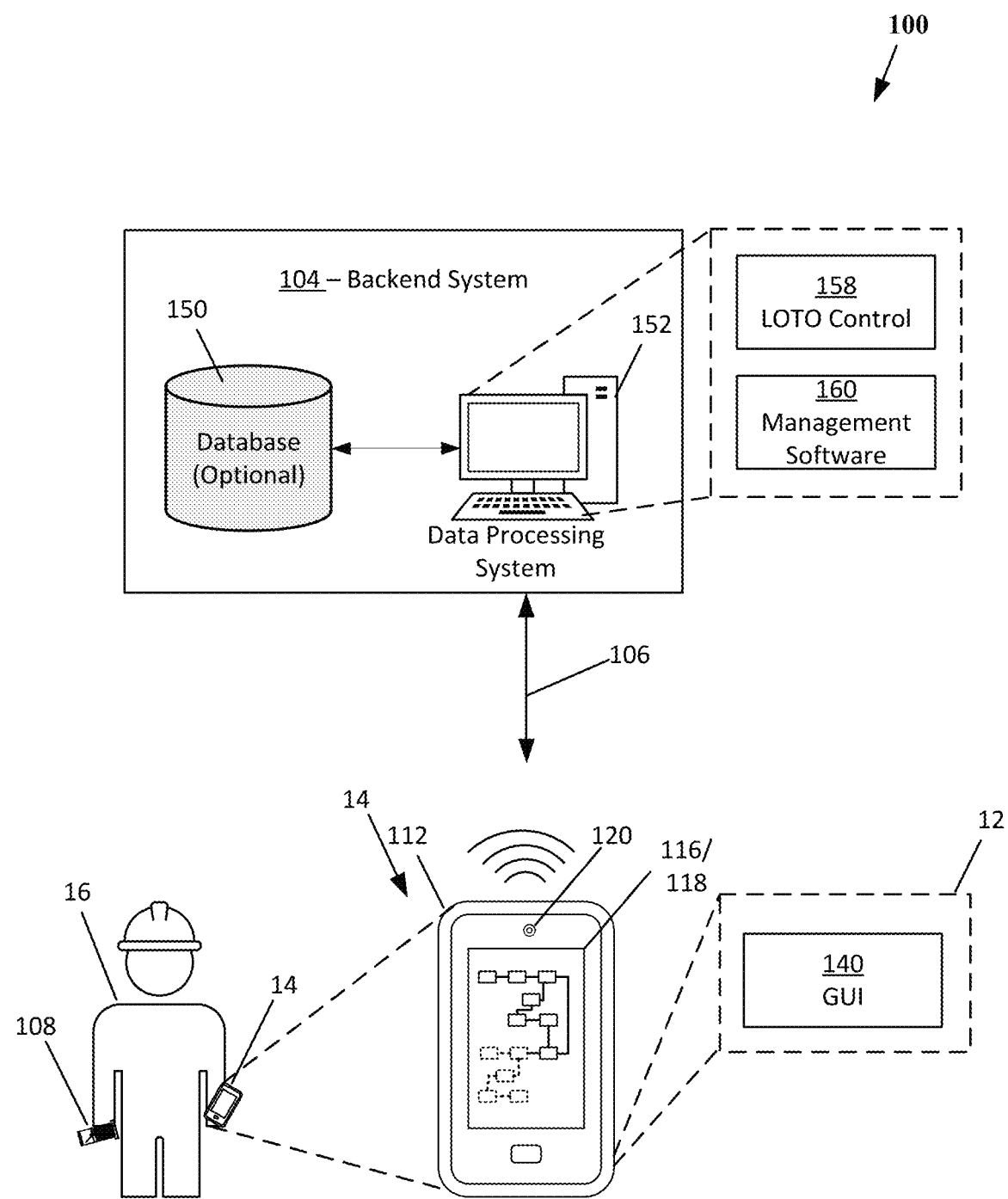
FIG. 5 a schematic view of a hazardous energy control system, in accordance with one or more arrangements; the view showing the system having a back-end system communicatively connected with a personal electronic device.
Figure 6:
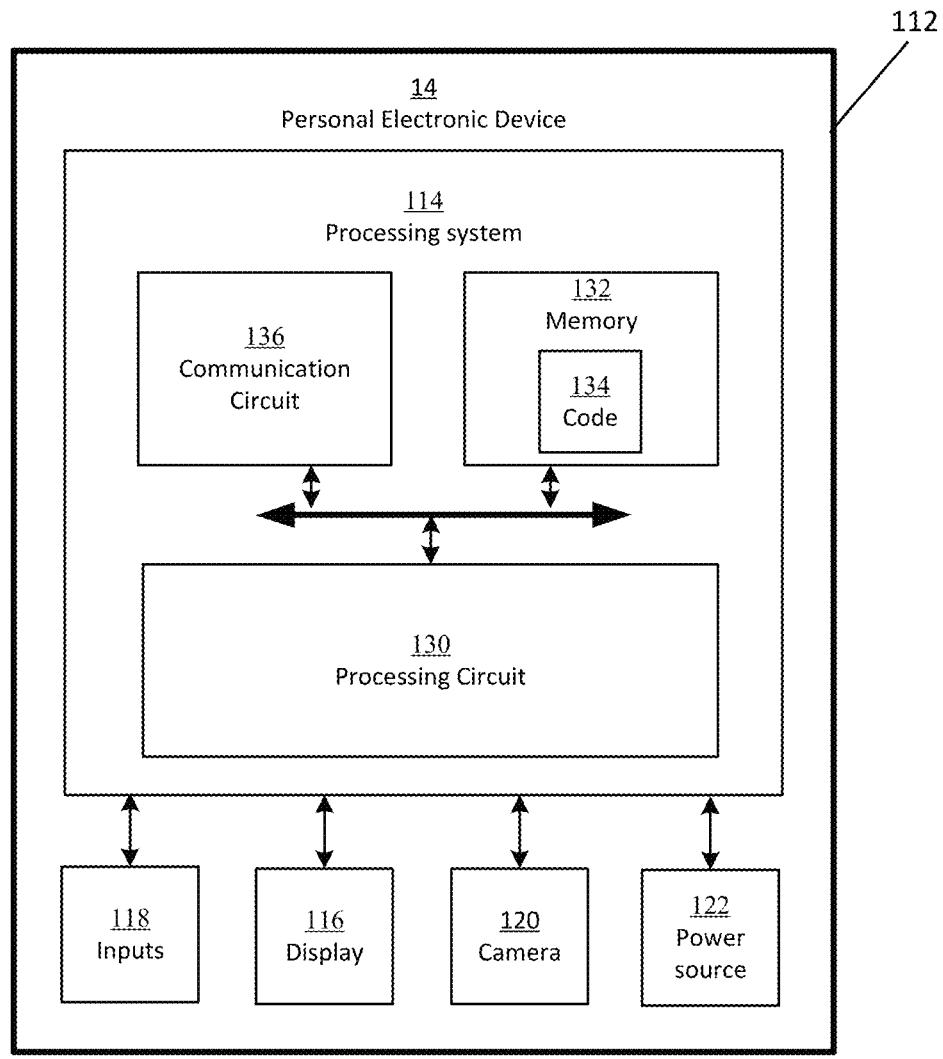
FIG. 6 shows a schematic view of a personal electronic device, in accordance with one or more arrangements.
Figure 71:
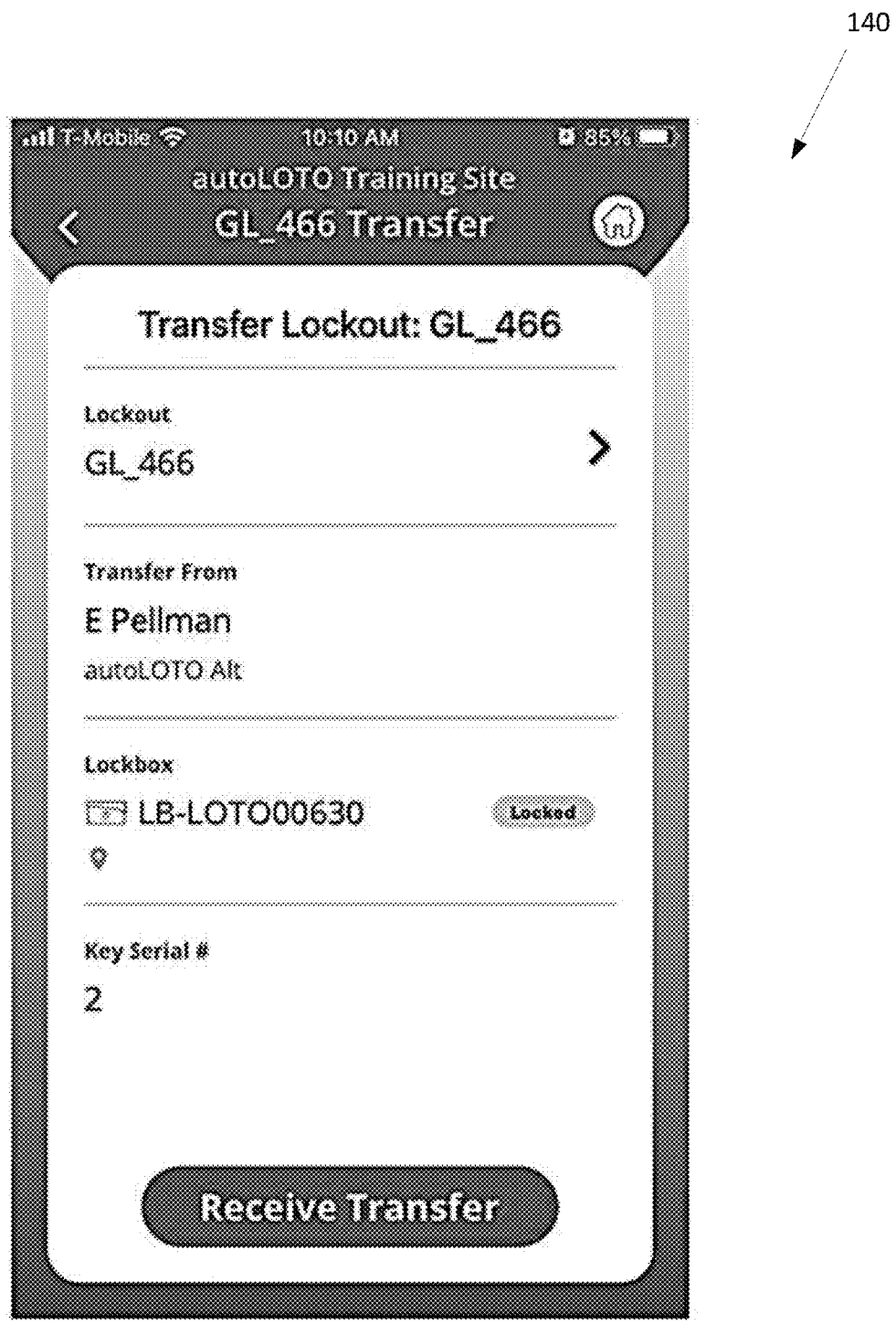
FIG. 71 shows a screen shot view of an example graphical user interface provided by an application on a personal electronic device communicatively connected to a back-end system of the system shown in FIG. 5, in accordance with one or more arrangements; the view showing an interface screen that is presented to a user to whom a LOTO is transferred; the interface providing a button for the user to accept receipt of the LOTO.

Alternative Arrangement:

With reference to FIGS. 5-71, an alternative arrangement(s) of a hazardous energy control system is presented. Aspects of the alternative arrangement(s) presented in FIGS. 5-71 are similar to those of the system 10 presented in FIGS. 1-4 and therefore unless specifically stated otherwise herein, the prior teaching and disclosure shown in FIGS. 1-4 applies equally to the alternative arrangement shown in FIGS. 5-71. That is, the arrangement(s) shown in FIGS. 5-71 is configured to similarly facilitate and manage LOTO procedures performed by a user 16 in the field via a personal electronic device 14 such as a mobile phone, computer, mobile tablet, or the like.

System 100:

With reference to the figures, a hazardous energy control system 100 (or simply system 100) is presented. System 100 is formed of any suitable design, arrangement, and circuitry and is configured to facilitate guided LOTO of equipment 44 to be isolated and facilitate dynamic generation of LOTO procedures for isolation of selected equipment 44.

In one or more arrangements, the system 100 includes one or more personal electronic devices 14 and a back-end system 104 communicatively connected to the personal electronic devices 14 among other components. Personal electronic device(s) 14 and back-end system 104 are communicatively connected over one or more data networks 106.

Personal Electronic Device 14:

In one or more arrangements, system 100 includes a personal electronic device 14. Personal electronic device 14 is formed of any suitable size, shape, design, and/or technology and is configured to provide a user interface to facilitate guided LOTO by a user 16.

In the arrangement shown, as one example, personal electronic device 14 includes a housing 112, a processing system 114, a display 116, inputs 118, a camera 120, and a power source 122, among other components. In the arrangement shown, as one example, personal electronic device 14 is a conventional cell phone, smart phone, tablet, laptop, desktop computer, or the like, however any other form of a device having a display 116 is hereby contemplated for use.

Housing 112:

In the arrangement shown, as one example, personal electronic device 14 includes a housing 112. Housing 112 is formed of any suitable size, shape, and design and is configured provide the exterior shell of personal electronic device 14. In one arrangement shown, as one example, housing 112 is a generally elongated member that is longer than it is wide, and it is wider than it is deep and in this way housing 112 fits well within the hand of a user 16. Housing 112 houses and holds and protects the other components of personal electronic device 14.

Processing System 114:

In the arrangement shown, as one example, personal electronic device 14 includes a processing system 114. Processing system 114 is formed of any suitable size, shape, design, and/or technology and is configured to control operation of other components of personal electronic device 14 to facilitate computational operation of personal electronic device 14. In the arrangement shown, as one example, processing system 114 includes a processing circuit 130 and memory 132 having software code 134 or instructions that facilitates the display and adjustment of images on display 116, and a communication circuit 136, among other components.

Processing circuit 130 may be any computing device that receives and processes information and outputs commands according to software code 134 or instructions stored in memory 132. Memory 132 may be any form of information storage such as flash memory, ram memory, dram memory, a hard drive, or any other form of memory. Processing circuit 130 and memory 132 may be formed of a single combined unit. Alternatively, processing circuit 130 and memory 132 may be formed of separate but electrically connected components. Alternatively, processing circuit 130 and memory 132 may each be formed of multiple separate but electrically connected components.

Software code 134 or instructions is any form of information or rules that direct processing circuit 130 how to receive, interpret and respond to information to operate as described herein. Software code 134 or instructions is stored in memory 132 and accessible to processing circuit 130. As an illustrative example, in one or more arrangements, software code or instructions may configure processing circuit 130 to control camera 120, display 116 and inputs 118 to provide a graphical user interface 80 for user 16 to configure system 100 (e.g., setup account and/or user 16 preferences), select equipment 44 for isolation, and guide user 16 though a LOTO to isolate the selected equipment 44.

Communication Circuit 136:

In the arrangement shown, as one example, personal electronic device 14 includes a communication circuit 136. Communication circuit 136 is formed of any suitable size, shape, design, and/or technology and is configured to facilitate communication with back-end system 104. In one or more arrangements, as one example, communication circuit 136 includes a transceiver circuit and an antenna. A transceiver is any electronic device that facilitates two-way communication, that is, the delivery of information from personal electronic device 14 to other components of the system 100 as well as the reception of information from other components of the system 100 to personal electronic device 14. An antenna is any device that is configured to receive wireless signals from over-the-air communication and/or transmit wireless signals in over-the-air communication. In an example arrangement, a transceiver of communication circuit 136 is connected with a respective antenna, which may be a monopole antenna, dipole antenna, a loop antenna, a fractal antenna, or any other form of an antenna, to facilitate transmission and/or reception of signals in the form of electromagnetic radio frequencies. Additionally or alternatively, the transceiver of communication circuit 136 may be configured to communicate over a wired communication channel.

Power Source 122:

In the arrangement shown, as one example, personal electronic device 14 includes a power source 122. Power source 122 is formed of any suitable size, shape, design, and/or technology and is configured to provide power to personal electronic device 14 so as to facilitate the operation of the electrical components of the personal electronic device 14. In the arrangement shown, as one example, power source 122 is formed of one or more batteries, which may or may not be rechargeable. Additionally or alternatively, in one or more arrangements, power source 122 may include a solar cell or solar panel or similar technology that may power or recharge personal electronic device 14. Additionally or alternatively, in one or more arrangements, power source 122 may be line-power that is power that is delivered from an external power source into the personal electronic device 14 through a wired connection. Any other form of a power source 122 is hereby contemplated for use.

In various arrangements, communication circuit 136 may be configured to communicate with various components of system 100 using various wired and/or wireless communication technologies and protocols over various networks and/or mediums including but not limited to, for example, Serial Data Interface 12 (SDI-12), UART, Serial Peripheral Interface, PCI/PCIe, Serial ATA, ARM Advanced Microcontroller Bus Architecture (AMBA), USB, Firewire, RFID, Near Field Communication (NFC), infrared and optical communication, 802.3/Ethernet, 802.11/WIFI, Wi-Max, Bluetooth, Bluetooth low energy, UltraWideband (UWB), 802.15.4/ZigBee, ZWave, GSM/EDGE, UMTS/HSPA+/HSDPA, CDMA, LTE, FM/VHF/UHF networks, and/or any other communication protocol, technology or network.

Inputs 118:

In the arrangement shown, as one example, personal electronic device 14 includes inputs 118. Inputs 118 are formed of any suitable size, shape, design, and/or technology and are configured to facilitate user 16 input of data and/or control commands. In various different arrangements, inputs 118 may include various types of controls including but not limited to, for example, buttons, switches, dials, knobs, a keyboard, a mouse, a touch pad, a touchscreen, a joystick, a roller ball, or any other form of user 16 input.

Display 116:

In the arrangement shown, as one example, personal electronic device 14 includes a display 116. Display 116 is formed of any suitable size, shape, design, and/or technology and is configured to facilitate display information. In one or more arrangements, display 116 may include, for example, LED lights, meters, gauges, and/or screen or monitor of a computing device, tablet, and/or smartphone. Additionally or alternatively, in one or more arrangements, the inputs 118 and/or display may be implemented on a separate device that is communicatively connected to personal electronic device 14.

Camera 120:

In the arrangement shown, as one example, personal electronic device 14 includes one or more cameras 120. Camera 120 is formed of any suitable size, shape, design, and/or technology and is configured to facilitate taking of images to facilitate account setup, scanning or QR codes on equipment 44, and/or record keeping for LOTO procedures. In the arrangement shown, as one example, camera 120 is a built-in camera sensor forming part of personal electronic device 14. Such camera sensor may include but is not limited to, for example, a charge coupled device CCD) sensor, a CMOS active pixel sensor, back side illuminated CMOS sensor, or any other type of camera sensor. Alternatively, camera 120 may be a separate device that is communicatively connected to personal electronic device 14.

Graphical User Interface 140:

In the arrangement shown, as one example, system 100 includes a graphical user interface 140. Graphical user interface 140 (GUI 140) is formed of any suitable size, shape, design, and/or technology and is configured to facilitate selection of devices to be isolated and guide user 16 through LOTO processes. In one or more arrangements, as one example, graphical user interface 140 may be provided by, for example, execution of a local application 12 on personal electronic device 14. Additionally or alternatively, in one or more arrangements, graphical user interface 140 may be provided by web-based application 12 executed in a web browser of the personal electronic device 14. Such web application may be, for example, a web portal hosted by a web server on back-end system 104 or by a third-party service provider. FIGS. 31-71 show screenshots of an example GUI configured to facilitate guided LOTO by user 16 as described with reference to one or more of the arrangements described herein and the brief description of the figures.

Not Limited to any Particular System or Device:

In various embodiments, personal electronic device 14 may be implemented using various different devices and/or systems to facilitate selection of equipment 44 and performance of LOTO processes by technicians. As an illustrative example, in one or more arrangements, personal electronic device 14 may be a mobile device (such as a smartphone, tablet, or laptop). However, the embodiments are not so limited. Rather it is contemplated that personal electronic device 14 may be any other form of an electronic device.

Back-End System 104:

Back-end system 104 is formed of any suitable size, shape, design and is configured to communicate with personal electronic devices 14 of users 16, perform various LOTO control processes (including dynamic generation of LOTO procedures for LOTO of equipment 44 selected by users 16), perform various management process, and/or implement various other modules, processes, or software of system 100. In the arrangement shown, as one example, back-end system 104 includes a database 150 and a data processing system 62, among other components.

Database 150:

Database 150 is formed of any suitable size, shape, design and is configured to facilitate storage and retrieval of data. In the arrangement shown, as one example, database 150 is local data storage connected to data processing system 152 (e.g., via a data bus or electronic network). However, embodiments are not so limited. Rather, it is contemplated that in one or more arrangements, database 150 may be remote storage or cloud-based service communicatively connected to data processing system 152 via one or more external communication networks. In some various arrangements, project design files, energy matrices 42, and/or other data pertaining to system 100 may be stored in database 150.

Data Processing System 152:

Data processing system 152 is formed of any suitable size, shape, and design and is configured to facilitate receipt, storage, and/or retrieval of information in database 150, execution LOTO control processes 158, execution of management software 160 for configuration and back-end support of system 100, and/or implementation of various other modules, processes, or software of system 100.

In one or more arrangements, for example, such data processing system 152 includes a circuit specifically configured and arranged to carry out one or more of these or related operations/activities. For example, data processing system 152 may include discreet logic circuits or programmable logic circuits configured for implementing these operations/activities, as shown in the figures, and/or described in the specification. In certain embodiments, such a programmable circuit may include one or more programmable integrated circuits (e.g., field programmable gate arrays and/or programmable ICs). Additionally or alternatively, such a programmable circuit may include one or more processing circuits (e.g., a computer, microcontroller, system-on-chip, smart phone, server, and/or cloud computing resources). For instance, computer processing circuits may be programmed to execute a set (or sets) of instructions (and/or configuration data). The instructions (and/or configuration data) can be in the form of firmware or software stored in and accessible from a memory (circuit). Certain embodiments are directed to a computer program product (e.g., nonvolatile memory device), which includes a machine or computer-readable medium having stored thereon instructions, which may be executed by a computer (or other electronic device) to perform these operations/activities.

Management Software 160 of Back-End System 104:

In one of more arrangements, management software 160 is configured to provide a user interface to facilitate setup, configuration, and management of system 100. In one or more arrangements, such interface may be accessible by a computing device provided by back-end system 104. Additionally, or alternatively, in one or more arrangements, the inputs and/or display may be implemented on a separate end user device (e.g. a personal electronic device 14) that is communicatively connected to back-end system 104. For example, in one or more arrangements, operation of back-end system 104 may be customized or controlled using a personal electronic device 14 or other computing device that is communicatively connected to the back-end system 104 (e.g., via Bluetooth, WIFI, the internet, and/or other communication network or medium).

Generation of Electrical Node Data Sets 42:

In one or more arrangements, management software 160 is configured to facilitate creation of an electrical node data set 42 (also referred to as energy matrix 42) for a project. An electrical node data set 42 is an electronic representation of a project listing every tracked piece of equipment 44, energy isolating device (EID), or Isolation Point (IP), and connections therebetween, which are relevant to the safe LOTO operations in a defined scope for the project. An electrical node data set 42 is created from the project design files (e.g., electrical single line drawings, one-line drawings, electrical architectural drawings, and/or other electrical design schematics, drawings, and/or specifications).

In one or more arrangements, management software 160 provides a user interface for an approved user 16 to manually input data to define an electrical node data set 42 for a project. Manual entry is conducted by a professional person that reviews and analyzes the above listed project drawings and transposes all relevant equipment 44 and EIDs into the electrical node data set 42. In one or more arrangements, management software 160 provides a user interface having duplication and copy tools that enable a user more quickly enter equipment 44 and EIDs into the electrical node data set 42.

Additionally or alternatively, in one or more arrangements, management software 160 is configured to automatically create an electrical node data set 42 for a project from one or more project design files (e.g., electrical single line drawings, one-line drawings, electrical architectural drawings, and/or other electrical design schematics, drawings, and/or specifications).

Automatic creation of an electrical node data set 42 can be done by uploading project design files to the back-end system 104 via management software 160. Management software 160 will then automatically extract information from these project design files to identify various information, which may include but it not limited to, for example, pieces of equipment and EIDs, equipment names, EID names, Isolation Point Names, number of EIDs per equipment, Number of Isolation points per equipment, and/or connections between equipment and EIDs.

Depending on the type and format of project design files provided, management software 160 may utilize various different processes and/or algorithms to extract this information. In one or more arrangements management software 160 may utilize machine learning algorithms and/or analytics to extract such information from project design files. For example, in one or more arrangements, management software 160 may utilize machine learning algorithms and/or analytics that implement character and/or object recognition to identify pieces of equipment 44 and EIDs, equipment names, EID names, Isolation Point Names, number of EIDs per equipment, Number of Isolation points per equipment, and/or connections between equipment 44 and EIDs in drawings and/or images. For instance, in one or more arrangements, management software 160 may user trained classifiers, state machines or other algorithm to provide such character and/or object recognition. In various embodiments, analysis of project design files by management software 160 may include various guided and/or unguided artificial intelligence and/or machine learning techniques including, but not limited to: neural networks, genetic algorithms, support vector machines, k-means, kernel regression, discriminant analysis and/or various combinations thereof. In different implementations, analysis may be performed locally, remotely, or a combination thereof.

Example Electrical Node Data Set Format:

Different arrangements may use various different formats and structures to define electrical node data sets 42. As an illustrative example, in one or more arrangements, electrical node data sets 42 are defined with a format having two categories: Equipment 44 and EIDs 46.

Equipment 44:

In this example, each piece of equipment 44 represents a defined boundary that contains a confluence of electrical pathways. In this example, all equipment 44 has at least one EID 46. In this example, there are 3 different ways to identify and categorize equipment 44 in the electrical node data set: Power sources, Passthrough, and General equipment.

Power Source—In this example, each electrical node data set 42 contains at least one power source so as to facilitate determination of LOTO isolation points by system 100 based on input power and electrical flow paths. Equipment 44 identified as power sources create their own power (e.g., Generators, solar panels, wind turbines, etc.), store their own power (e.g., batteries), or are identified as the source of power input (e.g., utility power, sub-station, power plant, etc.). Equipment 44 identified as a power source will not contain any Line EIDs. They can only contain Isolation Points (Ips), Load EIDs, and Parallel EIDs.

Passthrough—Passthrough equipment 44 are identified and categorized by their inability to physically stop or cut the flow of hazardous energy. It is important to still identify these pieces of equipment 44 in the electrical node data set 42 as they still need to be entered and maintained and therefore must be tracked and integrated into the data set. What makes passthrough equipment 44 unique is that they are considered to be invisible in the electrical flow path in determining LOTO isolation points to cut off the flow of hazardous energy. In dynamically determining EIDs required to isolate a selected set of equipment, system 100 will not identify a passthrough identified piece of equipment 44 as an isolation point to stop the flow of hazardous energy. Rather, the LOTO control processes 158 that traverse the electrical node data set to identify EIDs dynamically will read "through" or "passthrough" a piece of equipment 44 that is identified as passthrough in its live computational analysis of determining isolation points. Some example pieces of equipment 44 that may be identified as passthrough in one or more arrangements, include but are not limited to: transformers, automatic and manual transfer switches, some busways, some electrical equipment buses, some duct banks, and/or pull boxes, among other equipment. Passthrough equipment 44 do not contain Load EIDs, or Parallel EIDs, they only contain Inputs, Outputs, Isolation Points (IPs) and Line EIDs.

General Equipment—General equipment 44 is equipment 44 that is not a power source or a passthrough equipment 44. General equipment 44 must contain at least one of the following types of EIDs: Line EID, Load EID, or Parallel EID.

Equipment Identifiers—Electrical node data sets 42 may include various data fields that describe the equipment 44. In one or more arrangements, as one example, the electrical node data set 42 format includes 11 data fields that may be used to identify equipment 44:

1. Equipment name.
2. Barcode—unique to that piece of equipment 44.
3. Type—General, passthrough, power source.
4. Group—Equipment 44 can be grouped together based on identification and naming conventions to better filter and find needed equipment 44.
5. Sub-Group—Equipment 44 can be sub divided and filtered into even smaller groups based on naming conventions and identification to better filter and find needed equipment 44.
6. Location—the physical location the piece of equipment 44, is in the building, and/or project.
7. #Line—the number of Line EIDs a piece of equipment 44 has assigned to it.
8. #Load—the number of Load EIDs a piece of equipment 44 has assigned to it.
9. #Parallel—the number of Parallel EIDs a piece of equipment 44 has assigned to it.
10. Relations Complete—In one or more arrangements, back-end system 104 is configured to automatically track status of connections to/and from equipment 44 and determine if a piece of equipment 44 has had all electrical connections to or from the piece of equipment 44 correctly connected. Displays either "yes" or "no."
11. Review Status—Tells the user 16 if that piece of equipment 44 is currently in a review status and if it is, which stage of the review status it is in.

Energy Isolating Devices (EIDs)

Energy Isolating Devices (EIDs) represent physical locations where single or multiple electrical power pathways intersect. Each EID is assigned to a piece of equipment 44. In one or more arrangements, EIDs are categorized into 6 types in this example electrical node data sets 42 format: Lines, Loads, Parallels, Inputs, Outputs, and Isolation Points.

1. Line EIDs—are physical points where power enters a piece of equipment 44.
2. Load EIDs—are physical points where power exists a piece of equipment 44.
3. Parallel EIDs—are physical points where power can either ENTER or EXIT a piece equipment 44 through a single physical point.
4. Isolation Points—are physical points that can be used to stop the flow of hazardous electrical energy.
5. Inputs—are physical points where power enters a piece of equipment 44 but does not contain a way to physically stop the flow of electrical hazardous energy.
6. Outputs—are physical points where power exits a piece of equipment 44 but does not contain a way to physically stop the flow of electrical hazardous energy.

In one or more arrangements, electrical node data sets 42 may also specify two additional data fields for an EID 46 to indicate how the EID 46 reacts with the management software and user 16 input: Ghost, and Medium Voltage.

Ghost EIDs—Ghost EIDs are a toggle that can be applied to any EID 46, and it effectively turns that EID 46 into a "passthrough" EID. Similar to passthrough equipment 44, the system 100 will not identify a ghost EID as an isolation point. The system 100 will automatically read upstream through the ghost EID and continue upstream to another piece of equipment 44 to determine the best and safest isolation point. It is important to note that a ghost EID can still be identified as an LDL location, just not an isolation point 46 where hazardous energy can be stopped with a physical device or barrier.

Medium Voltage—Medium Voltage is a toggle for EIDs 46 and equipment 44 and is intended for use with any EID 46 or piece of equipment 44 that handles voltages of 1,000 Volts or larger. In one or more arrangements, system 100 may utilizes different Live Dead Live procedure for EIDs 46 and Pieces of equipment 44 that are marked as Medium Voltage as opposed to equipment 44 that is less than 1,000 Volts.

Example User Interface of Management Software:

FIGS. 10-30 show screenshot views of one example user interface that may be provided by management software 160 to facilitate setup, configuration, and management of system 100, in accordance with one or more arrangements. In this example arrangement, the user interface is a web-based application accessible from a web-browser of a computer communicatively connected to back-end system 104.

In this example arrangement, the web application provides a plurality of different interface screens in a content window 1002 for users 16 to find, view, edit, extract, or use different categories of information, features, and/or functions. In this example arrangement, the interface includes a set of navigation tabs 1004 positioned to the left the content window 1002 to facilitate easy navigation between the different interface screens available to the user 16. In this example arrangement, the set of side tabs includes: an Equipment tab, an EID tab, Lockouts tab, a Users tab, a Flag Groups tab, an Activity tab, a LOTO Inventory tab, a 2pV Reviews tab, and a Site Settings tab. However, the embodiments are not so limited. Rather, it is contemplated that in one or arrangements, management software 160 may provide an interface providing different features and/or functionality and/or having a different structure and/or layout for users 16 to access such features and/or functionality.

Equipment and EID Tabs:

In this example arrangement, the Equipment and EID tabs navigate the user 16 to Equipment and EID interfaces that permit the user 16 to create, view, edits, and/or perform functions related to equipment 44, EIDs 46, and electrical connections in the electrical node data set 42 for a project/worksite. An example implementation of an Equipment Interface is shown in FIGS. 13-16. Using the Equipment and EID interfaces, a user 16 may create and/or update the electrical node data set 42 by adding, removing, and/or editing equipment, EIDs 46, and electrical connections as required during the duration of a project.

In one or more arrangements, Equipment and EID interfaces present a pop-up window 1008 to facilitate entry of information for new equipment. In one or more arrangements, Equipment and EID interfaces present a pop-up window 1010 configured to provide additional information of a piece of equipment 44 or EID 46 that is selected by a user 16.

In one or more arrangements, Equipment and/or EID interfaces are configured to facilitate manual input of equipment 44 and/or EIDs 46, by providing the user 16 the ability to duplicate new instances of existing equipment 44 and/or EID 46. For example, in the example Equipment interface shown in FIGS. 14 and 15, the shown pop-up window 1010 with detailed information of the selected equipment 44 provides an option to generate a duplicate of the piece of equipment. Duplication may be configured to create a new instance of a piece of equipment 44 with many equipment identifiers prefilled with information from the duplicated item. The user 16 may then specify new identifiers (e.g., name, barcode, etc.) and edit any pre-filled identified that are required, thereby allowing the user 16 to manually create and/or update an electrical node data set 42 quickly and easily.

Lockouts Tab:

In this example arrangement, the Lockouts tab navigates the user 16 to a Lockouts interface that permits the user 16 to create, view, edits, and/or perform functions related to LOTOs (e.g., as shown in FIGS. 16-19). In this example, the Lockouts interface lists all active and past LOTO operations for the project in content window 1002. It lists all active LOTOs by one of 4 unique identifiers: 1) IL—individual LOTO unique identifier prefix, 2) GL—Group LOTO unique identifier prefix, 3) SME—Subject matter expert LOTO unique identifier prefix, 4) AC—access control LOTO unique identifier prefix. All these prefixes are then followed by a number prefix that start at 1 and grows infinitely based on the sequential LOTO operations that follow on the project. E.G. IL-01, IL-02 etc. In this example, a group LOTO has a prefix of GL-01.1, the dot 1 identifier identifies that LOTO as a child or subordinate lockout that is part of LOTO GL-01. This would denote a user 16 that has joined LOTO GL-01 and is now a subordinate LOTO record. In this example, only SME and GL identifiers can have additional subordinate identifiers.

In one or more arrangements, Lockouts interface displays three columns of information for the lockouts in the content window 1002: 1) LOTO Unique Identifier, 2) Type of LOTO (IL, GL, SME, AC), and 3) Status of the LOTO. In this example, status can be an Active, Pending, Removing, Removed, Modifying, or Transferring status. Active status means that Lockout is live in the building and actively protecting users 16. Pending status means that a LOTO has been created but has not yet been completed to place the equipment in a safe status. Removing status means this LOTO is actively being taken down or removed on the project. It cannot be joined by any user 16 in this status.

Once completed, it will be updated to removed status. Removed status means this LOTO has been created and has been successfully removed on the project and cannot be used to actively protect users 16. Modifying status represents the user 16 who owns the LOTO operation is actively making changes to this LOTO and cannot be joined at this time by other users 16. Once completed, the Modifying status will be updated to active. Transferring status means this LOTO is currently being transferred between 2 individuals and ownership of the LOTO is being passed but hasn't been completed yet. Once completed, the status will get updated to active.

In one or more arrangements, the Lockouts interface is configured to provide an interface to view additional details for a LOTO and/or provide additional capabilities if a user 16 clicks on any of the LOTO records. For example, in one or more arrangements, the interface may provide various details which may include but are not limited to: the LOTO identifier, type of LOTO, current LOTO owner, a timeline portion that shows the exact time and date the LOTO was initialized, when the LOTO was completed to a safe status, and if it has been removed, the time the removal process was completed, the equipment that was designated to be locked out, the equipment type, and the status of that equipment, and/or any other information relating to LOTOs.

Additionally or alternatively, in one or more arrangements, the Lockouts interface may provide a Locks tab shows a list of all the locks, the lock box, and its location, as well as all the associated pictures for both the lock keys in the lock box and the lock pictures of the locks placed on the equipment. In some arrangements, the Locks tab may also show which equipment and EID each lock is associated with or which lock box. In some arrangement, the user 16 can click on each picture icon associated with each lock entry to pull up or export the picture. In some arrangements, the user 16 can also see any comments associated with any of the pictures.

Additionally or alternatively, in one or more arrangements, the Lockouts interface may provide an Activity tab that tracks and records all activity that corresponds to the specific LOTO record. In some arrangements, the Activity tab lists the name of the user 16 doing the action, the exact time and date of the action, and records what that action was that took place. In one or more arrangements some actions that are recorded by system 100 live in real time as they occur. Such actions may include but are not limited to for example, LOTO initiation, Lock placements on equipment 44 and lock boxes, LDL tests, LOTO completion, LOTO modifications, LOTO transfers which records former owner and the new owner who took possession of the transfer, lock removals, and complete LOTO removal.

Additionally or alternatively, in one or more arrangements, the Lockouts interface may provide a Participants tab that lists all the names, active and past, of the users 16 that are currently on the lockbox or if they were previously on the lock box. In some arrangements, the participants tab may also show those individuals lock barcodes, the lock photo associated with that lock on the lockbox, the date and time the lock was placed on the lockbox, and the status of the entry for the LOTO.

Additionally or alternatively, in one or more arrangements, the Lockouts interface may provide an LDL tab tracks the live entries of the Live Dead Live voltages entered in the application. In one or more arrangement the LDL tab tracks the method used for the LDL (e.g., witnessed or self-performed), the exact equipment and EID the LDL was performed on, the date and time the action took place, the voltage measuring device that was used for the LDL operation, and the voltage numbers entered for the Live test, the Dead test, and the second live test, and/or any other information relating to LDL testing.

Figure 17:
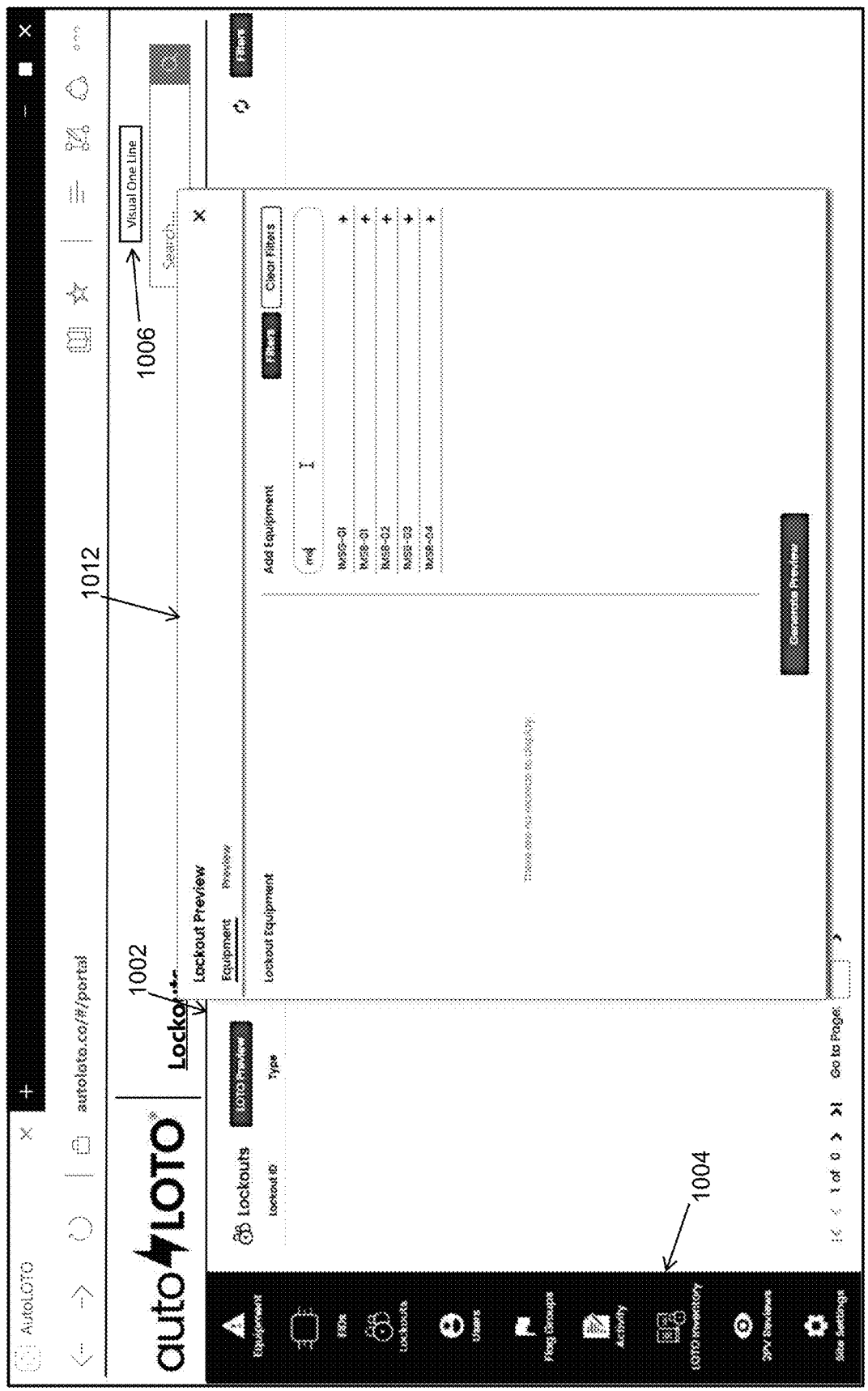
FIG. 17 shows a screen shot view of an example graphical user interface provided by management software of a back-end system of the system shown in FIG. 5, in accordance with one or more arrangements; the view showing an interface for selecting equipment for previewing a LOTO.
Figure 18:
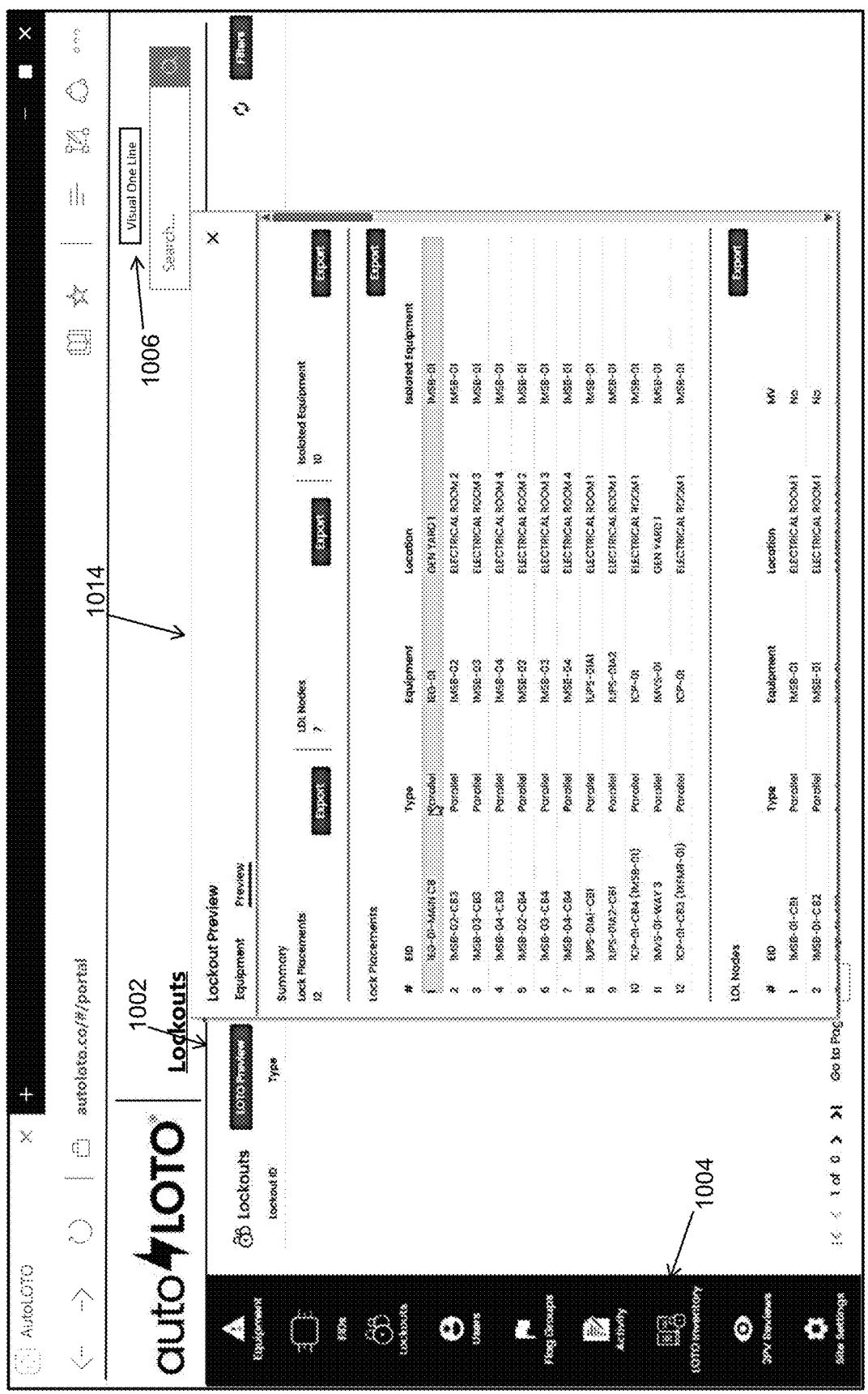
FIG. 18 shows a screen shot view of an example graphical user interface provided by management software of a back-end system of the system shown in FIG. 5, in accordance with one or more arrangements; the view showing some example results of a LOTO preview provided by the interface shown in FIG. 17.
Figure 19:
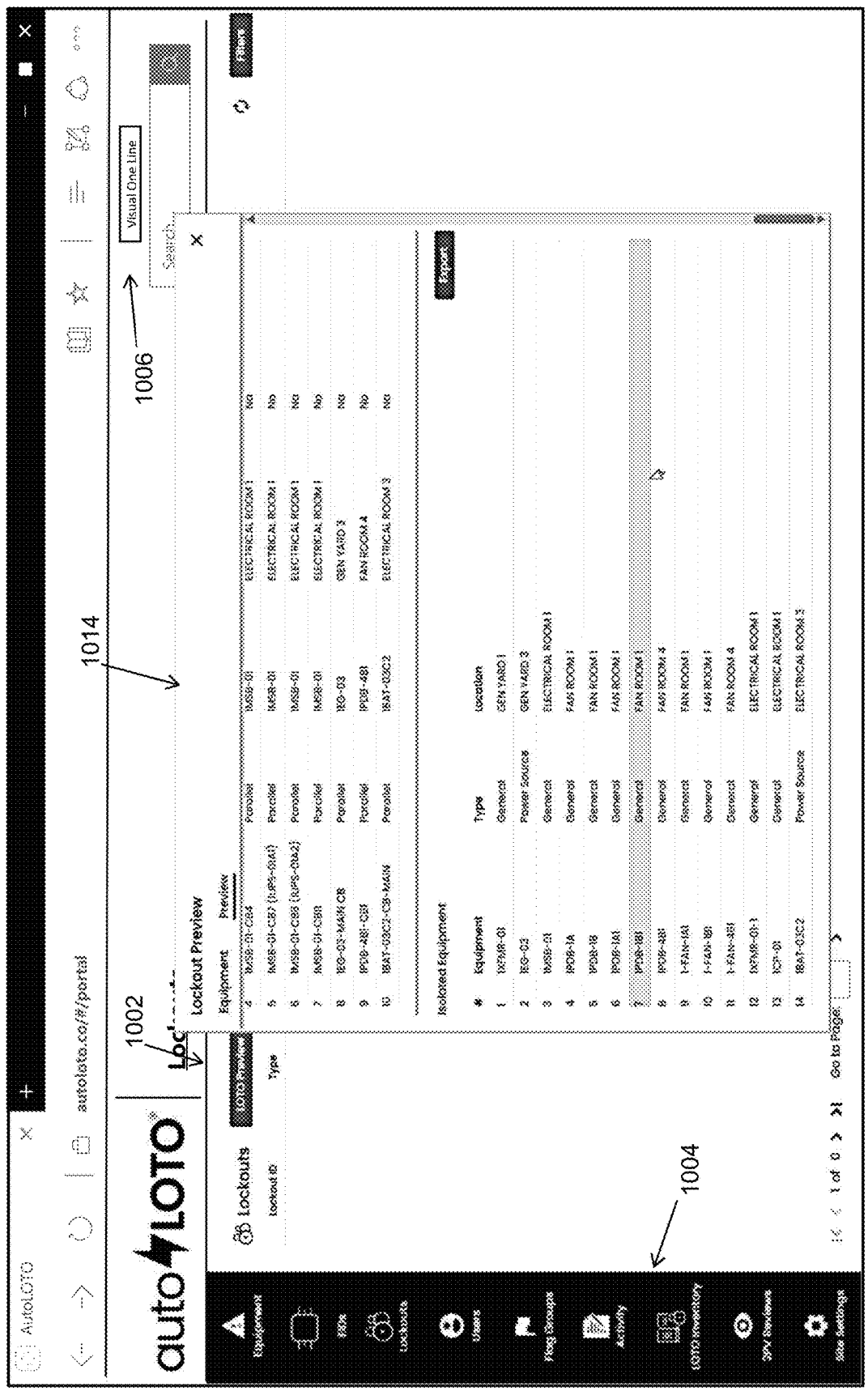
FIG. 19 shows a screen shot view of an example graphical user interface provided by management software of a back-end system of the system shown in FIG. 5, in accordance with one or more arrangements; the view showing some additional example results of a LOTO preview provided by the interface shown in FIG. 17.

In the arrangement shown, as one example, the Lockouts interface provides an option for a user 16 to preview the result of a lockout intended to isolate a set of equipment. In this example, when a user 16 clicks on the LOTO preview button, a pop-up window 1012 is generated (e.g., as shown in FIG. 17) with a search bar on the right that searches all equipment listed in the electrical node data set for the project. The user 16 can search for specific equipment and select as many pieces of equipment as they desire to run a simulated LOTO operation on. As the user 16 selects equipment, the equipment gets moved into the list on the left of the pop-up window. Once finished, the user 16 will click on the generate preview button on the bottom middle of the pop-up window. The management software 160 will then dynamically determine EIDs for placement of locks to isolate the selected equipment, as described herein. In one or more arrangements, the management software 160 also determines all equipment downstream from those EIDs that will be isolated if the determined EIDs are disabled. A lockout preview is then provided in the pop-up window 1014 that shows a list of the required EIDs, the required LDL test locations, and all equipment that will be isolated, for example, as shown in FIG. 18 and FIG. 19.

Users Tab:

In this example arrangement, the Users tab navigates the user 16 to a Users interface (not shown) that permits the user 16 to create, view, edits, and/or manage user profiles in the project. For example, in one or more arrangements, the Users interface lists all users 16 alphabetically and has a company identifier column, a project permissions/role column, a supervisor column, and an edit and invite email column. In one or arrangements, there are four main permission roles that may be assigned to users 16: User, Supervisor, Subject Matter Expert, and Admin. In some arrangements, the Users interface may permit sub-roles to be assigned. For example, in one or more arrangements, the admin permission role may be assigned four sub roles: Can manage connections, can manager worksite, can manage users, and a super admin role. In this example arrangement, super admins can create other admins. In this example arrangement, admins with can manage user access can create new accounts that are User, Supervisor, or SME. In this example arrangement, admins with can manage worksite access can access and change settings in the site settings main tab in worksite manager. In this example arrangement, admins with can manager connections permissions are the only ones allowed to edit the electrical node data set. In this example arrangement, user permission level can only access Individual LOTOs and do not have any edit permissions or report permissions at all. In this example arrangement, supervisors can run reports and export data, search user profiles, and have access to individual and group LOTO processes. In this example arrangement, subject matter expert user permissions have access to all four LOTO processes, can run all reports and export data, have access to search all users 16, and may receive data edit capabilities.

Figure 21:
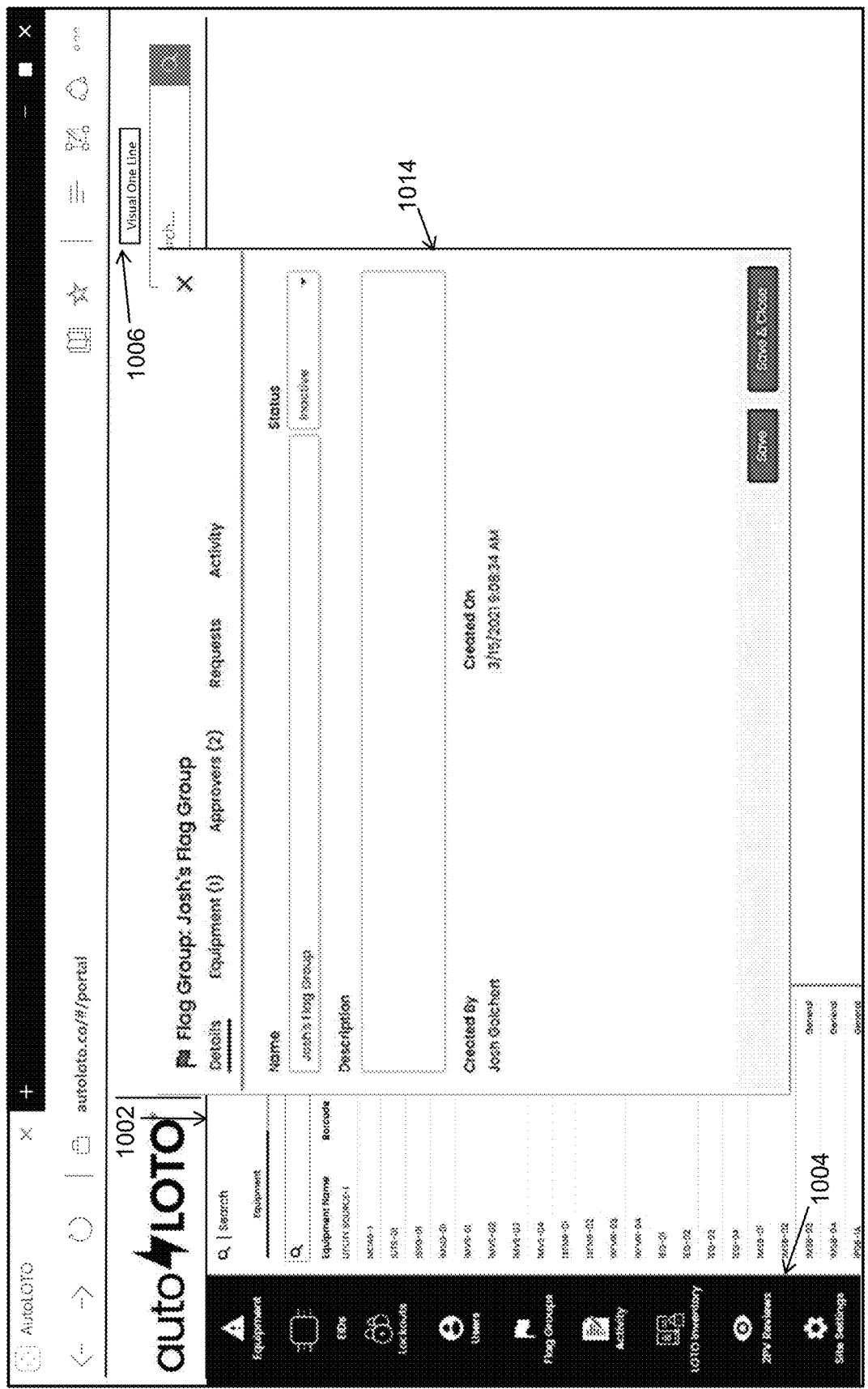
FIG. 21 shows a screen shot view of an example graphical user interface provided by management software of a back-end system of the system shown in FIG. 5, in accordance with one or more arrangements; the view showing an interface for configuring flag groups indicating required approvals for LOTO of certain equipment.
Figure 22:
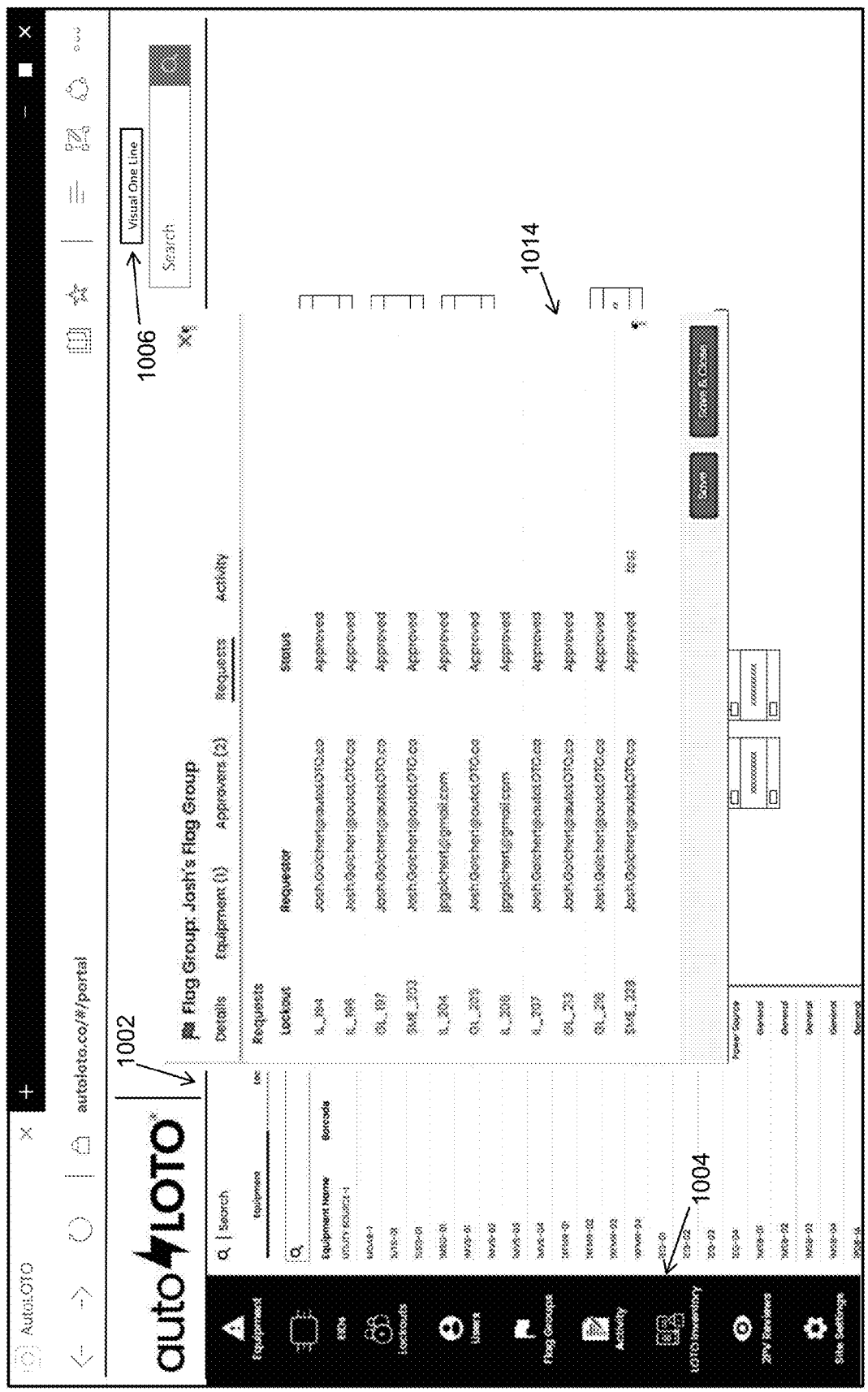
FIG. 22 shows a screen shot view of an example graphical user interface provided by management software of a back-end system of the system shown in FIG. 5, in accordance with one or more arrangements; the view showing a request tab of an interface shown in FIG. 21, the requests tab showing status of approval requests initiated by the flag group.
Figure 23:
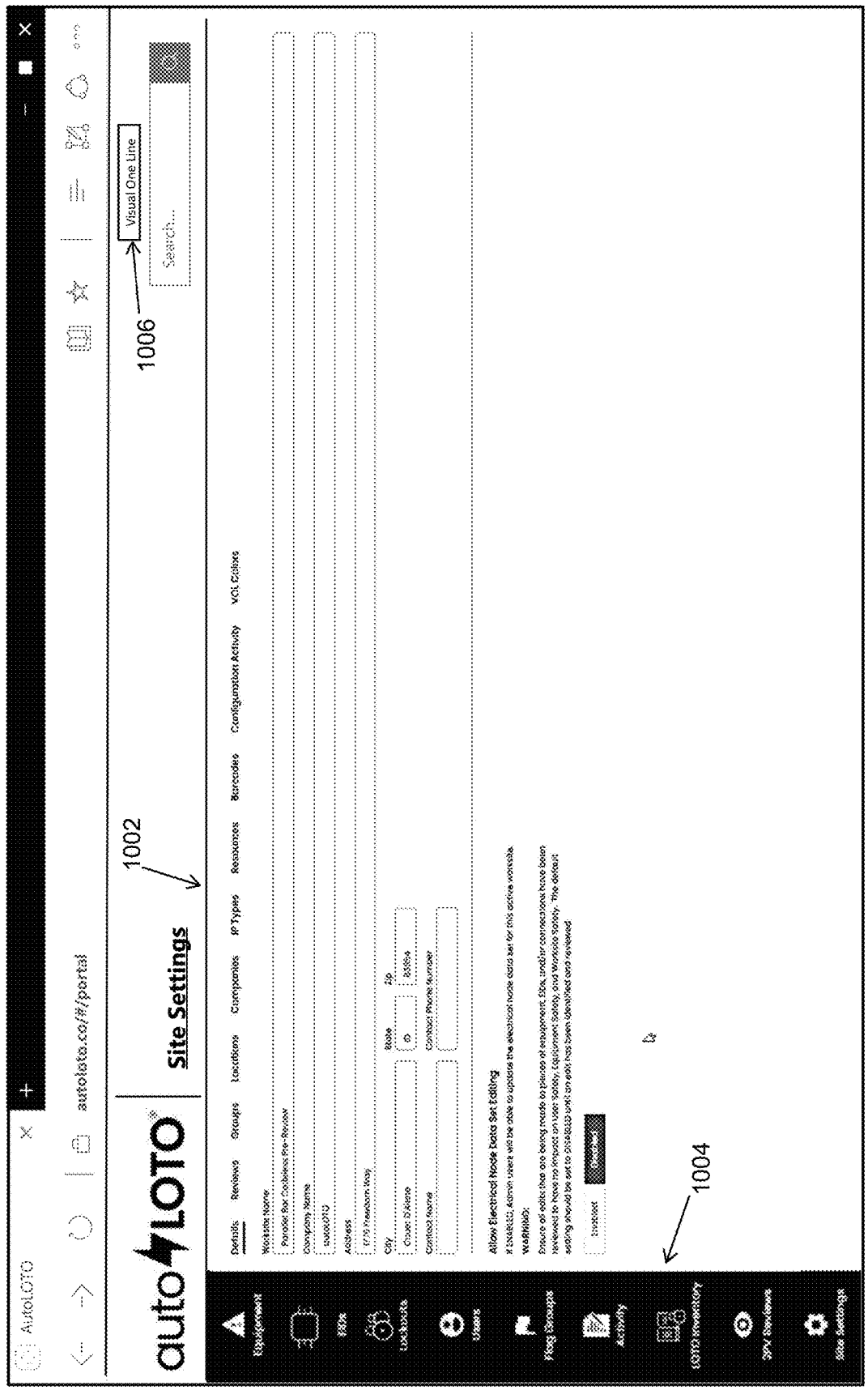
FIG. 23 shows a screen shot view of an example graphical user interface provided by management software of a back-end system of the system shown in FIG. 5, in accordance with one or more arrangements; the view showing an interface for management of configuration settings for a worksite; the view showing a tab of the interface showing details of the worksite.
Figure 24:
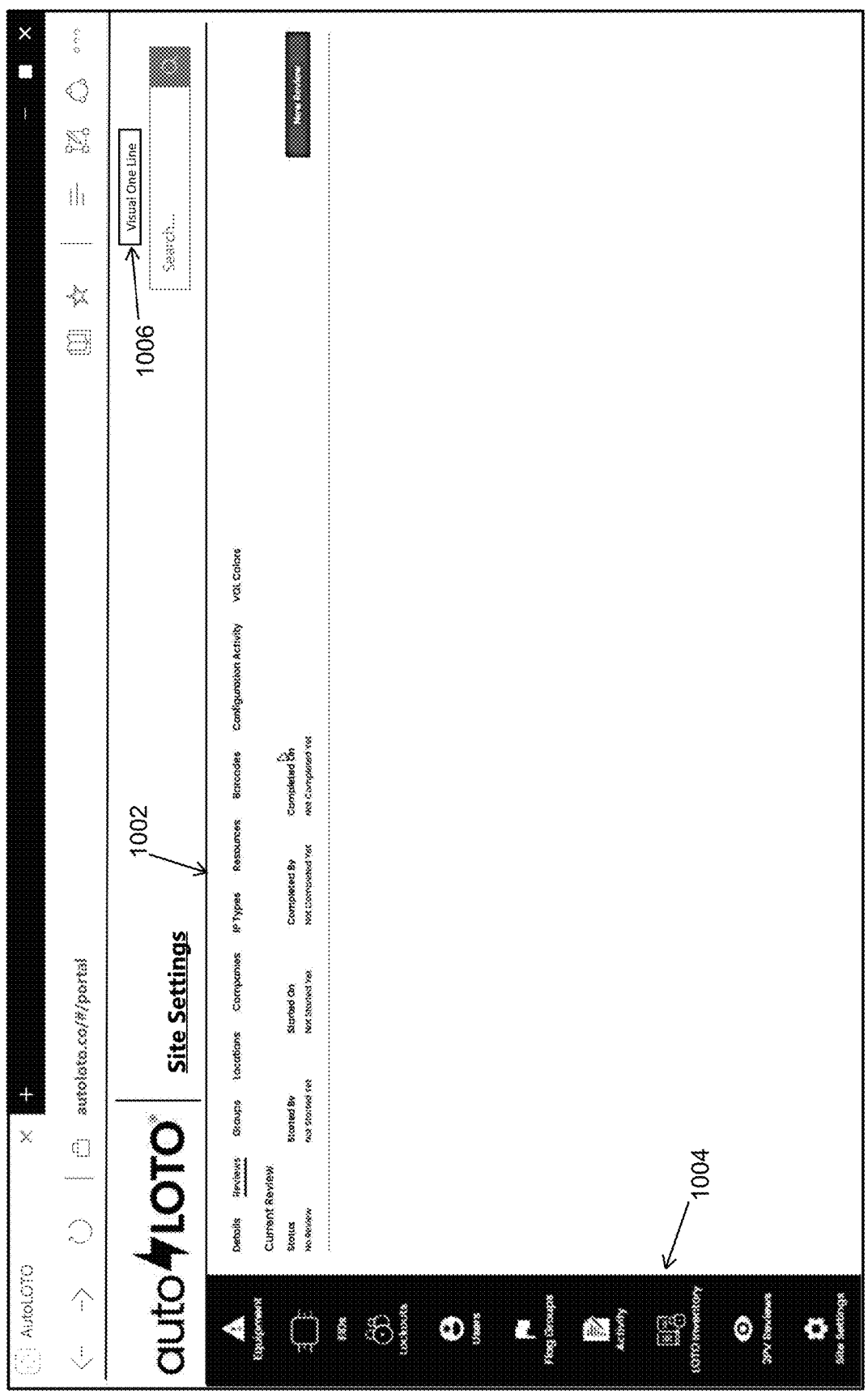
FIG. 24 shows a screen shot view of the interface shown in FIG. 23 the view showing another tab of the interface showing details of the worksite; the tab configured to show a record of reviews of the worksite (if any), and submission of new reviews.
Figure 25:
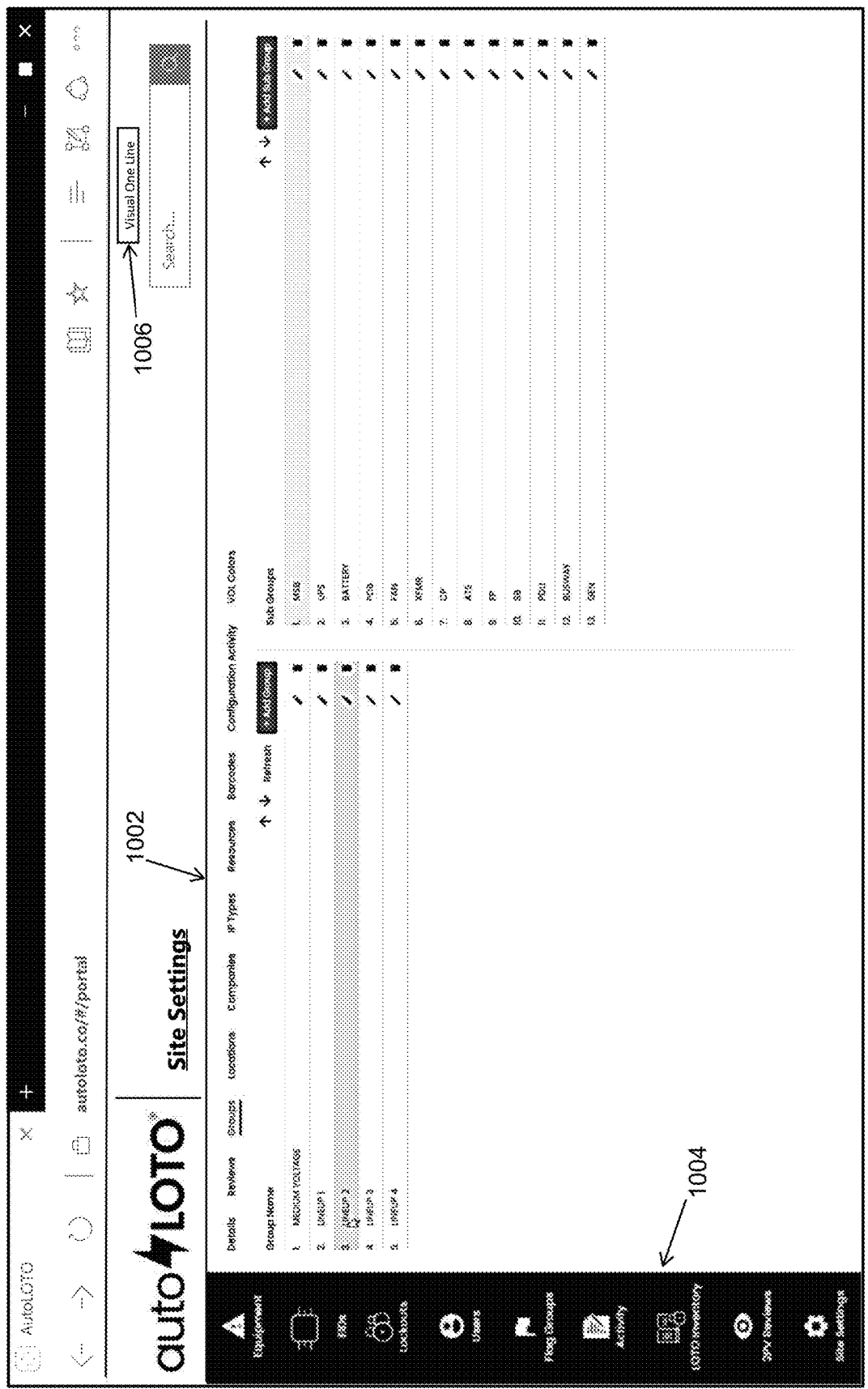
FIG. 25 shows a screen shot view of the interface shown in FIG. 23 the view showing another tab of the interface showing details of the worksite; the tab configured to facilitate creation, review, and editing of locations for the worksite.
Figure 26:
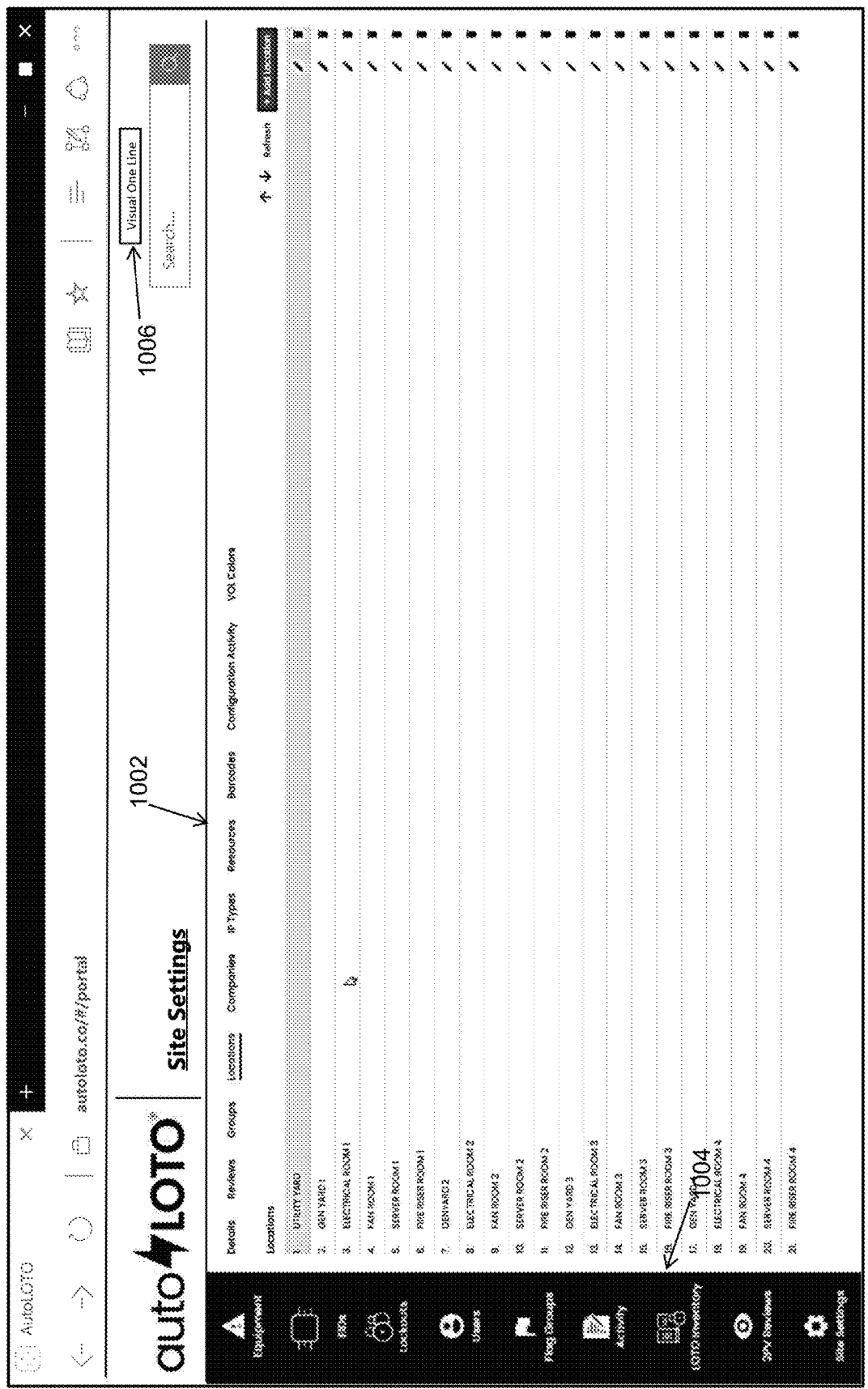
FIG. 26 shows a screen shot view of the interface shown in FIG. 23 the view showing another tab of the interface showing details of the worksite; the tab configured to facilitate creation, review, and editing of groups of equipment and/or EIDs that have been defined the worksite.
Figure 27:
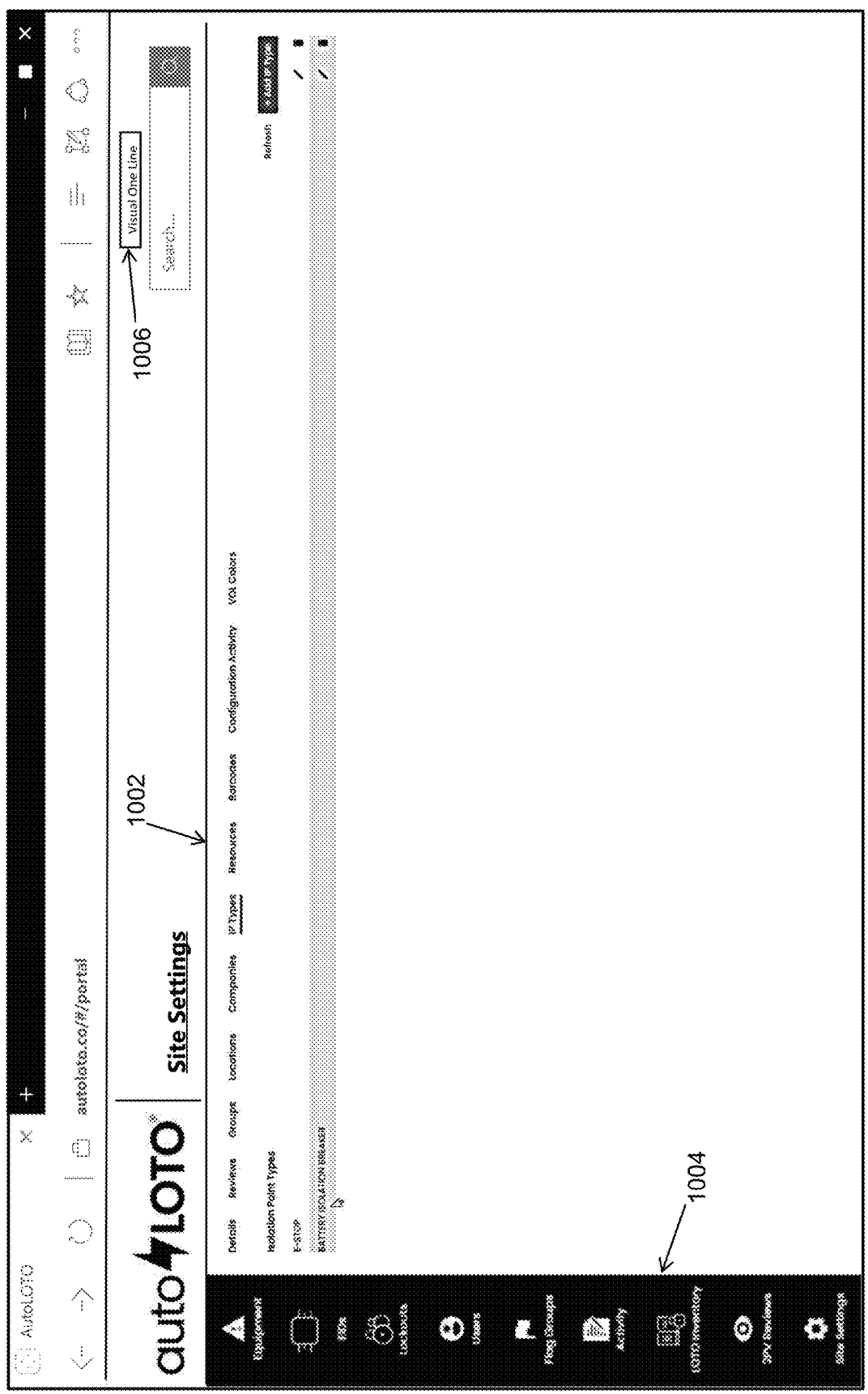
FIG. 27 shows a screen shot view of the interface shown in FIG. 23 the view showing another tab of the interface showing details of the worksite; the tab configured to show the types of isolation points included at the worksite.
Figure 28:
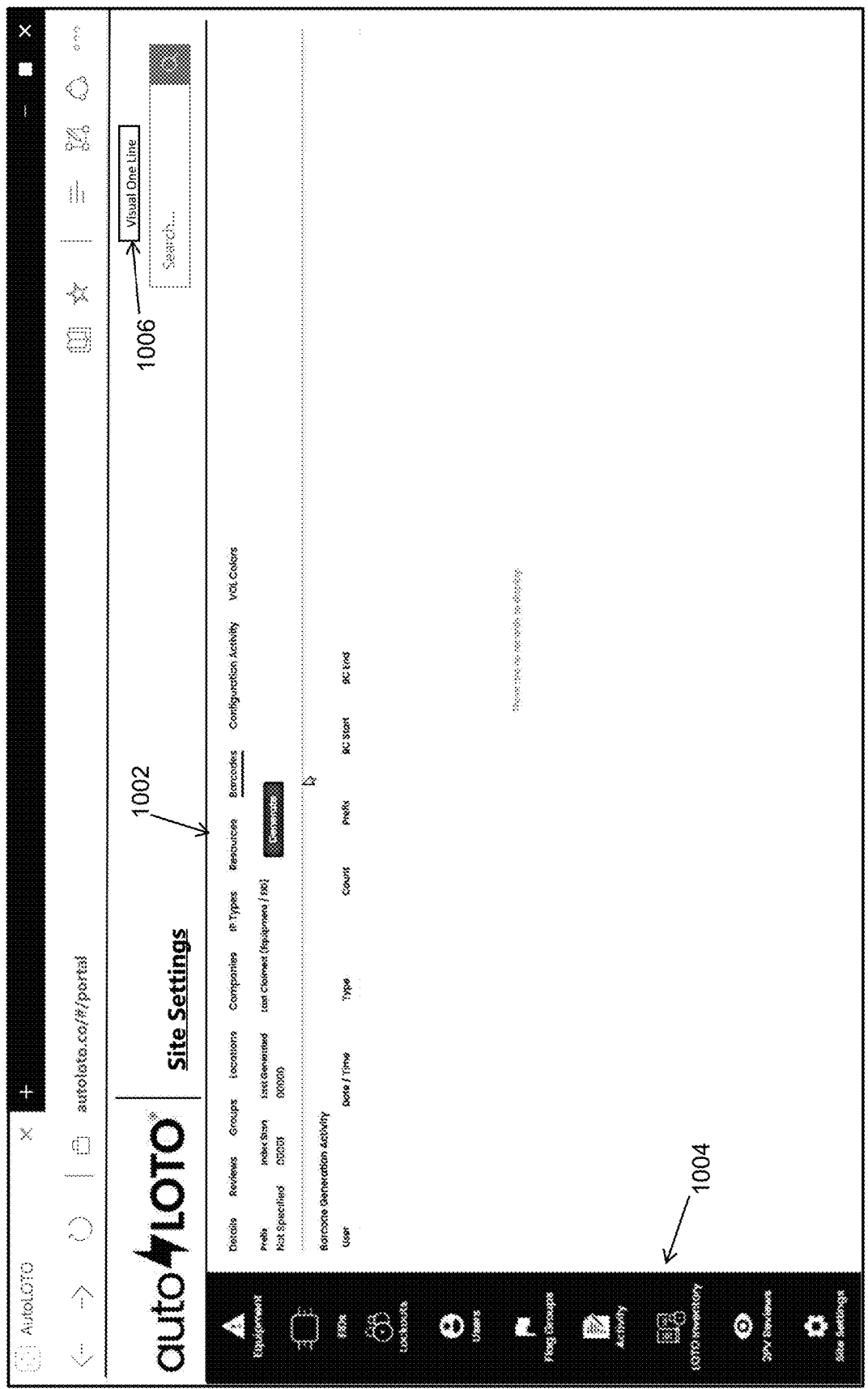
FIG. 28 shows a screen shot view of the interface shown in FIG. 23 the view showing another tab of the interface showing details of the worksite; the tab configured to show activity of use for bar codes of equipment, EIDs, locks, lock boxes, voltmeters, and/or other devices at the worksite.
Figure 30:
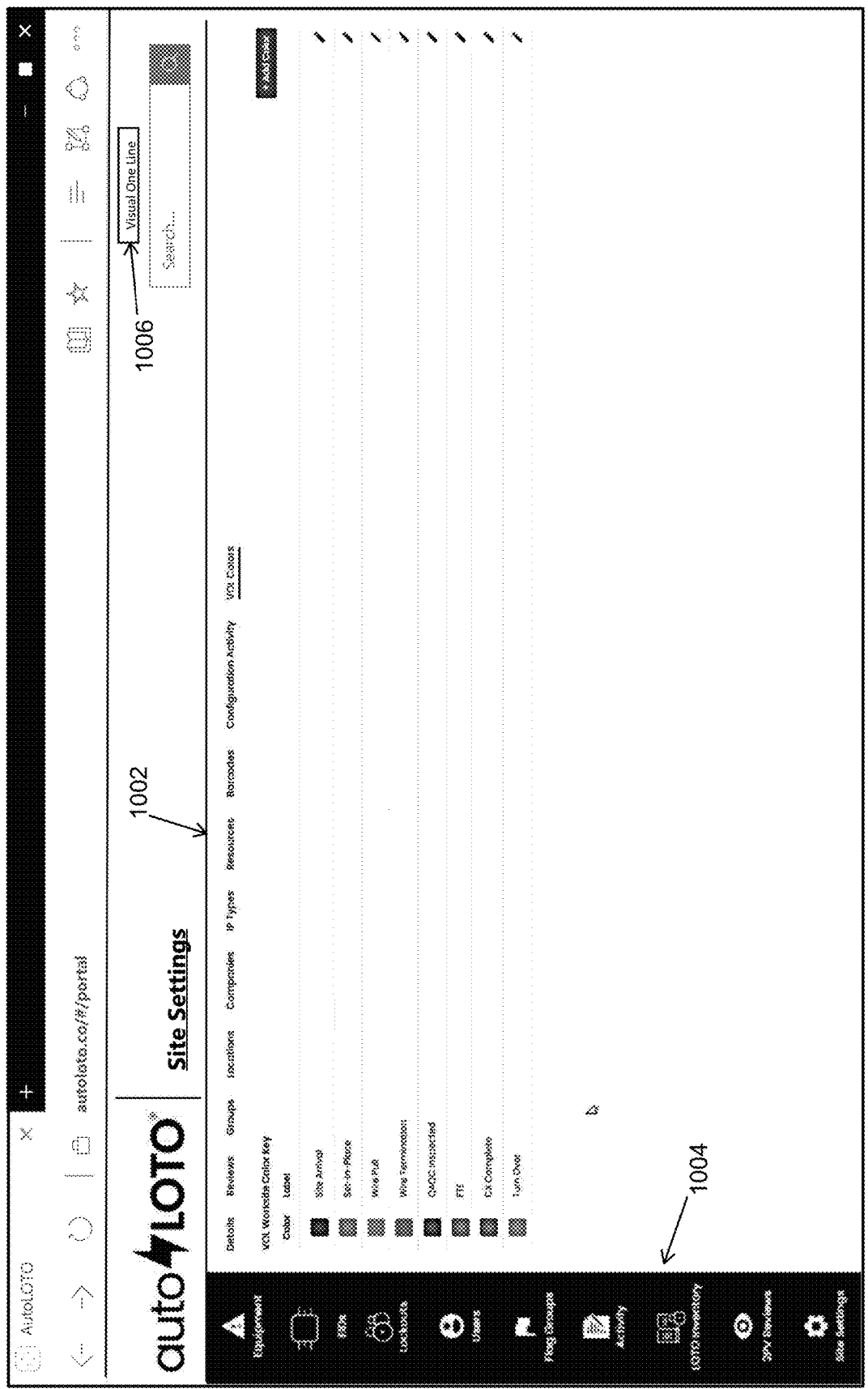
FIG. 30 shows a screen shot view of the interface shown in FIG. 23 the view showing another tab of the interface showing details of the worksite; the tab configured to provide an interface for review and/or configuration of color codes used to represent statuses of equipment of the worksite.
Figure 31:
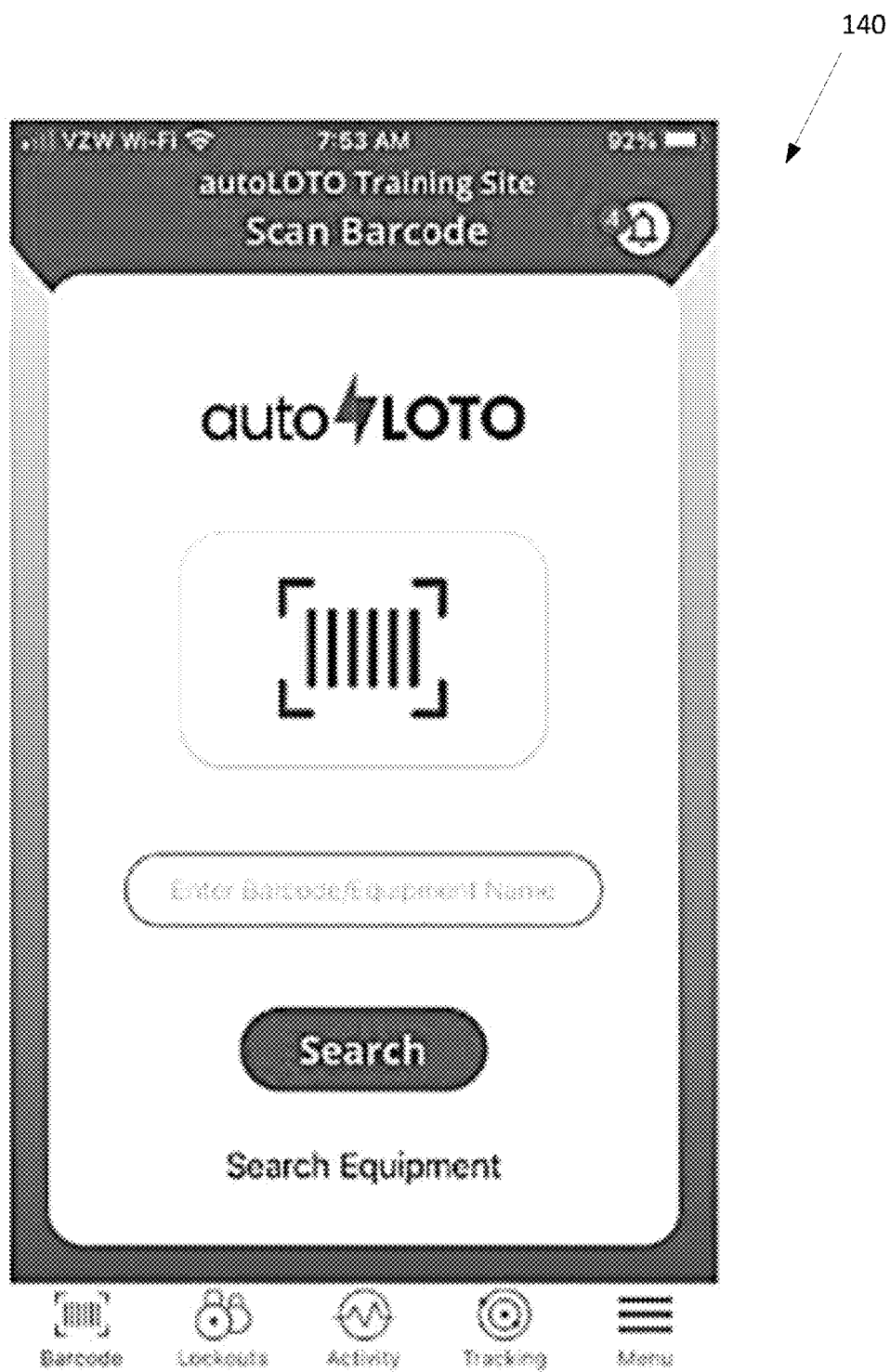
FIG. 31 shows a screen shot view of an example graphical user interface provided by an application on a personal electronic device communicatively connected to a back-end system of the system shown in FIG. 5, in accordance with one or more arrangements; the view showing an interface for searching of equipment by scanning a barcode using a camera of the personal electronic device.
Figure 32:
FIG. 32 shows a screen shot view of an example graphical user interface provided by an application on a personal electronic device communicatively connected to a back-end system of the system shown in FIG. 5, in accordance with one or more arrangements; the view showing an interface for locating equipment by browsing and/or partial equipment name.
Figure 33:
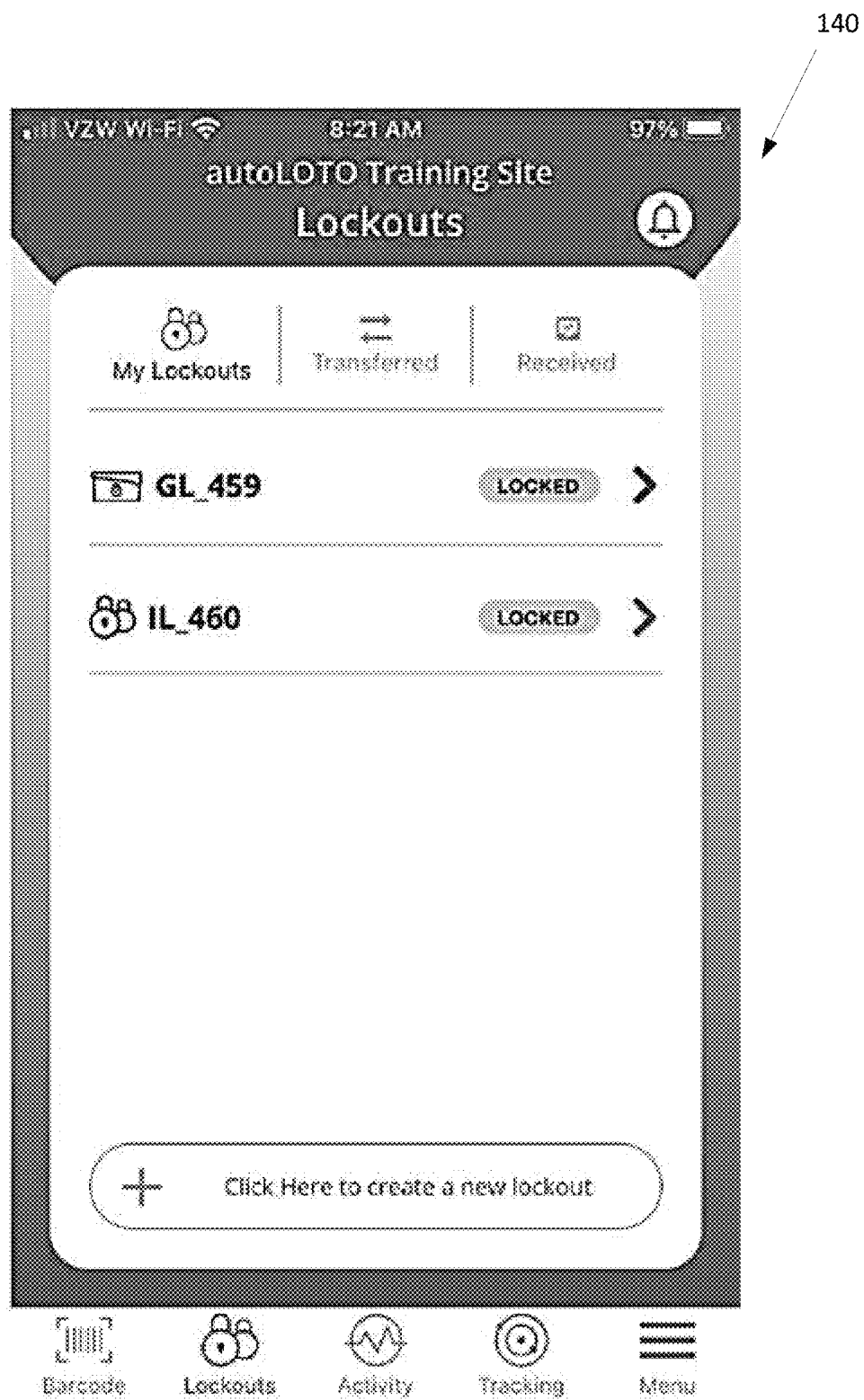
FIG. 33 shows a screen shot view of an example graphical user interface provided by an application on a personal electronic device communicatively connected to a back-end system of the system shown in FIG. 5, in accordance with one or more arrangements; the view showing an interface for review of active LOTOs of a user as well as status of the LOTOs; the view showing the interface having a button for user to initiate creation of a new LOTO.
Figure 34:
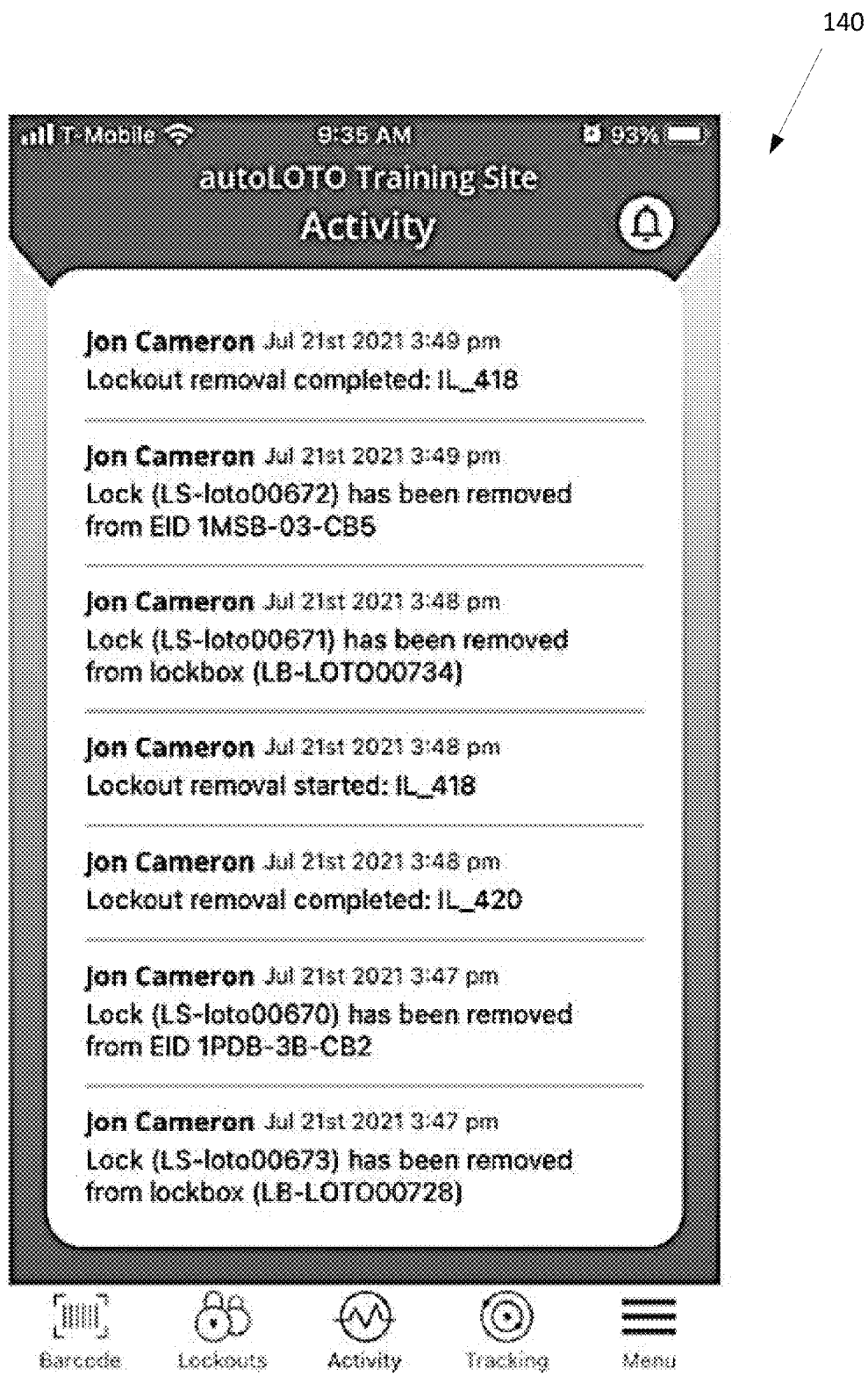
FIG. 34 shows a screen shot view of an example graphical user interface provided by an application on a personal electronic device communicatively connected to a back-end system of the system shown in FIG. 5, in accordance with one or more arrangements; the view showing an interface for review of electrical inter-action activities performed on a worksite; the example view showing the interface configured to show activity of the owner of the personal electronic device.
Figure 35:
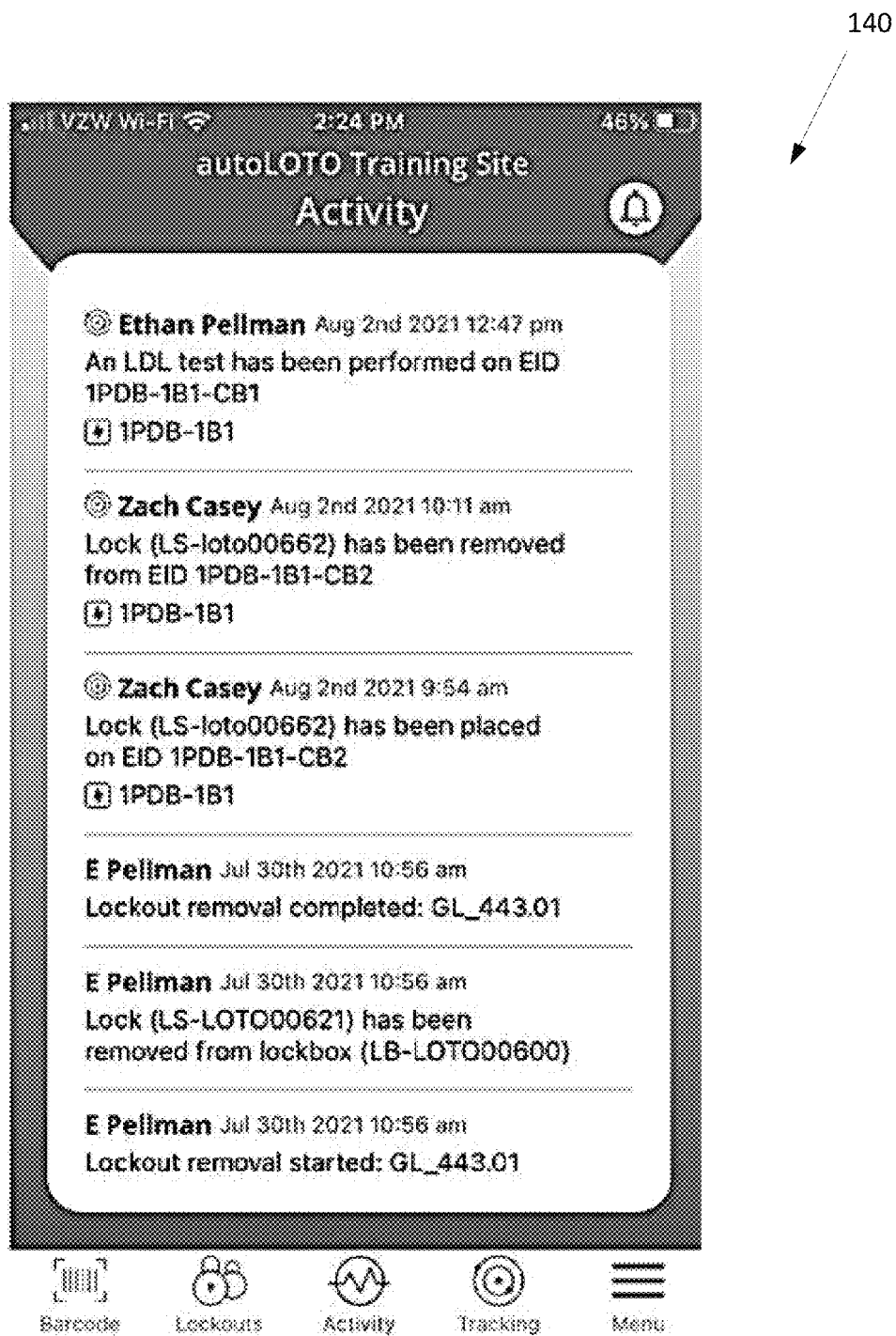
FIG. 35 shows a screen shot view of an example graphical user interface provided by an application on a personal electronic device communicatively connected to a back-end system of the system shown in FIG. 5, in accordance with one or more arrangements; the view showing an interface for review of electrical inter-action activities performed on a worksite; the example view showing the interface configured to show activity of all users on a worksite.
Figure 36:
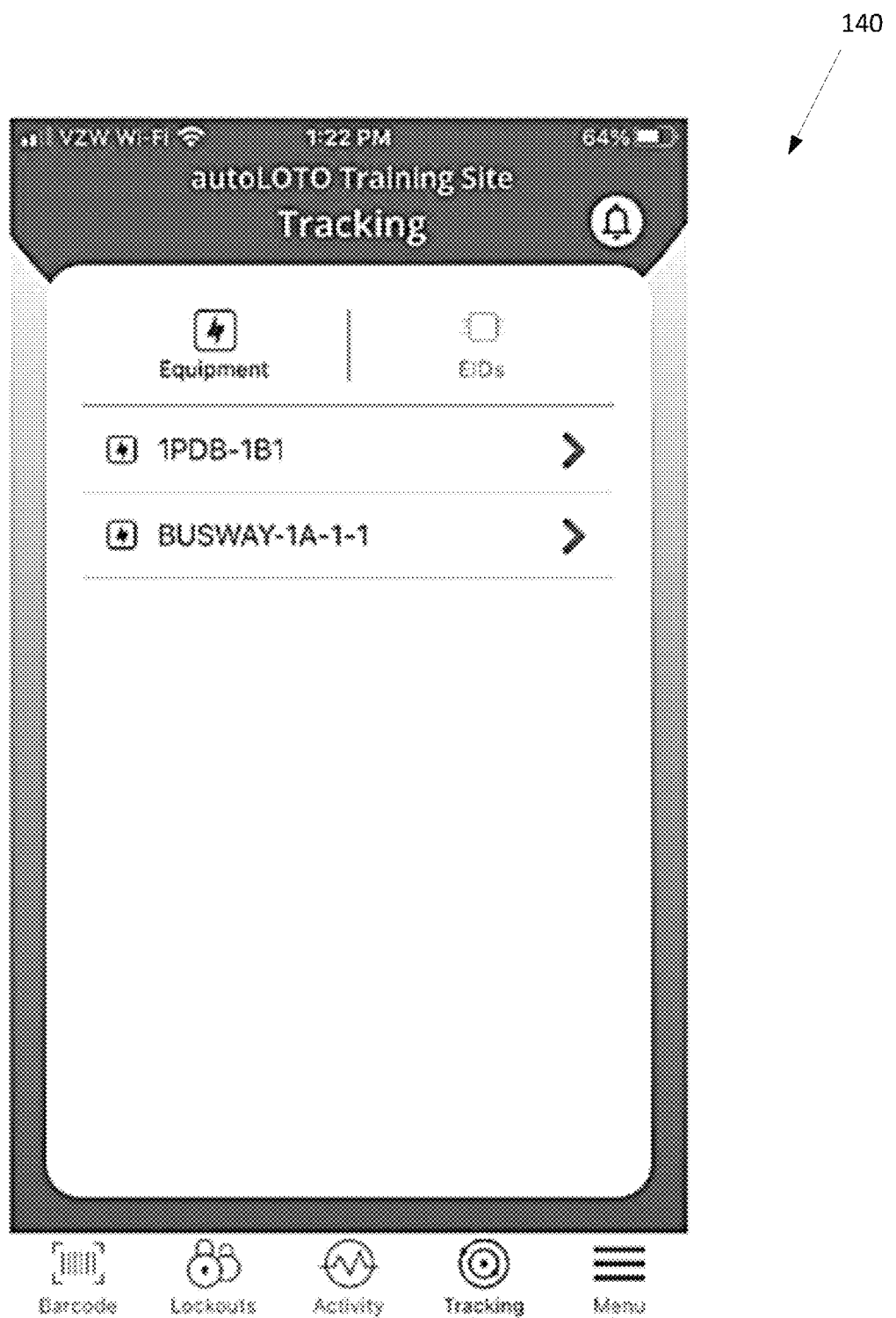
FIG. 36 shows a screen shot view of an example graphical user interface provided by an application on a personal electronic device communicatively connected to a back-end system of the system shown in FIG. 5, in accordance with one or more arrangements; the view showing an interface for tracking of equipment on a worksite; the view showing a list of equipment currently tracked by a user.
Figure 37:
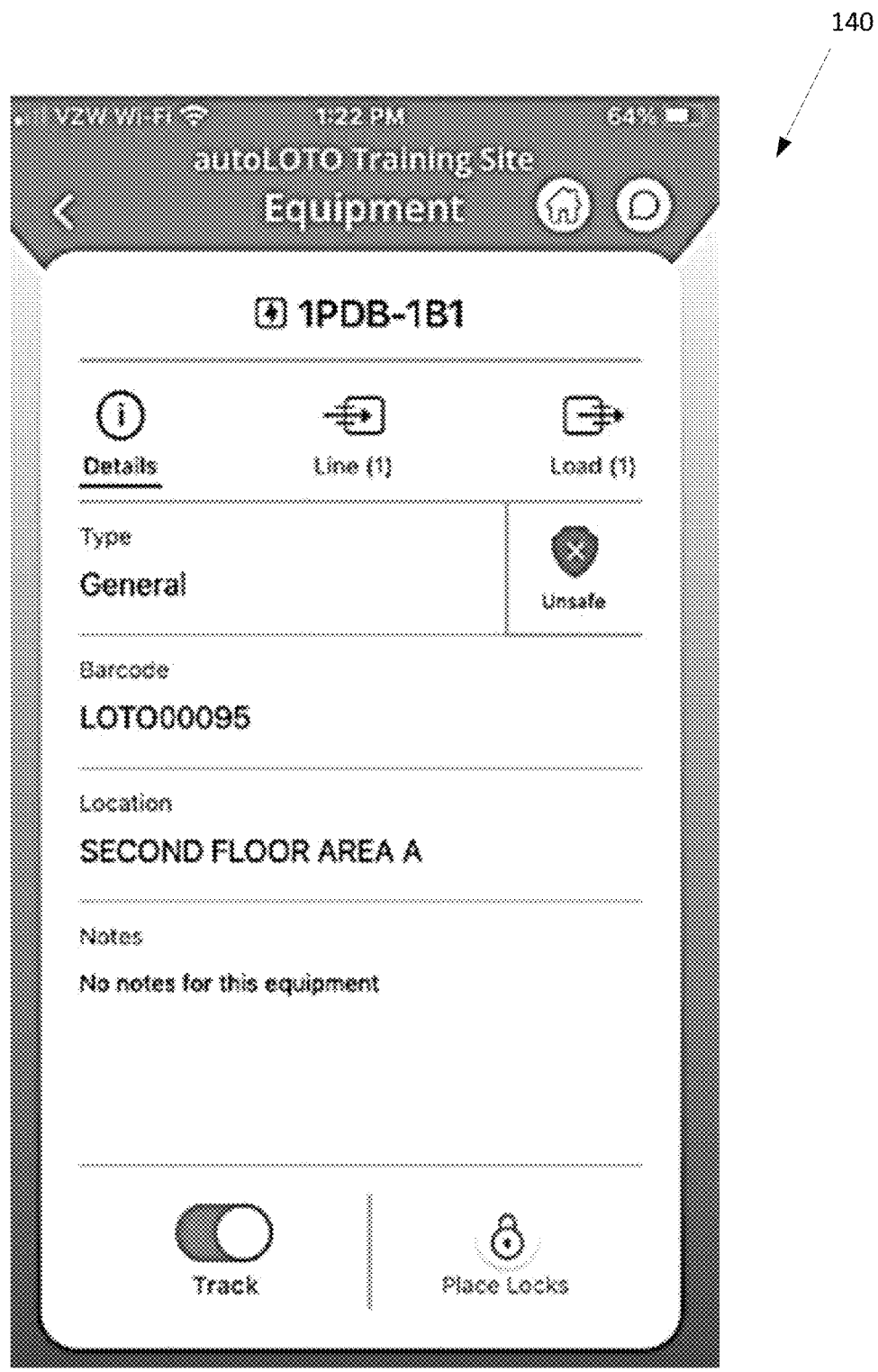
FIG. 37 shows a screen shot view of an example graphical user interface provided by an application on a personal electronic device communicatively connected to a back-end system of the system shown in FIG. 5, in accordance with one or more arrangements; the view showing an interface for review of details of a selected piece of equipment on a worksite; the view showing the interface having a slider to enable or disable tracking of the equipment by the user; the view showing the interface having a button to select the piece of equipment for placement of a lock.
Figure 38:
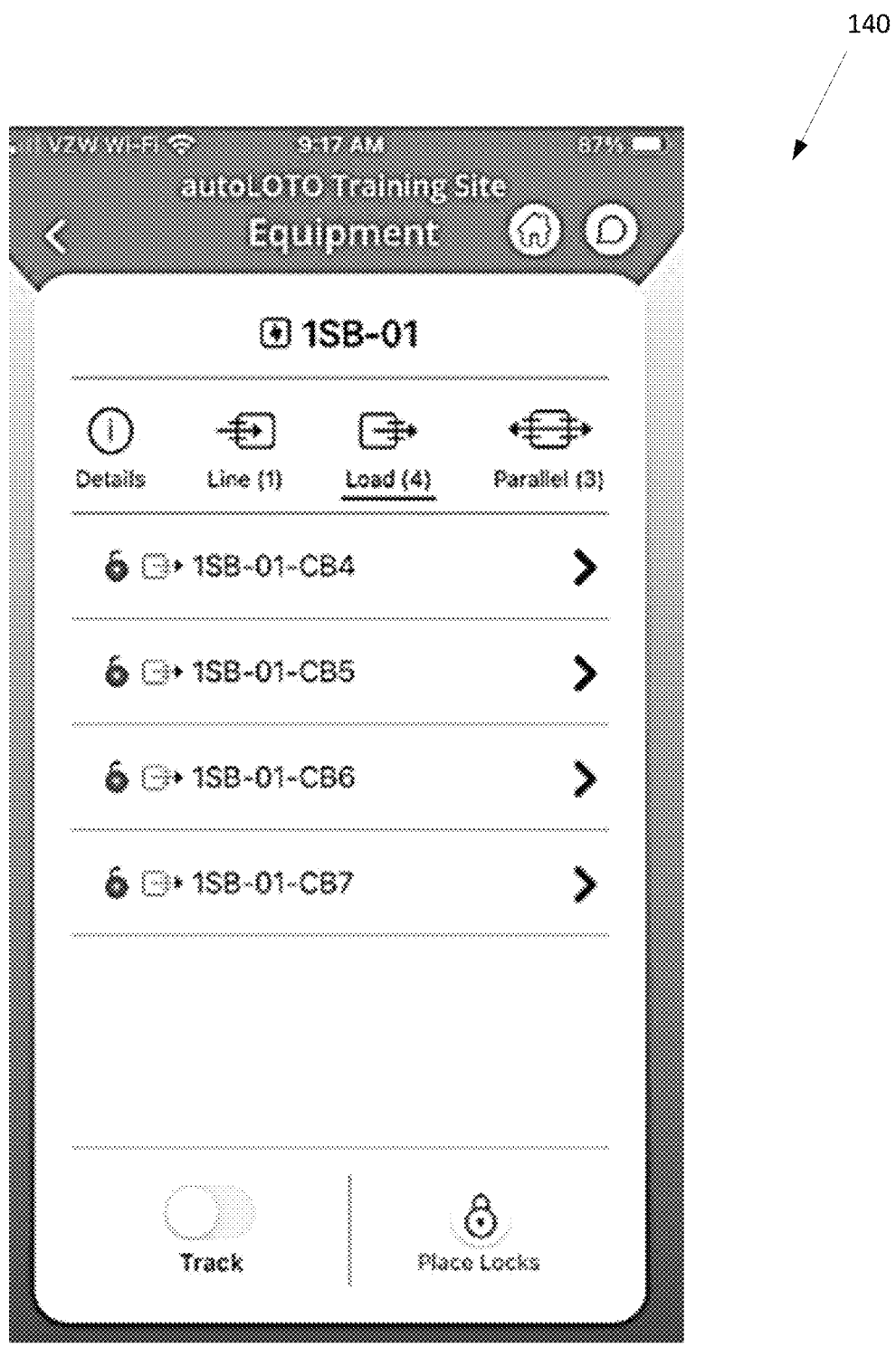
FIG. 38 shows a screen shot view of the interface shown in FIG. 37; the view showing a list of loads connected to the equipment that appears after clicking on the load tap at the top of the interface.
Figure 39:
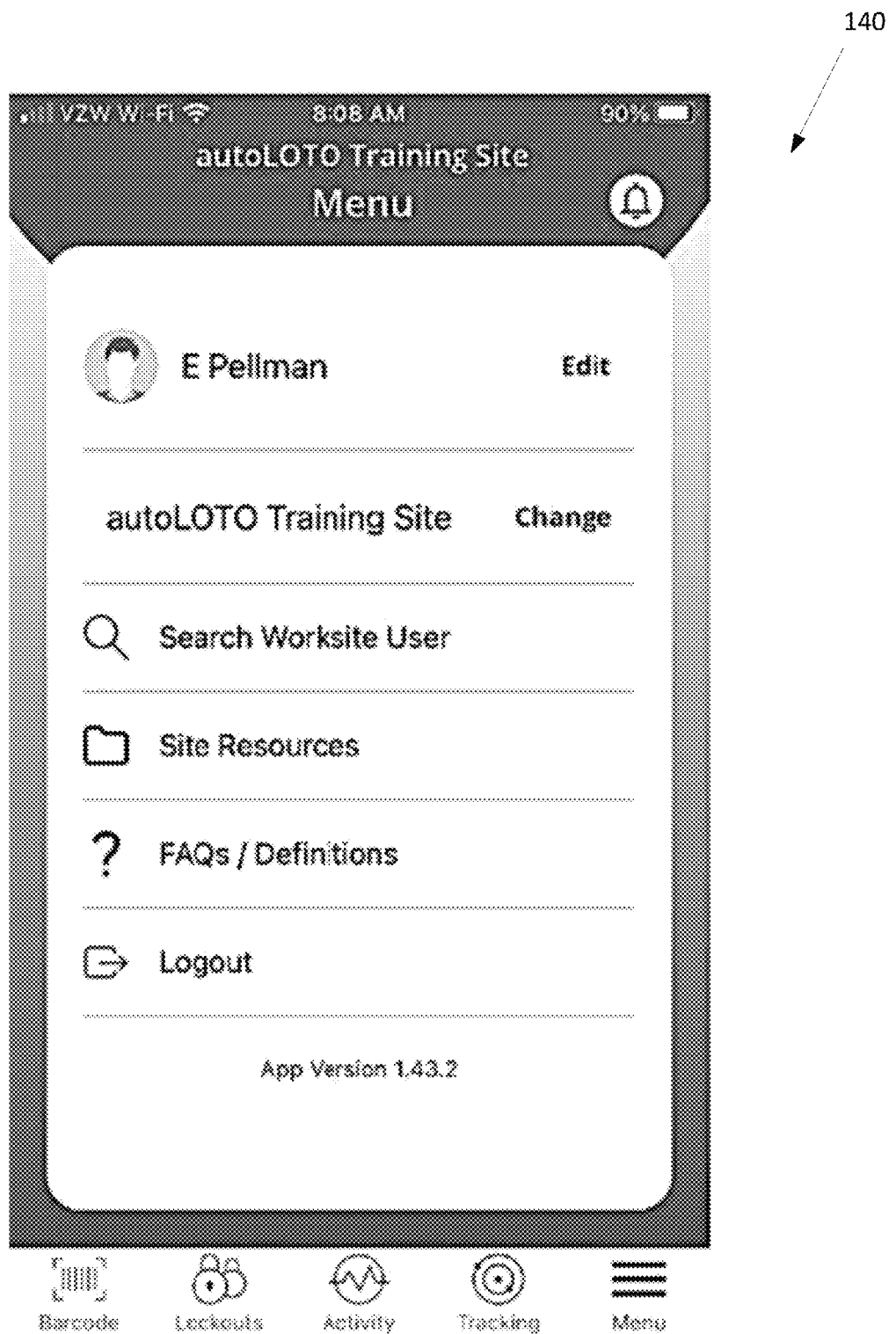
FIG. 39 shows a screen shot view of an example graphical user interface provided by an application on a personal electronic device communicatively connected to a back-end system of the system shown in FIG. 5, in accordance with one or more arrangements; the view showing a menu screen interface configured to facilitate easy access to: user profile settings, selection of current project/worksite, user search interface, and site resources.
Figure 40:
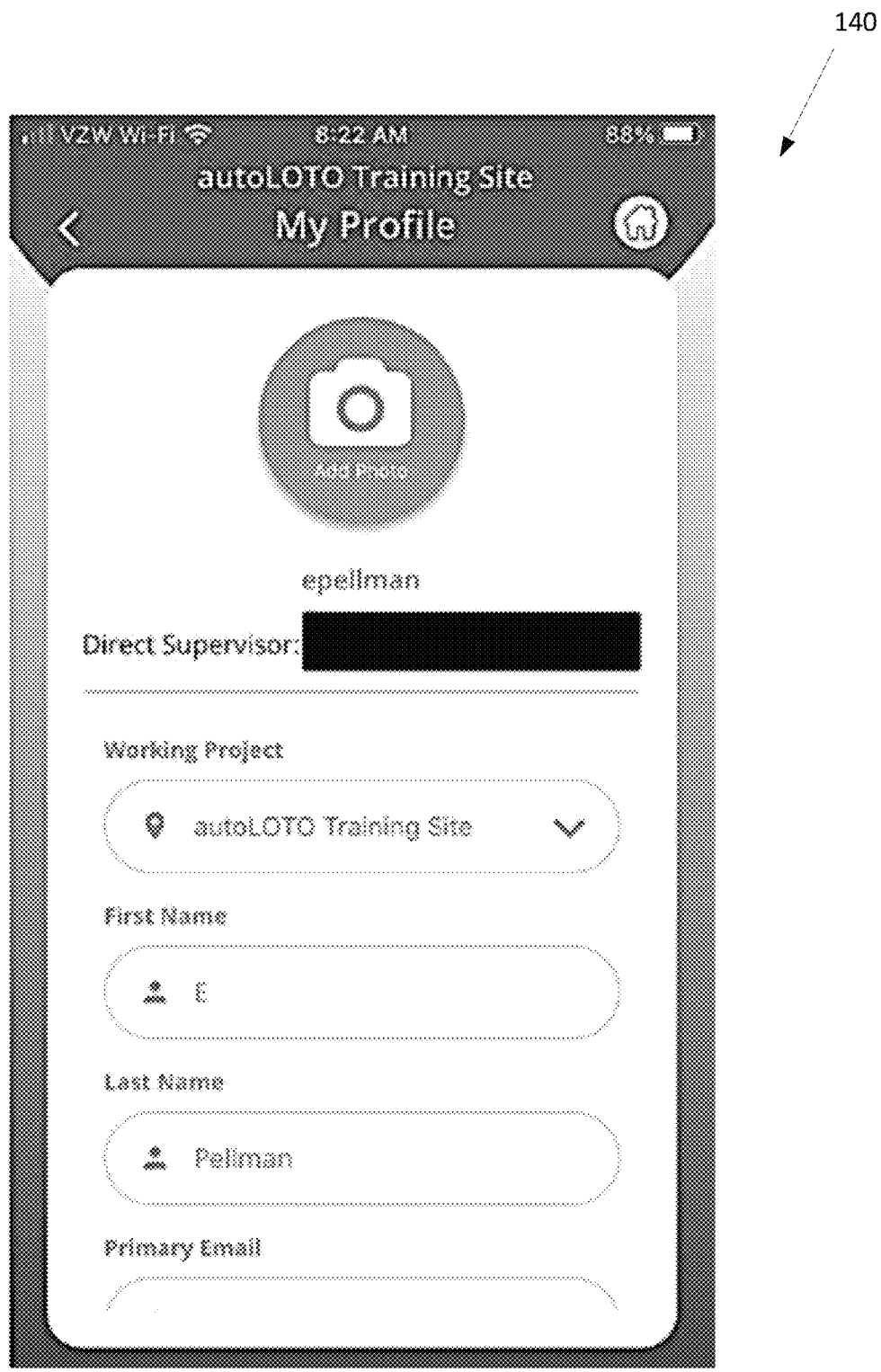
FIG. 40 shows a screen shot view of an example graphical user interface provided by an application on a personal electronic device communicatively connected to a back-end system of the system shown in FIG. 5, in accordance with one or more arrangements; the view showing an interface for review/configuration of profile and/or contact information for a user
Figure 41:
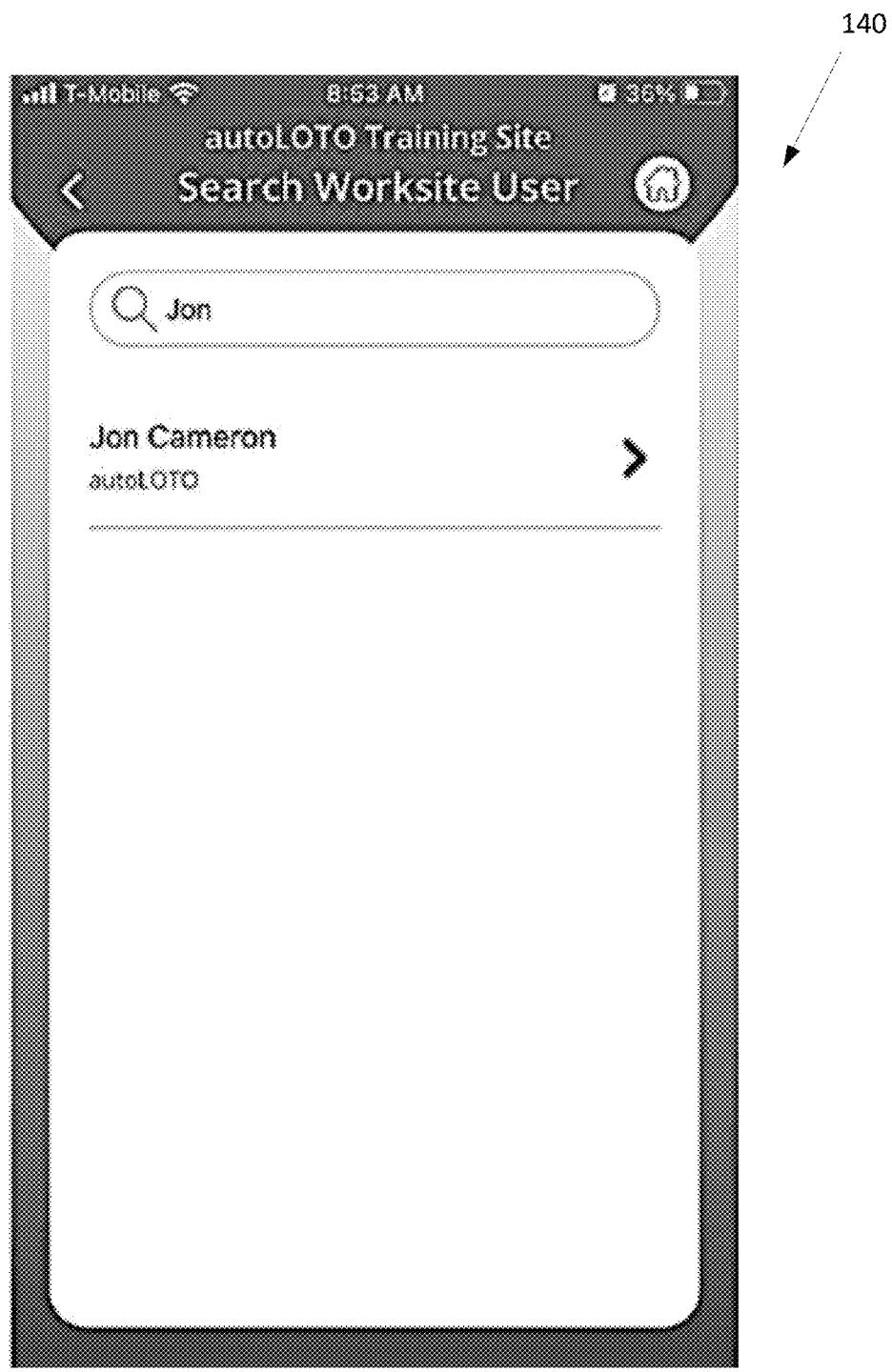
FIG. 41 shows a screen shot view of an example graphical user interface provided by an application on a personal electronic device communicatively connected to a back-end system of the system shown in FIG. 5, in accordance with one or more arrangements; the view showing an interface for search of users assigned to the current worksite/project.
Figure 42:
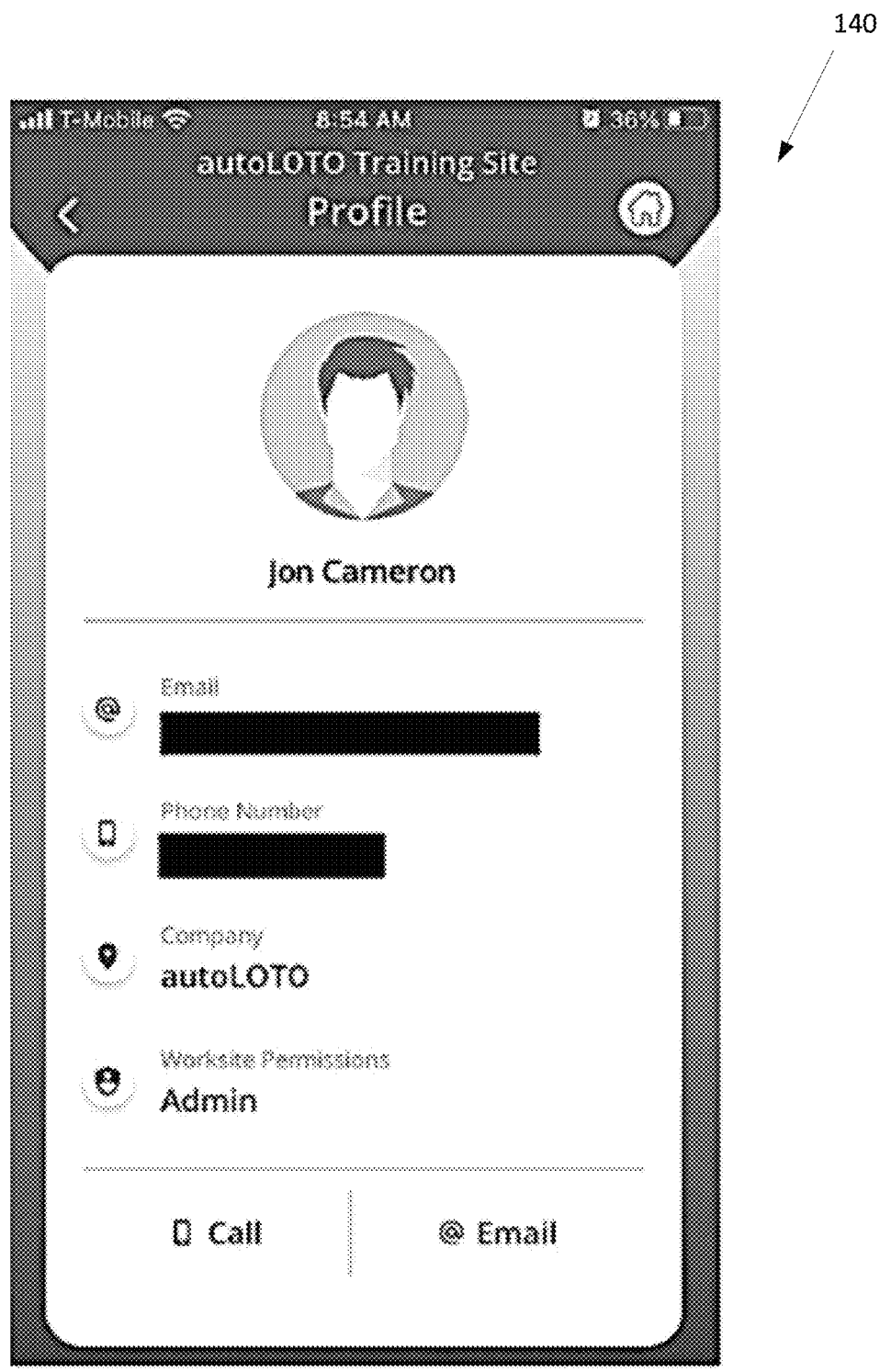
FIG. 42 shows a screen shot view of an example graphical user interface provided by an application on a personal electronic device communicatively connected to a back-end system of the system shown in FIG. 5, in accordance with one or more arrangements; the view showing details of a particular user selected from the results of a user search via the interface shown in FIG. 41; the view showing interface buttons for easy contact of the shown user.
Figure 43:
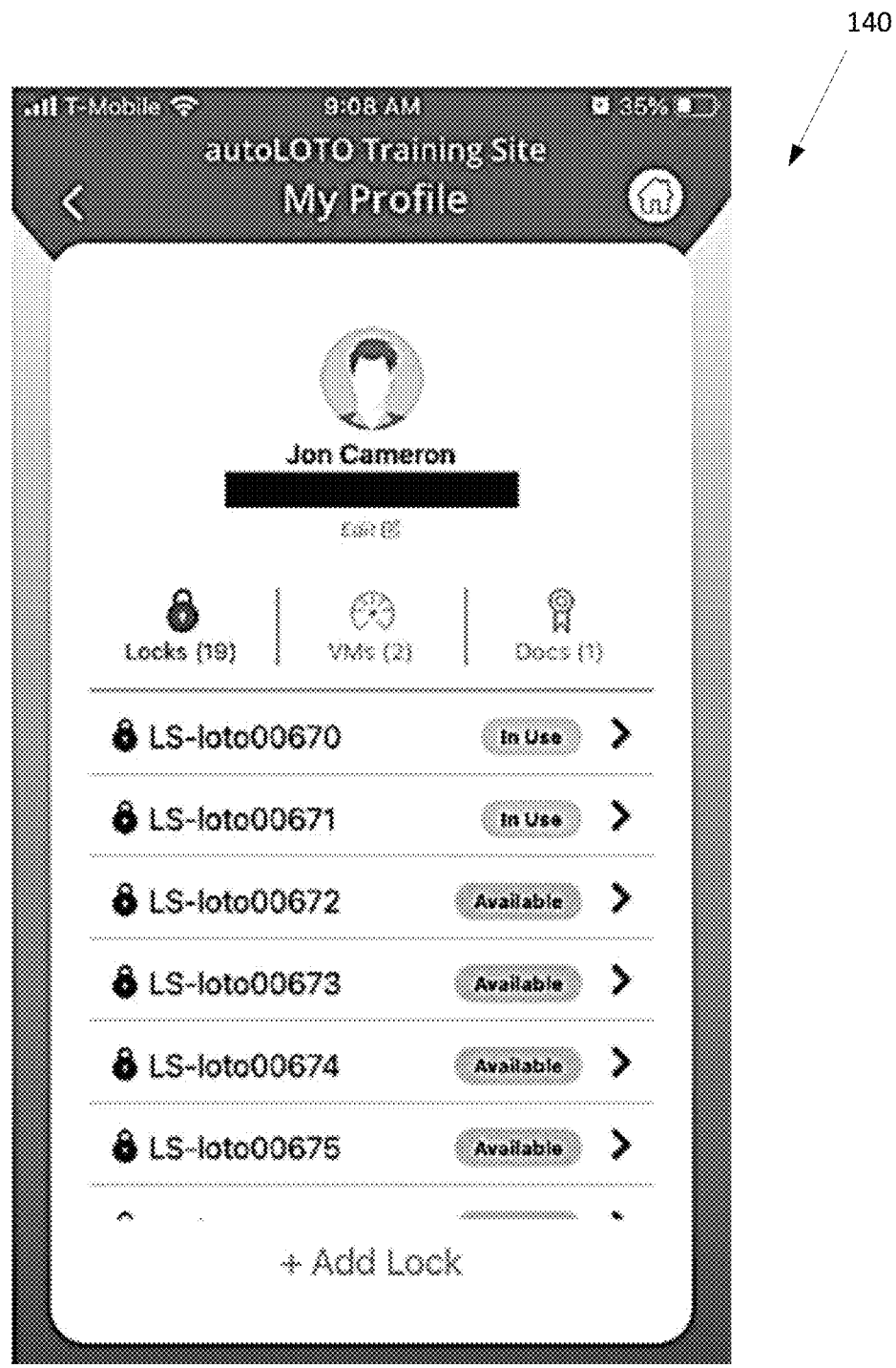
FIG. 43 shows a screen shot view of an example graphical user interface provided by an application on a personal electronic device communicatively connected to a back-end system of the system shown in FIG. 5, in accordance with one or more arrangements; the view showing an interface screen that appears after clicking on the user name or profile picture of the menu screen interface shown in FIG. 39; the interface screen providing access to view all locks, lockboxes, voltmeters, and documents assigned to a user.
Figure 44:
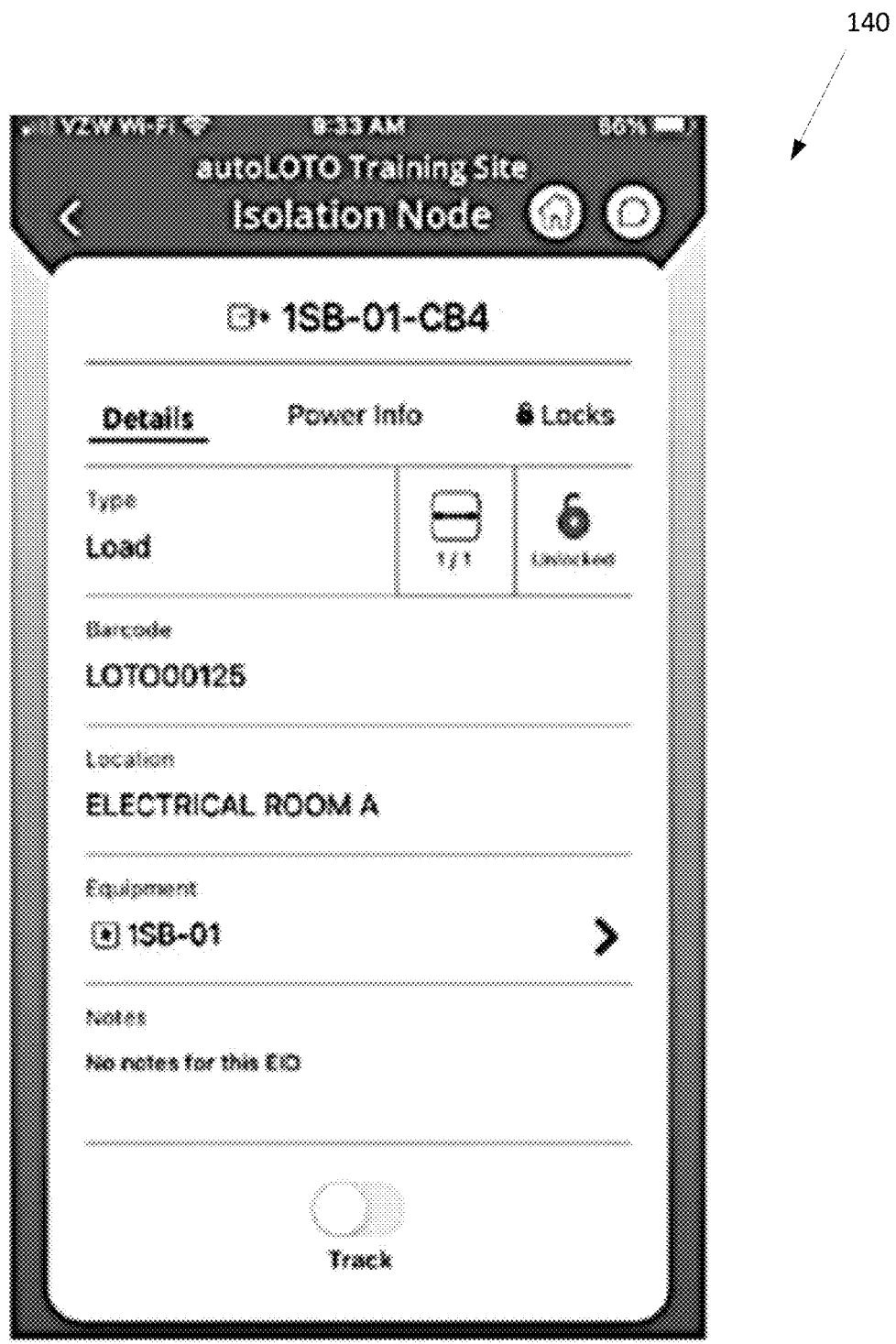
FIG. 44 shows a screen shot view of an example graphical user interface provided by an application on a personal electronic device communicatively connected to a back-end system of the system shown in FIG. 5, in accordance with one or more arrangements; the view showing an interface screen for management of a selected EID; the view showing details of the isolation node that are accessible by clicking on a details tab at the top of the interface screen.
Figure 45:
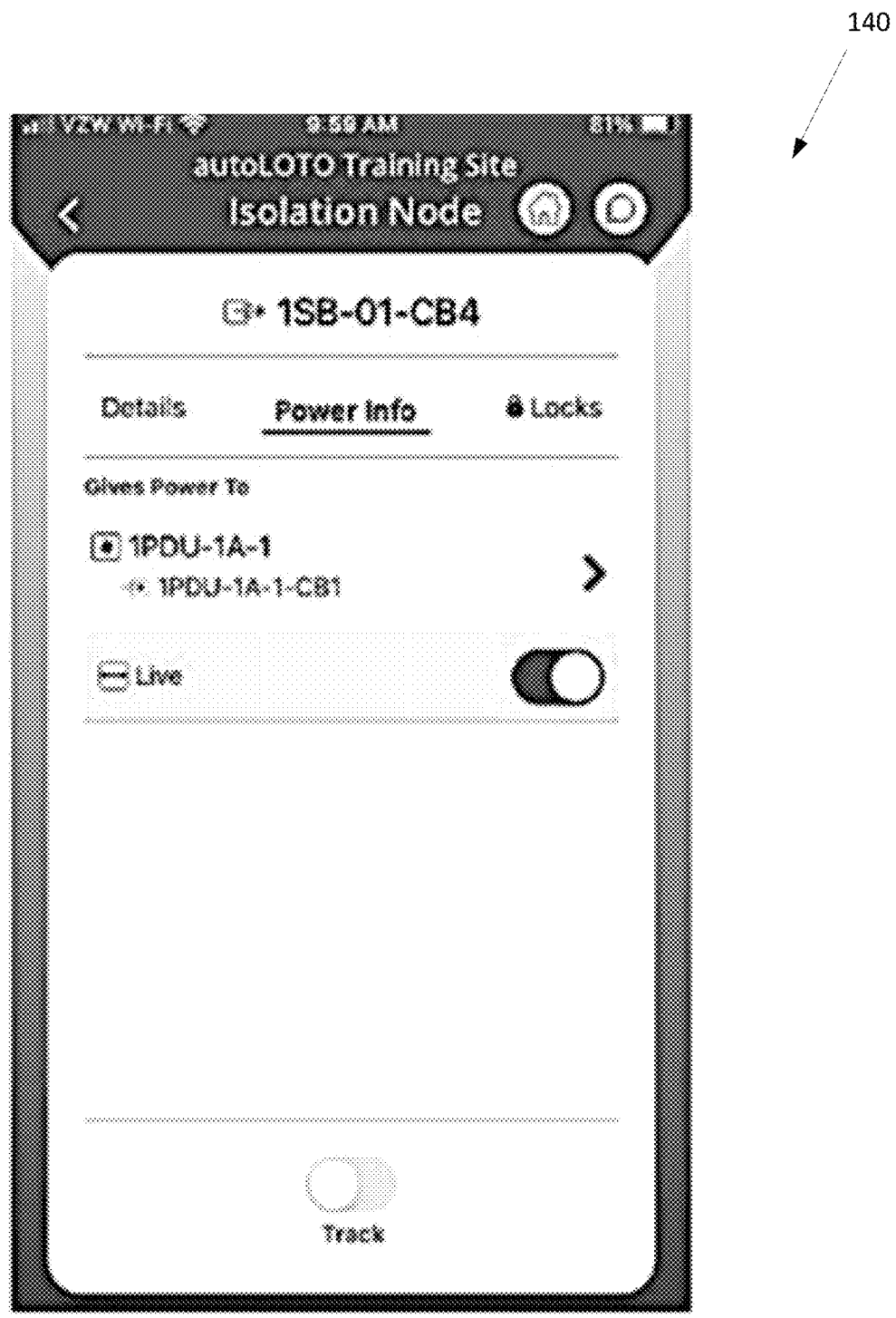
FIG. 45 shows another screen shot view of the interface shown in FIG. 44, in accordance with one or more arrangements; the view showing equipment powered by the EID, which is accessible by clicking on a details tab at the top of the interface screen.
Figure 46:
FIG. 46 shows another screen shot view of the interface shown in FIG. 44, in accordance with one or more arrangements; the view showing locks present on the selected EID, which is accessible by clicking on a locks tab at the top of the interface screen.
Figure 47:
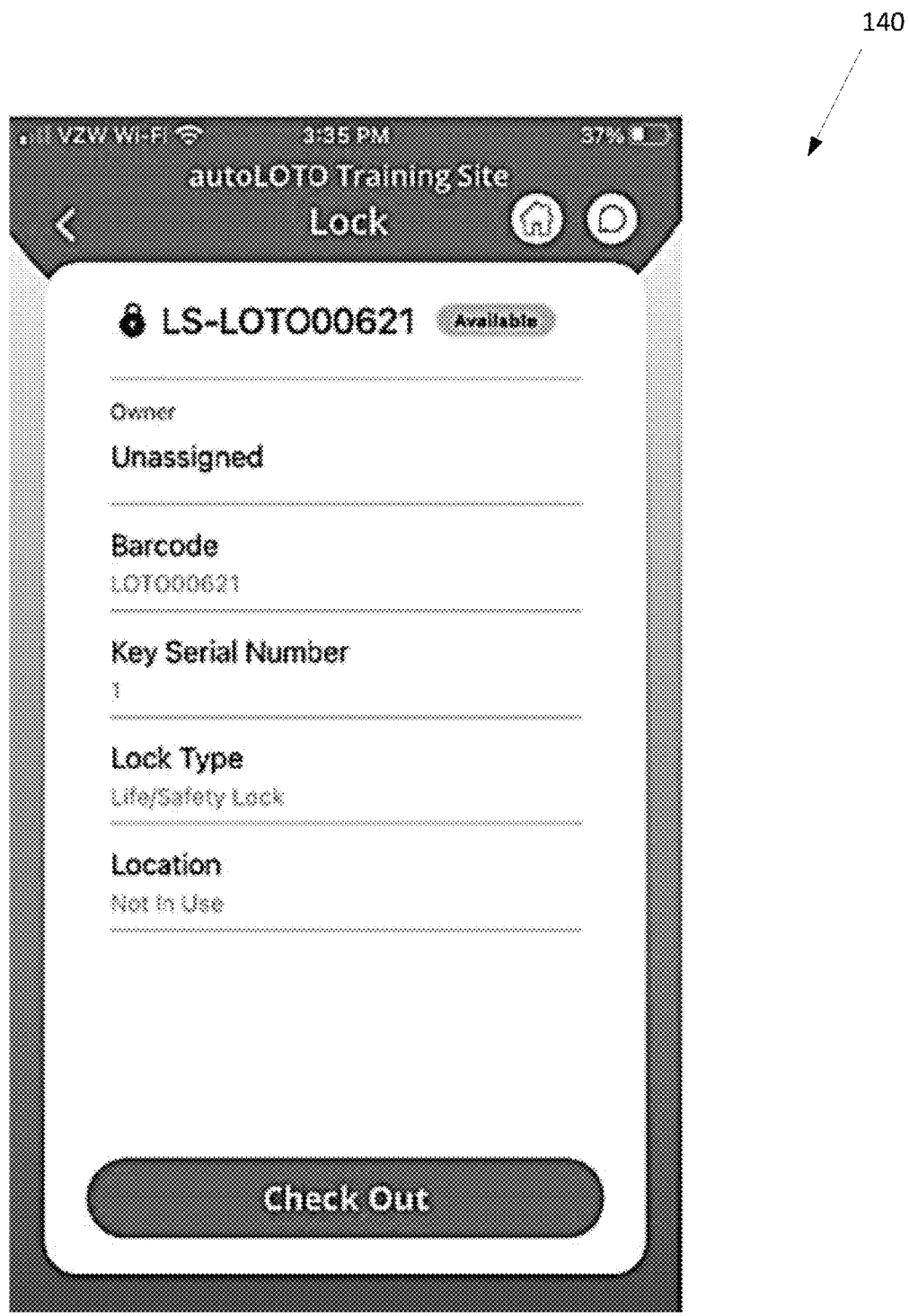
FIG. 47 shows a screen shot view of an example graphical user interface provided by an application on a personal electronic device communicatively connected to a back-end system of the system shown in FIG. 5, in accordance with one or more arrangements; the view showing an interface screen to facilitate checkout of a lock that is identified by a user or scanned by a user, for example, using the interface shown in FIG. 31.
Figure 48:
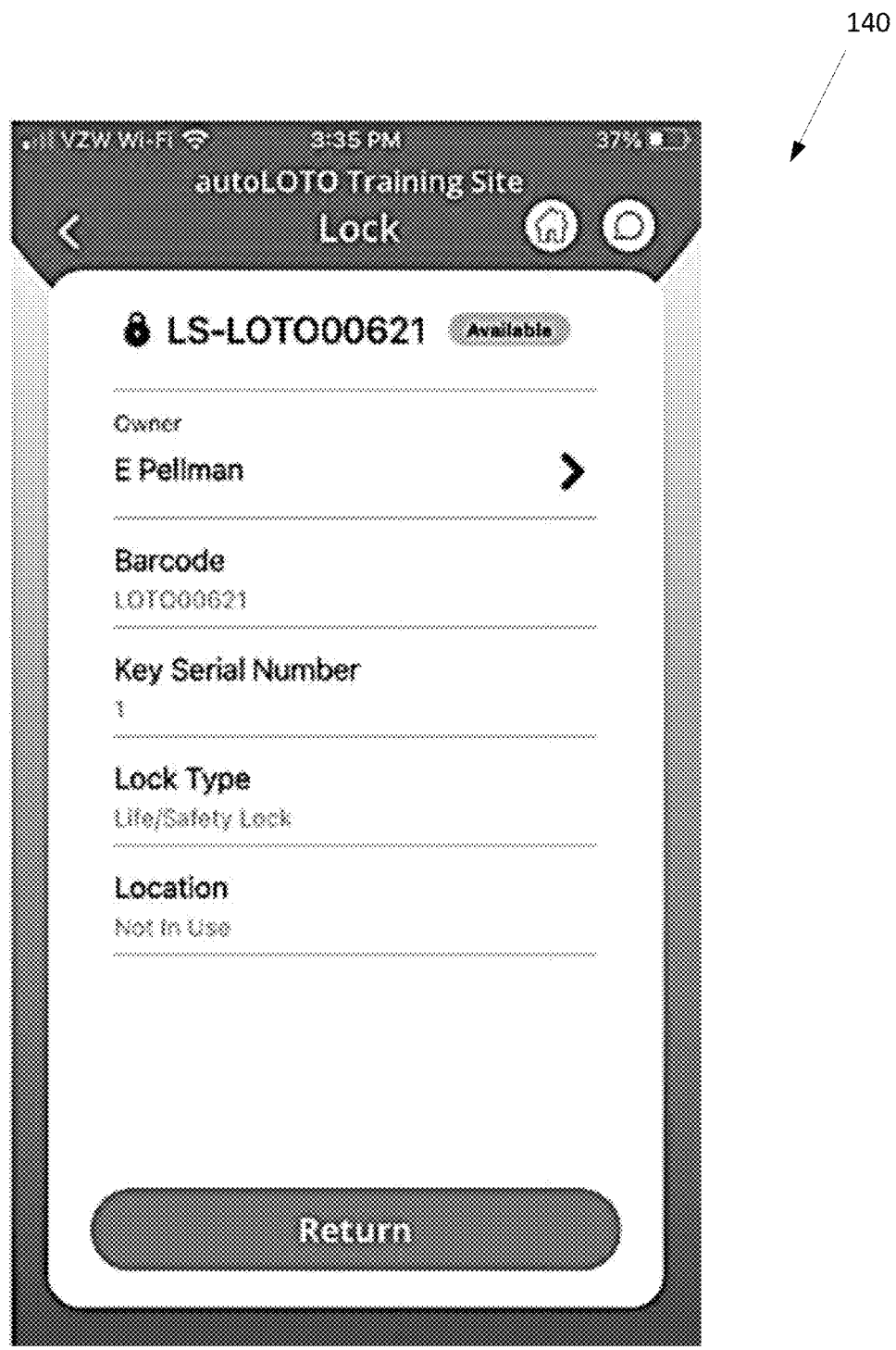
FIG. 48 shows a screen shot view of an example graphical user interface provided by an application on a personal electronic device communicatively connected to a back-end system of the system shown in FIG. 5, in accordance with one or more arrangements; the view showing an interface screen to facilitate return of a lock that has been checked out by a user.
Figure 49:
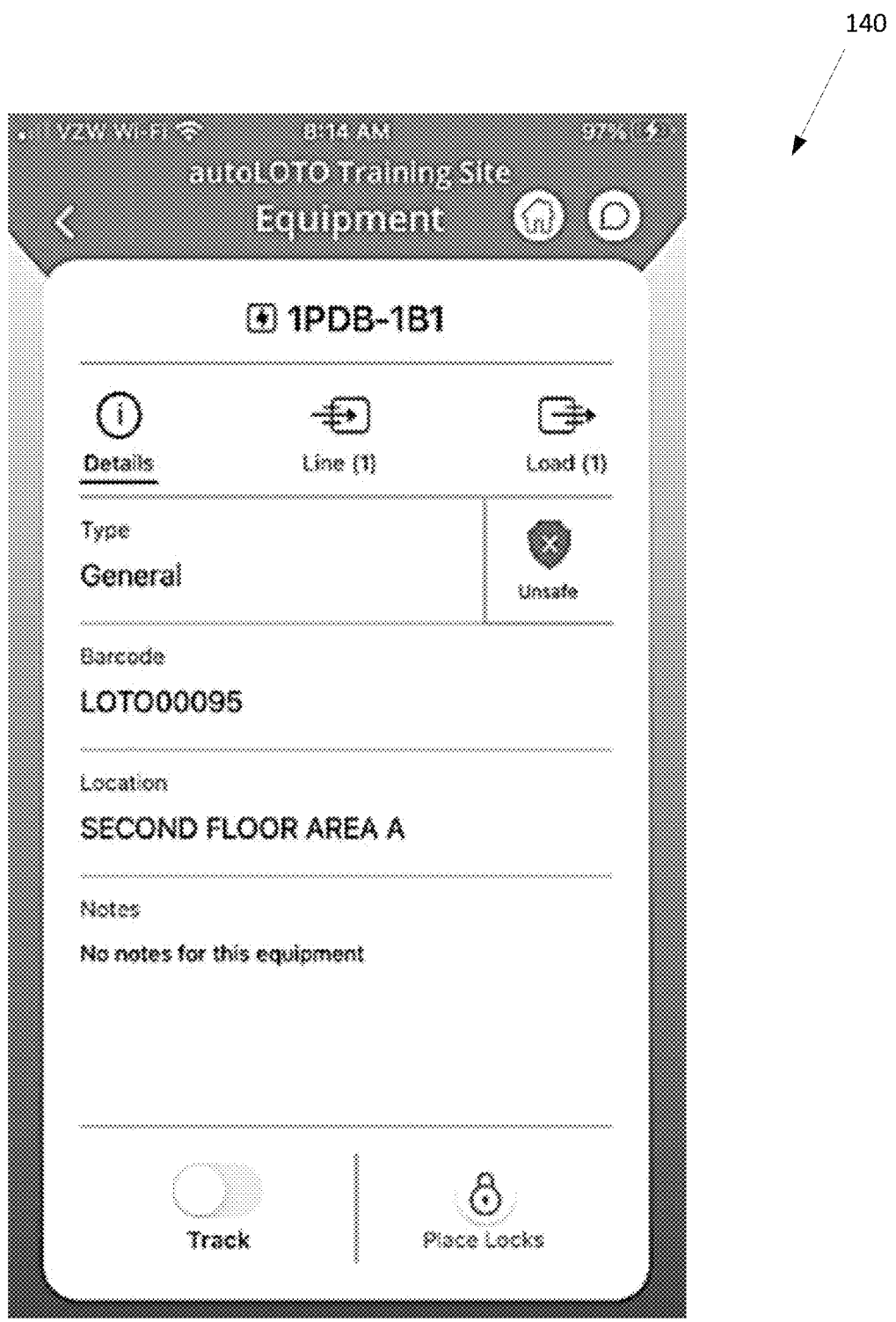
FIG. 49 shows a screen shot view of an example graphical user interface provided by an application on a personal electronic device communicatively connected to a back-end system of the system shown in FIG. 5, in accordance with one or more arrangements; the view showing an interface screen to facilitate return of a lock that has been checked out by a user.
Figure 50:
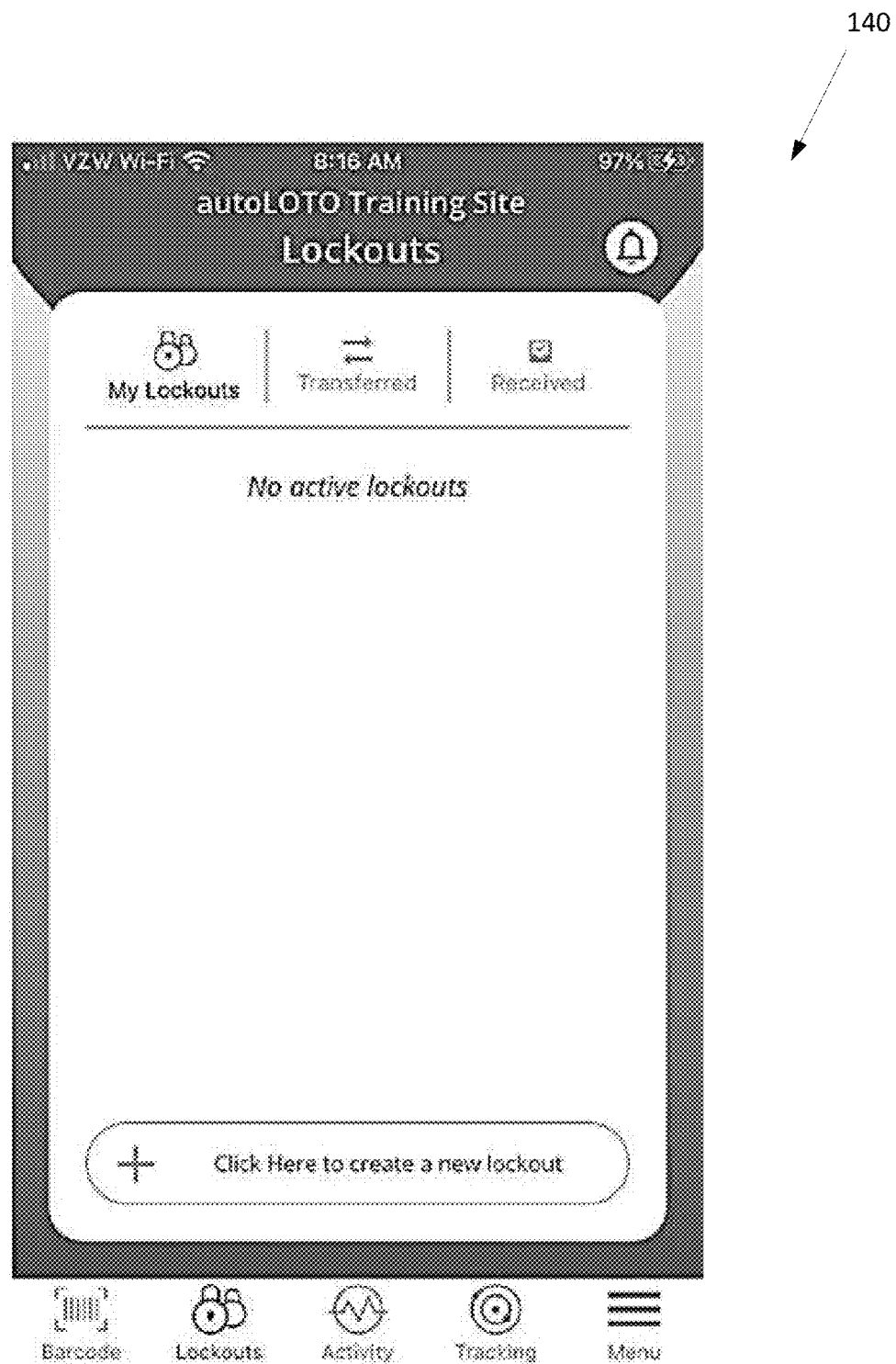
FIG. 50 shows a screen shot view of the interface screen shown in FIG. 33; the view showing a "my lockouts" tab of the interface for a user having no active LOTOs; the view showing the interface having a button for user to initiate creation of a new LOTO.
Figure 51:
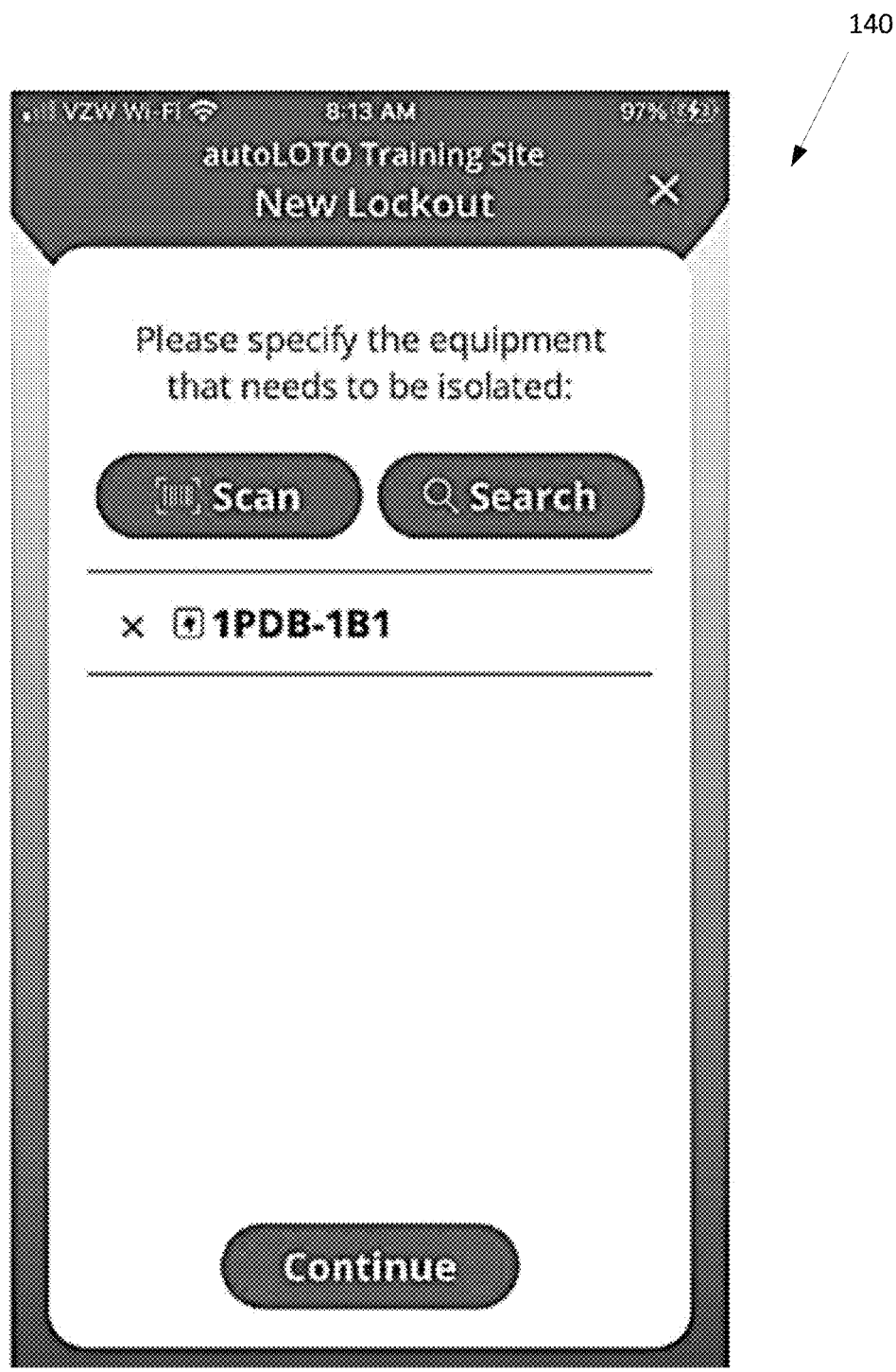
FIG. 51 shows a screen shot view of an interface for creation of a new LOTO that appears in response to a user clicking on the lower button shown in FIG. 50, in accordance with one or more arrangements; from this interface a user may scan or search for equipment to be added to the LOTO or select equipment to be removed from the LOTO as required; the view showing one piece of equipment included in the LOTO.
Figure 52:
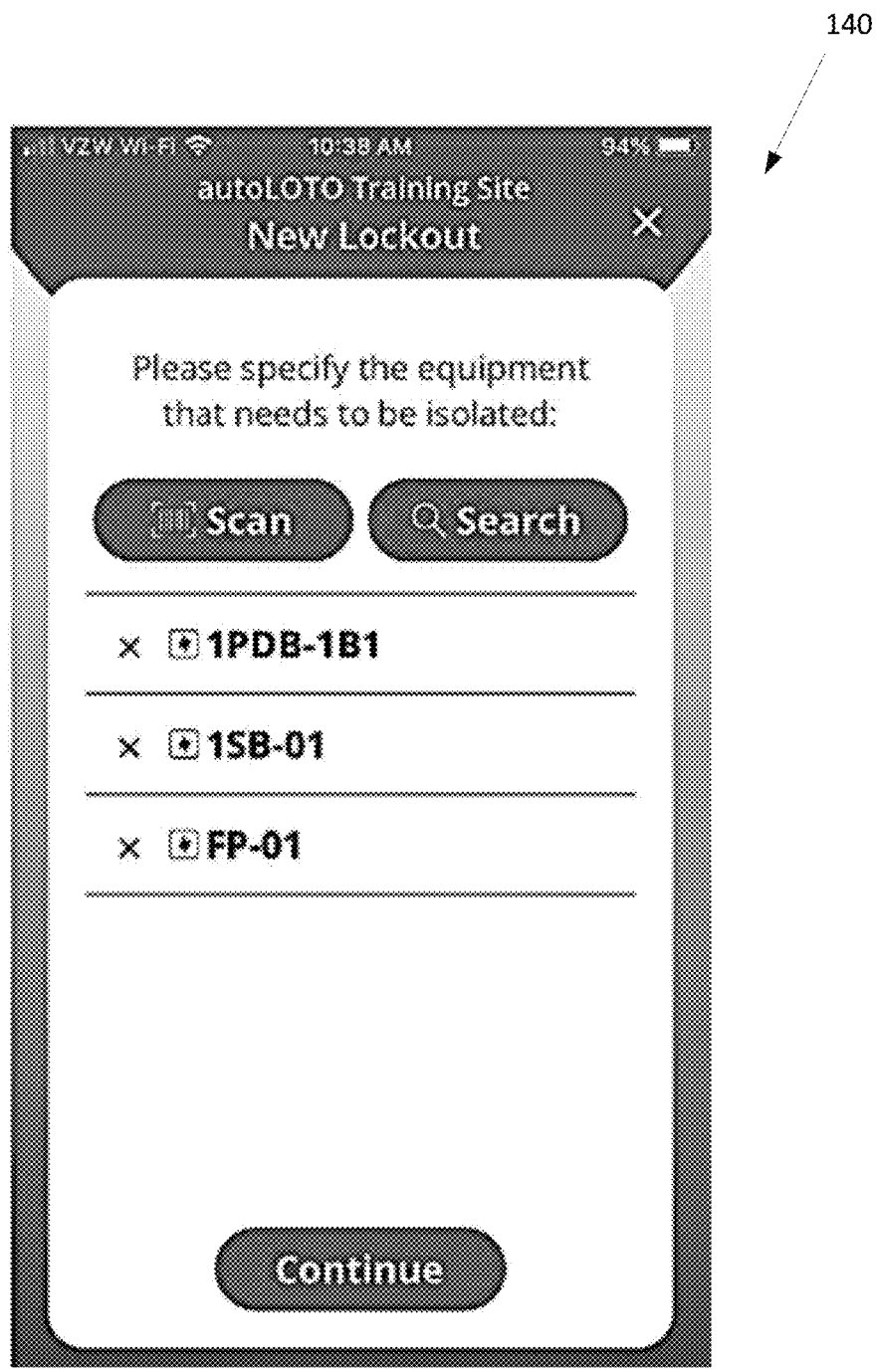
FIG. 52 shows a screen shot view of the interface screen shown in FIG. 52; the view showing three pieces of equipment included in the LOTO.
Figure 53:
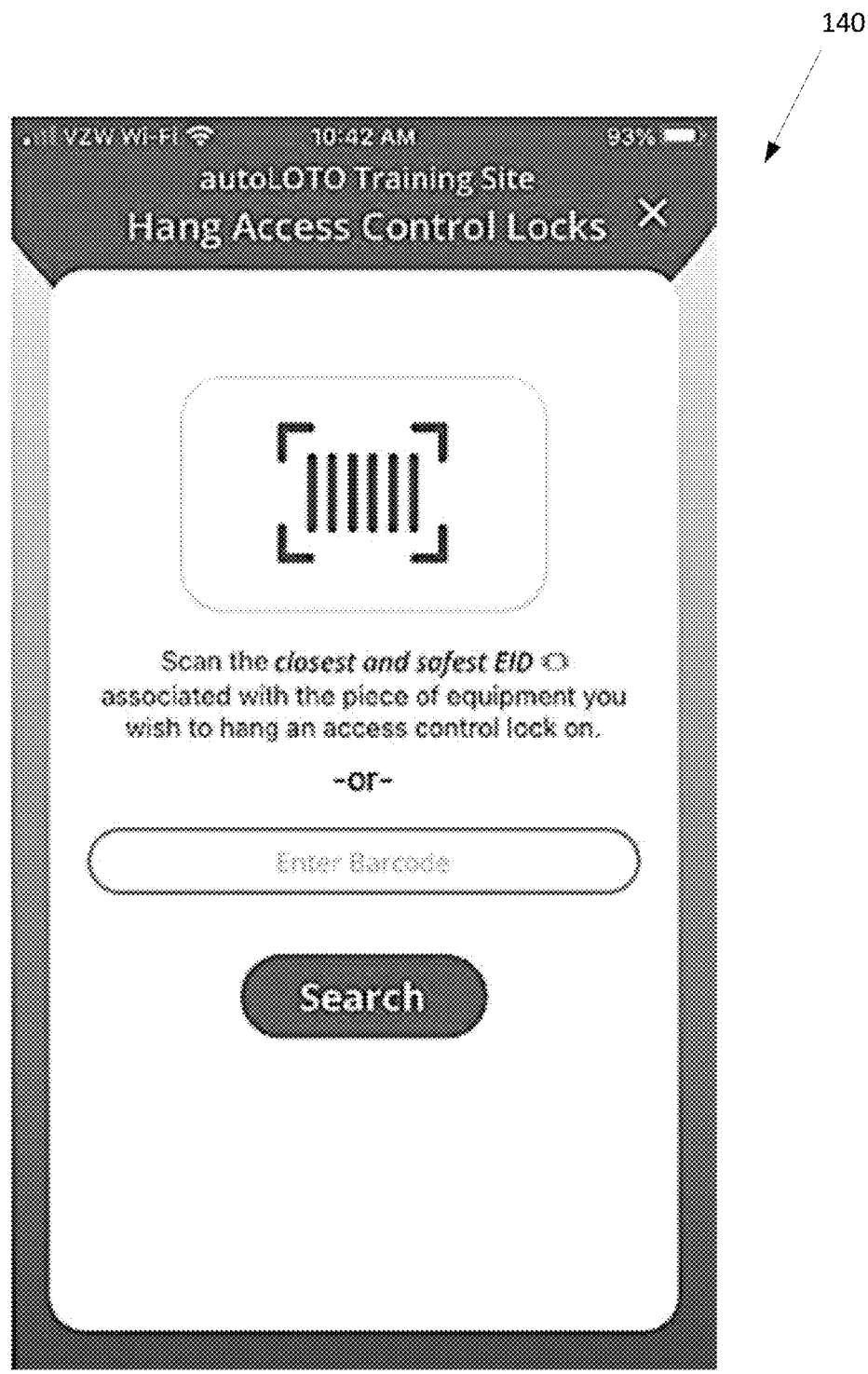
FIG. 53 shows a screen shot view of an interface for user to hang an access control lock, in accordance with one or more arrangements.
Figure 54:
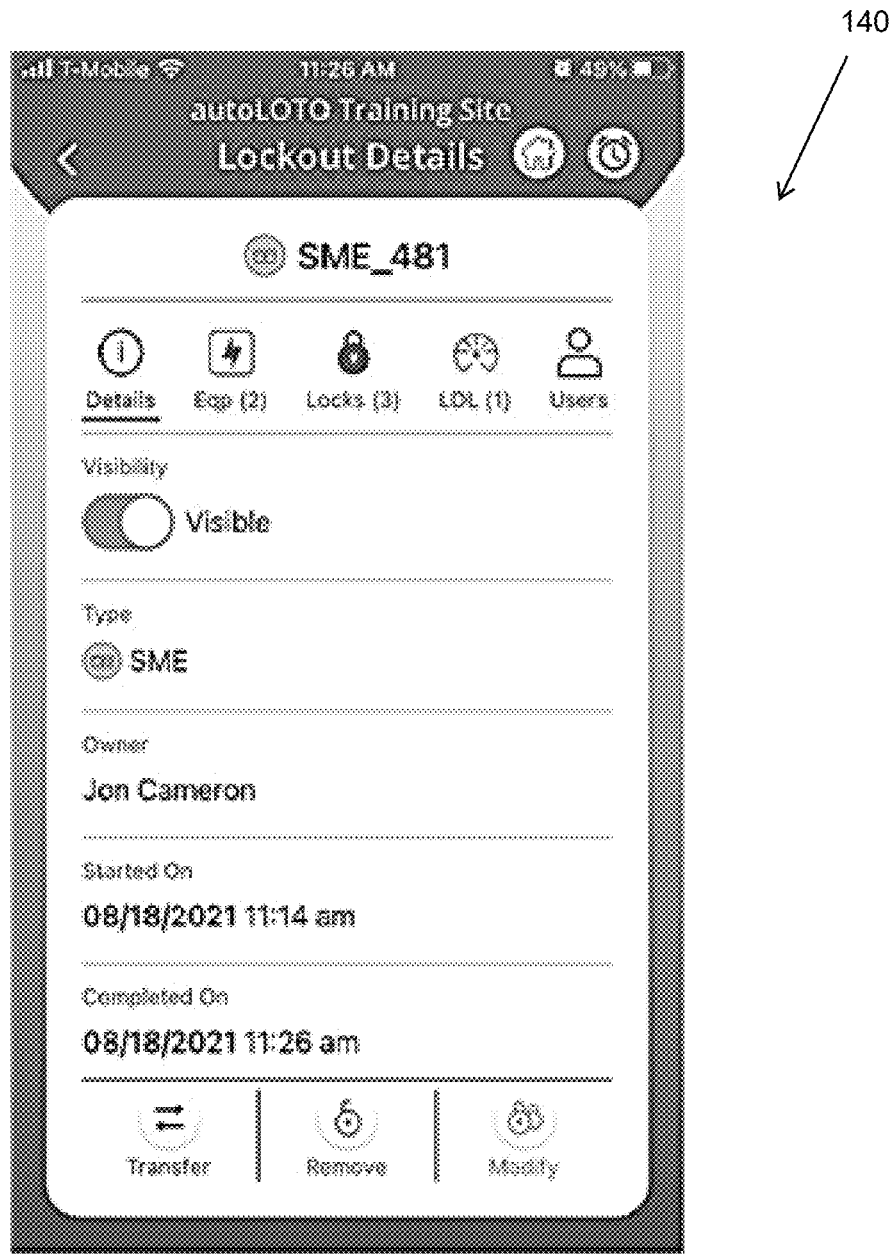
FIG. 54 shows a screen shot view of an example graphical user interface provided by an application on a personal electronic device communicatively connected to a back-end system of the system shown in FIG. 5, in accordance with one or more arrangements; the view showing an interface screen for review and management of a LOTO; the view showing details for an example SME type LOTO configured to be visible to other users.
Figure 55:
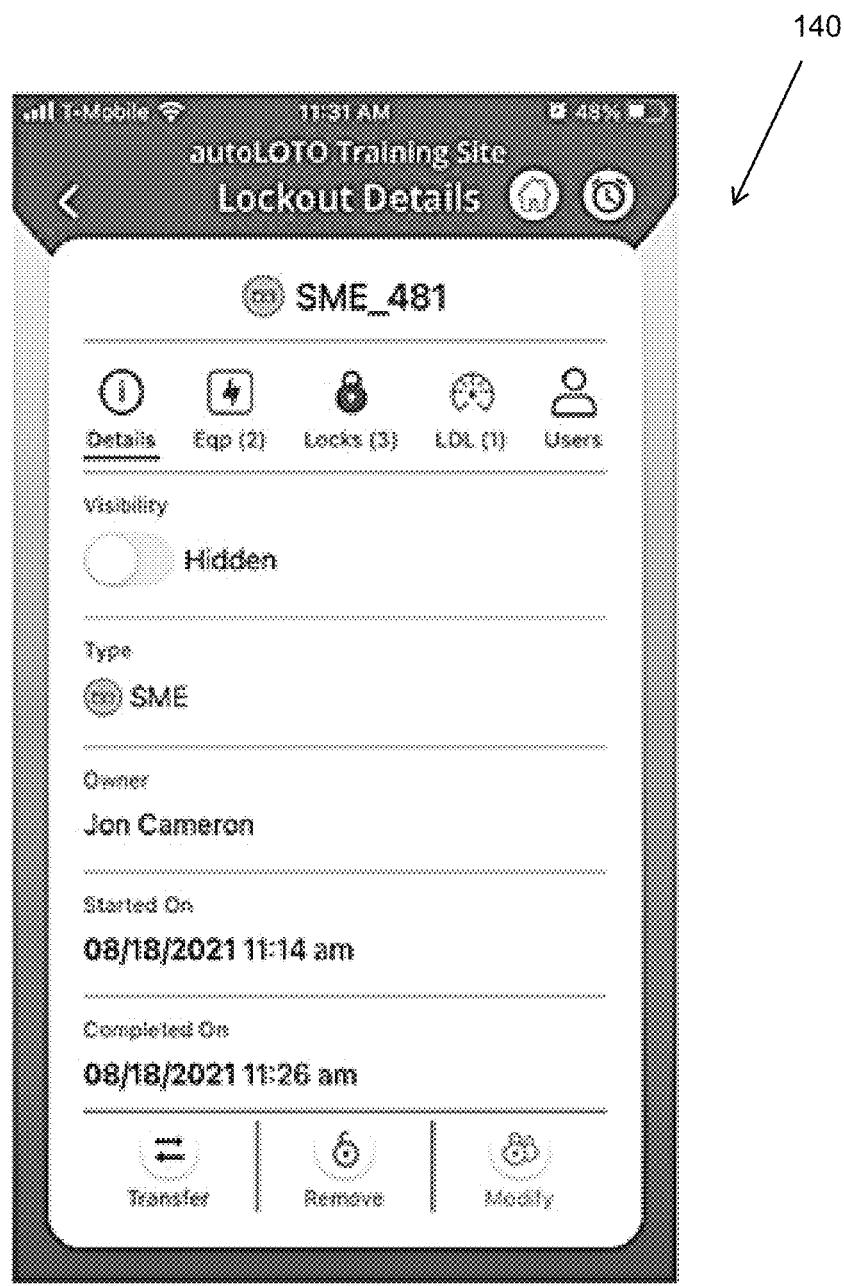
FIG. 55 shows a screen shot view of the interface screen shown in FIG. 54 for review and management of a LOTO; the view showing details for an example SME type LOTO configured to be invisible to other users.
Figure 56:
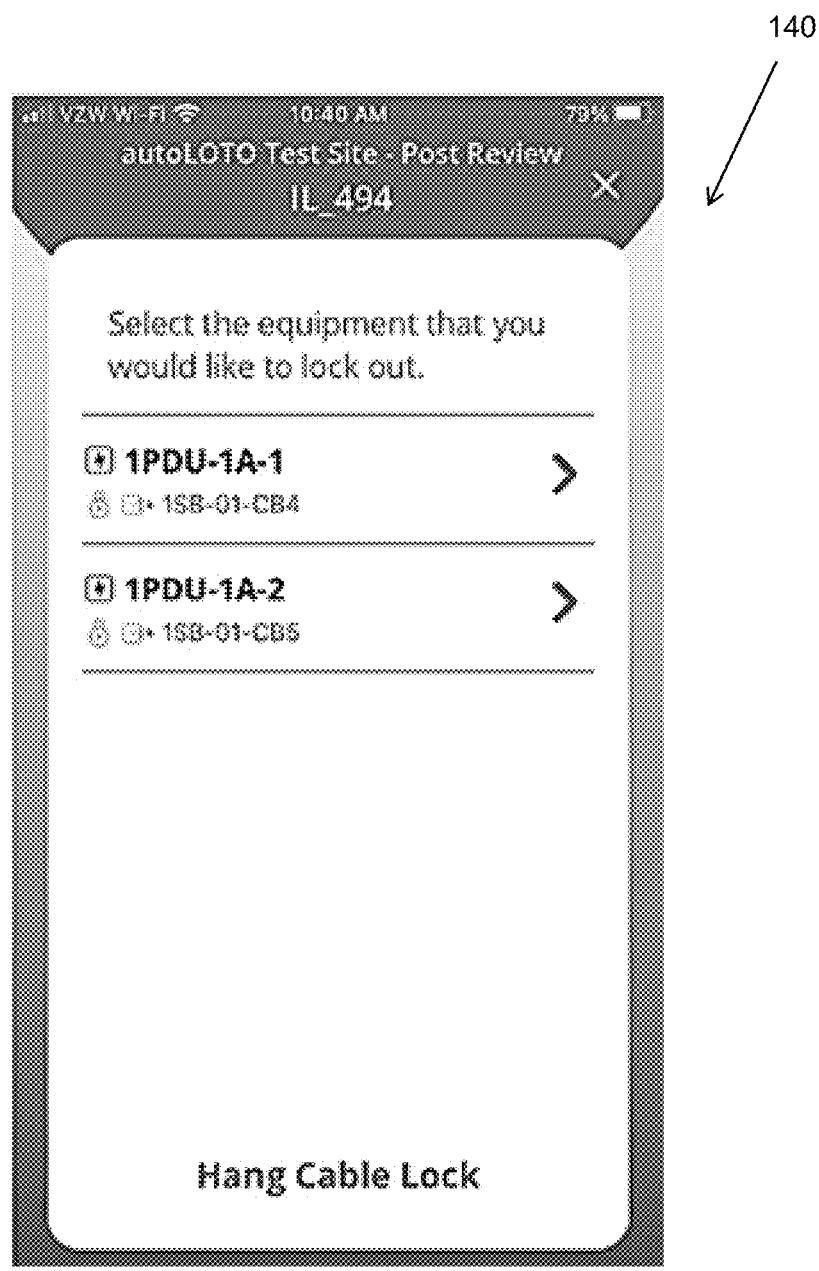
FIG. 56 shows a screen shot view of an example graphical user interface provided by an application on a personal electronic device communicatively connected to a back-end system of the system shown in FIG. 5, in accordance with one or more arrangements; the view showing an interface screen to initiate hanging of locks after LOTOs are created; the view showing a listing of equipment included in LOTOs of the user that the use may select to hang a lock.
Figure 57:
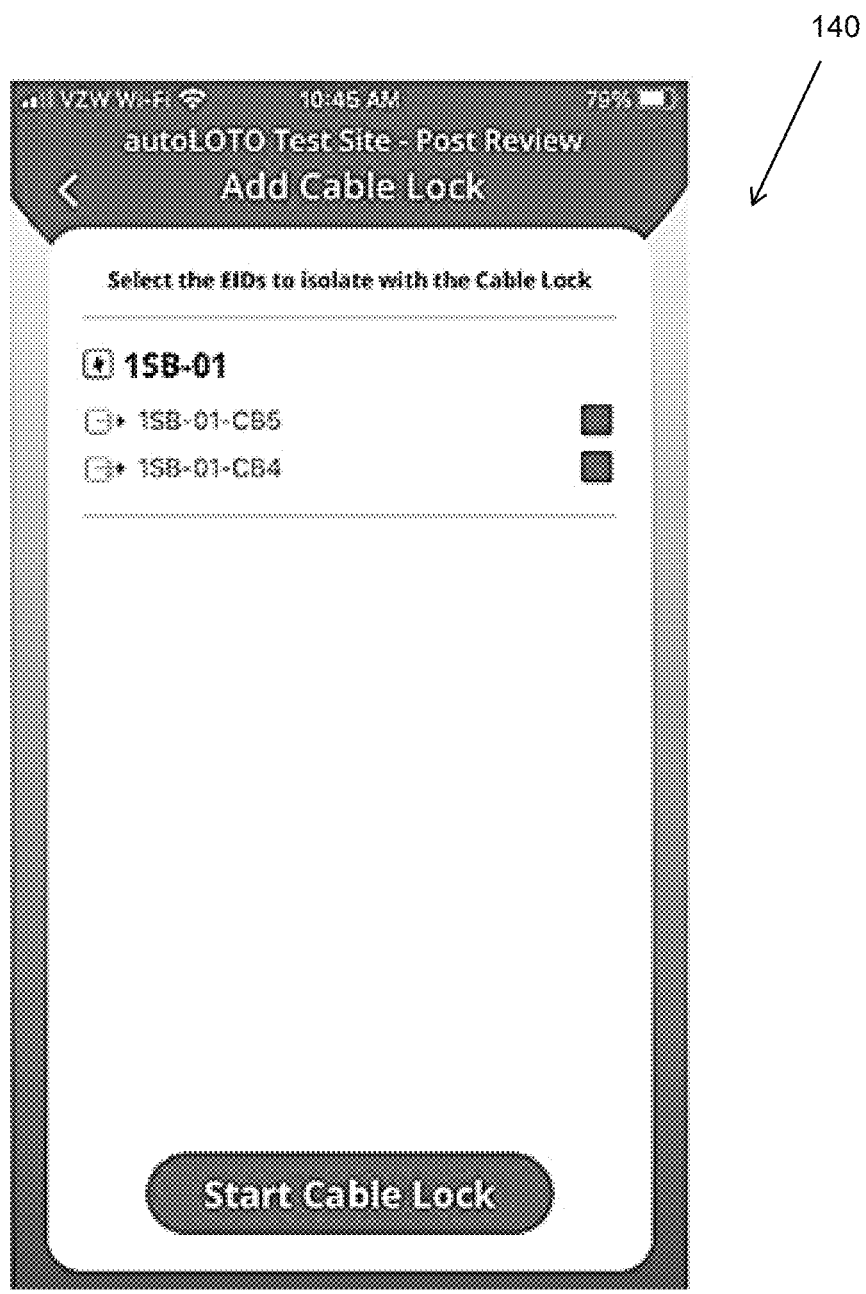
FIG. 57 shows a screen shot view of an example interface screen that appears after a user selects a piece of equipment in the interface shown in FIG. 56; the view showing EIDs of the selected piece of equipment for the LOTO.
Figure 58:
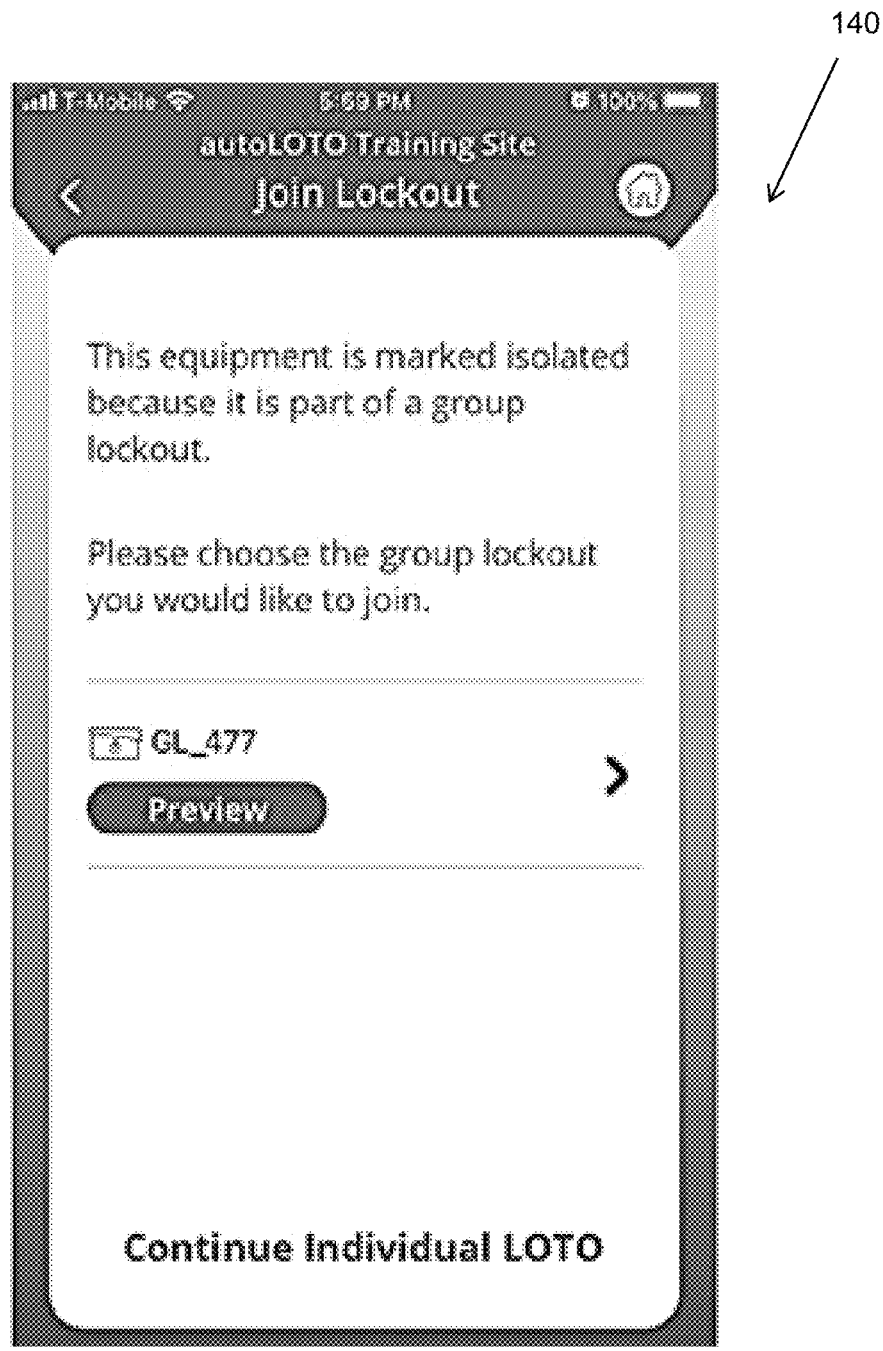
FIG. 58 shows a screen shot view of an example graphical user interface provided by an application on a personal electronic device communicatively connected to a back-end system of the system shown in FIG. 5, in accordance with one or more arrangements; the view showing an interface screen to facilitate a user joining of an existing group LOTO; In some arrangements, the interface screen is presented when user scans a piece of equipment in a group LOTO or by when the user initiates an individual LOTO on a piece of equipment in an active group LOTO; the view showing the interface having buttons providing the option to continue with individual LOTO or preview details of the group LOTO, where the user may join the group LOTO.
Figure 59:
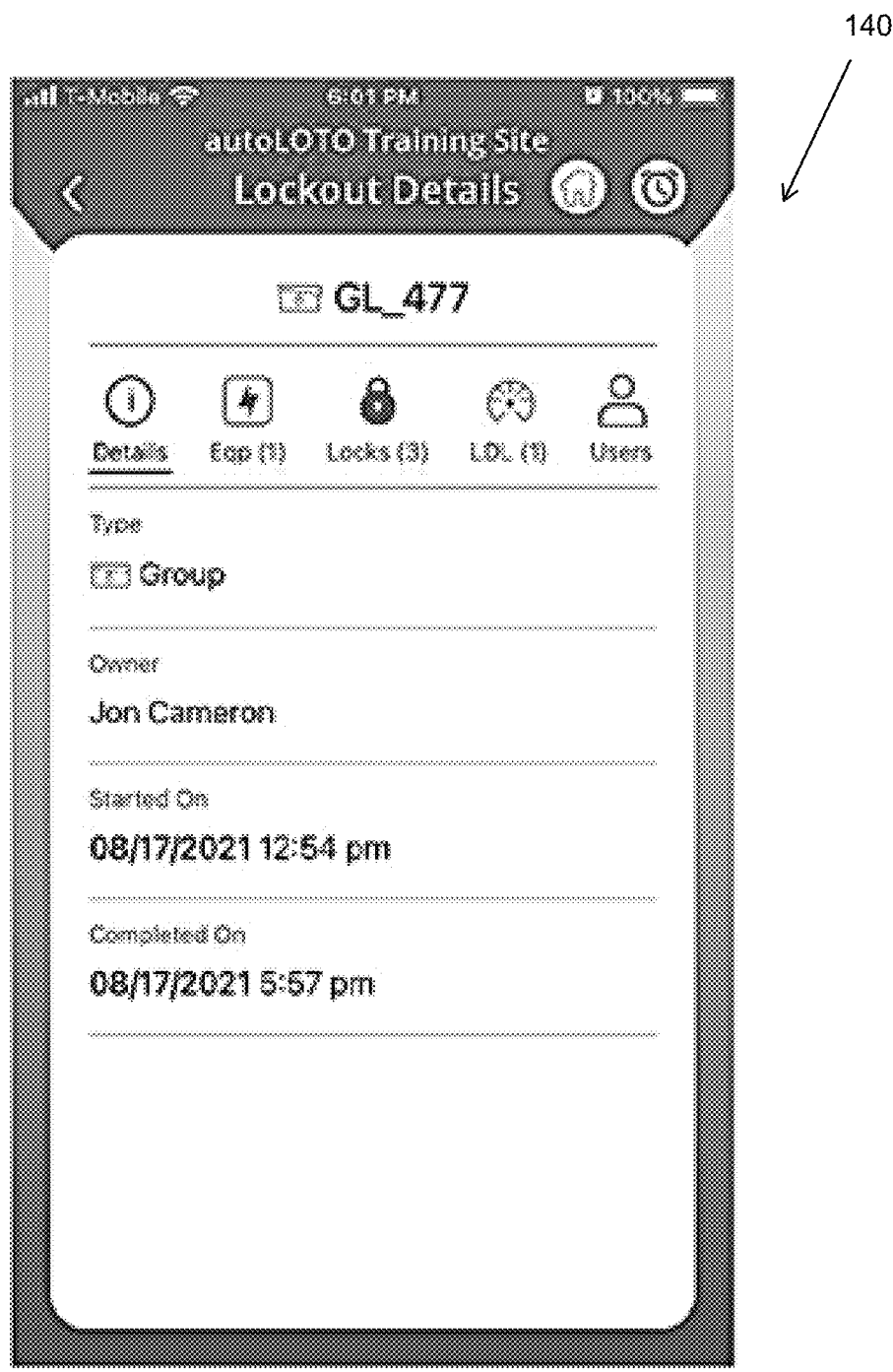
FIG. 59 shows a screen shot view of an example graphical user interface provided by an application on a personal electronic device communicatively connected to a back-end system of the system shown in FIG. 5, in accordance with one or more arrangements; the view showing an interface screen for review and management of a LOTO; the view showing details for an example group type LOTO.
Figure 60:
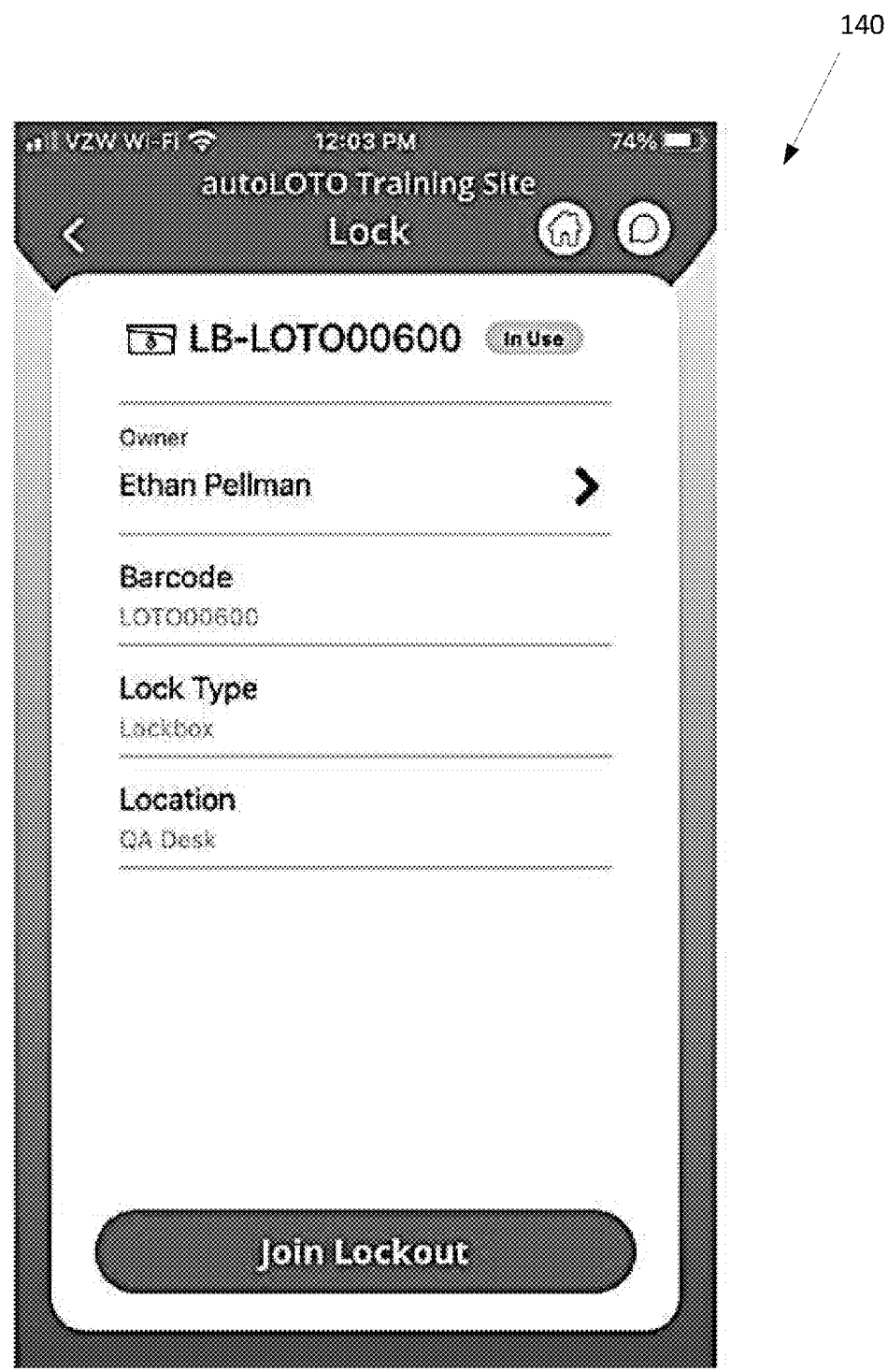
FIG. 60 shows a screen shot view of an example graphical user interface provided by an application on a personal electronic device communicatively connected to a back-end system of the system shown in FIG. 5, in accordance with one or more arrangements; the view showing an interface screen that is presented if a user selects to join a group LOTO; the interface showing details of the owner of group LOTO.
Figure 61:
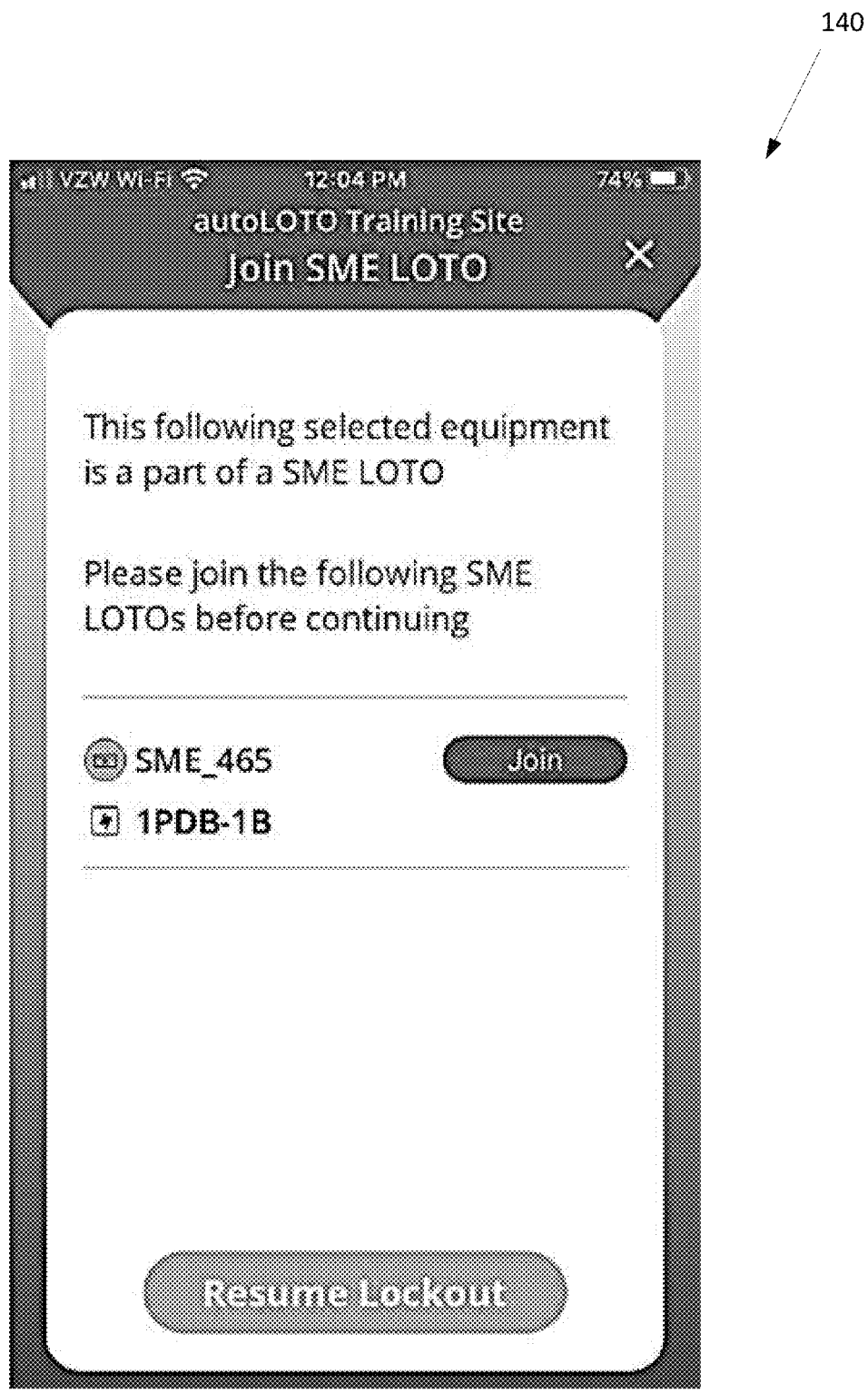
FIG. 61 shows a screen shot view of an example graphical user interface provided by an application on a personal electronic device communicatively connected to a back-end system of the system shown in FIG. 5, in accordance with one or more arrangements; the view showing an interface screen to facilitate a user joining an SME type LOTO.
Figure 62:
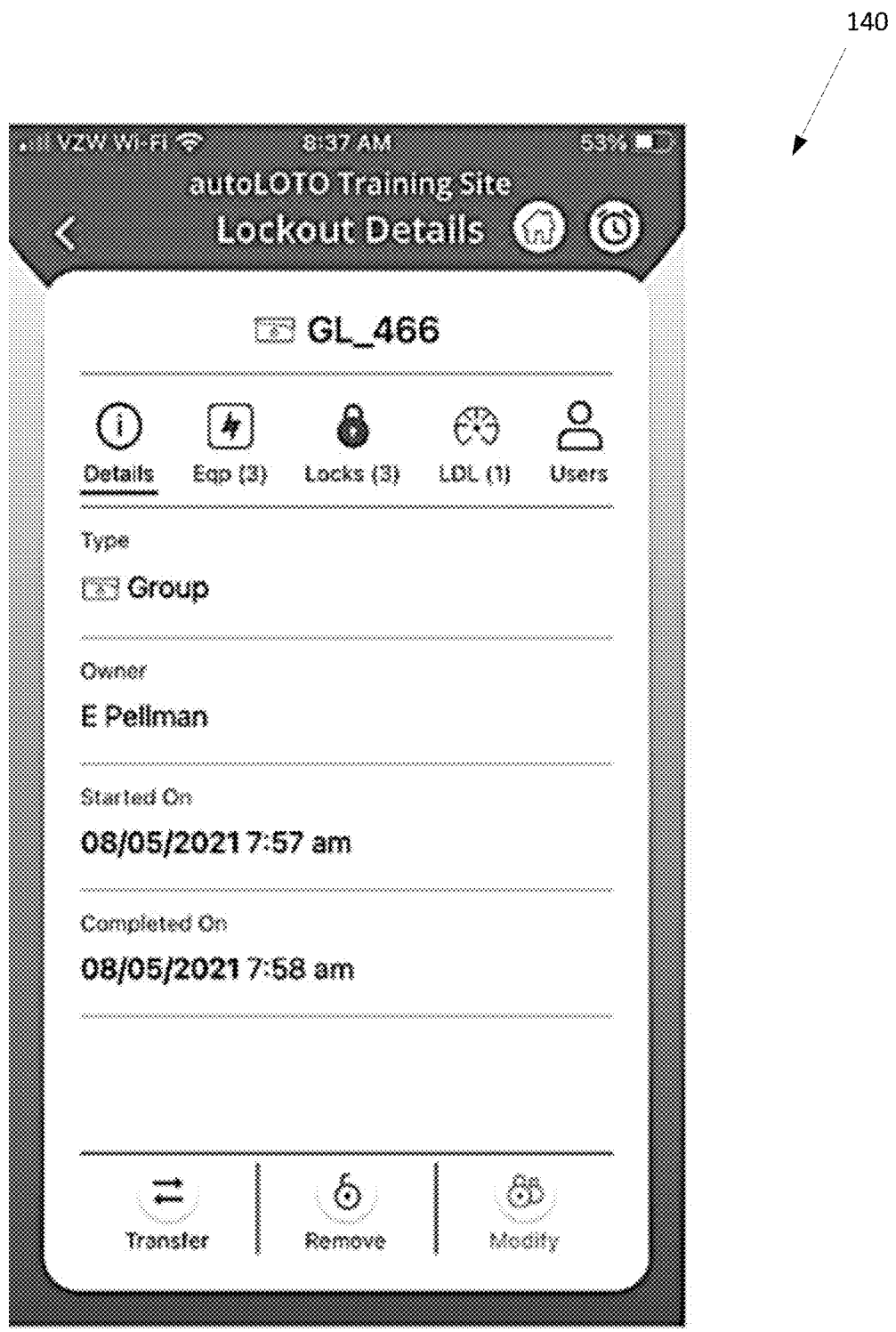
FIG. 62 shows a screen shot view of an example graphical user interface provided by an application on a personal electronic device communicatively connected to a back-end system of the system shown in FIG. 5, in accordance with one or more arrangements; the view showing an interface screen for review and management of a LOTO; the view showing details for an example group type LOTO; the view showing interface buttons for a user to transfer, remove, or modify the LOTO.
Figure 63:
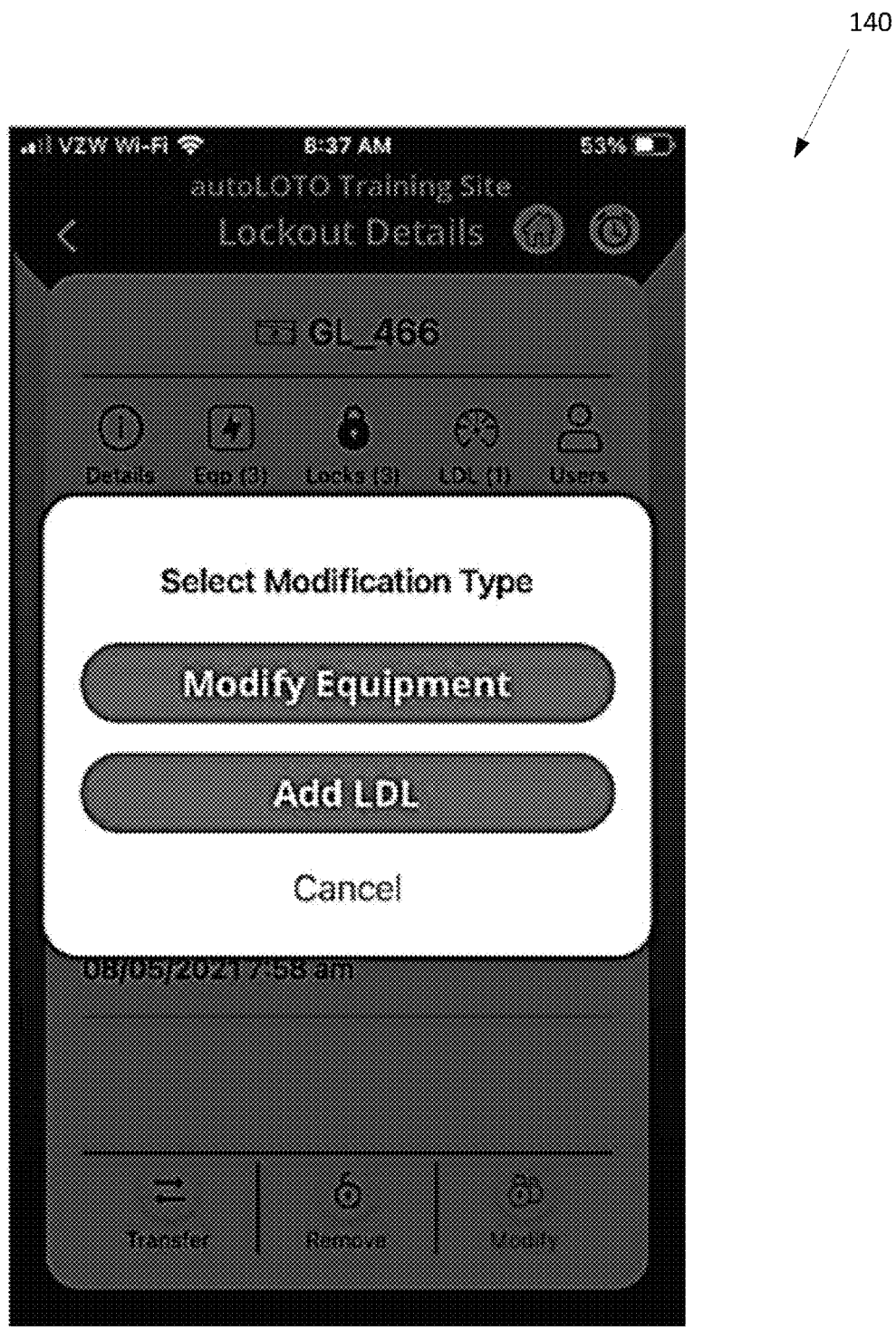
FIG. 63 shows a screen shot view of an example graphical user interface provided by an application on a personal electronic device communicatively connected to a back-end system of the system shown in FIG. 5, in accordance with one or more arrangements; the view showing an interface screen for modifying a LOTO; the interface providing options to modify equipment or add live-dead-live tests.
Figure 64:
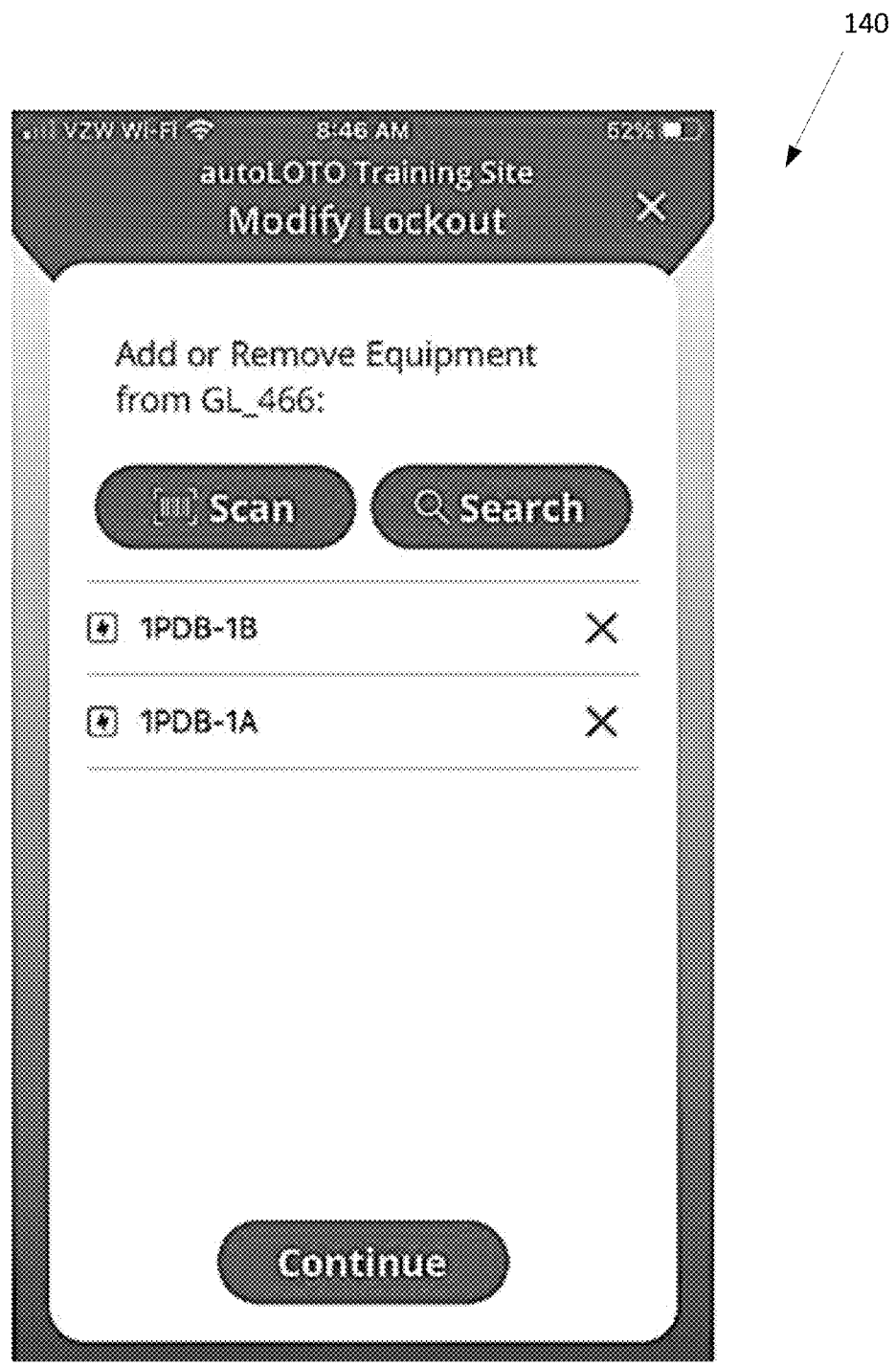
FIG. 64 shows a screen shot view of an example graphical user interface provided by an application on a personal electronic device communicatively connected to a back-end system of the system shown in FIG. 5, in accordance with one or more arrangements; the view showing an interface screen for adding or removing equipment from a LOTO.
Figure 65:
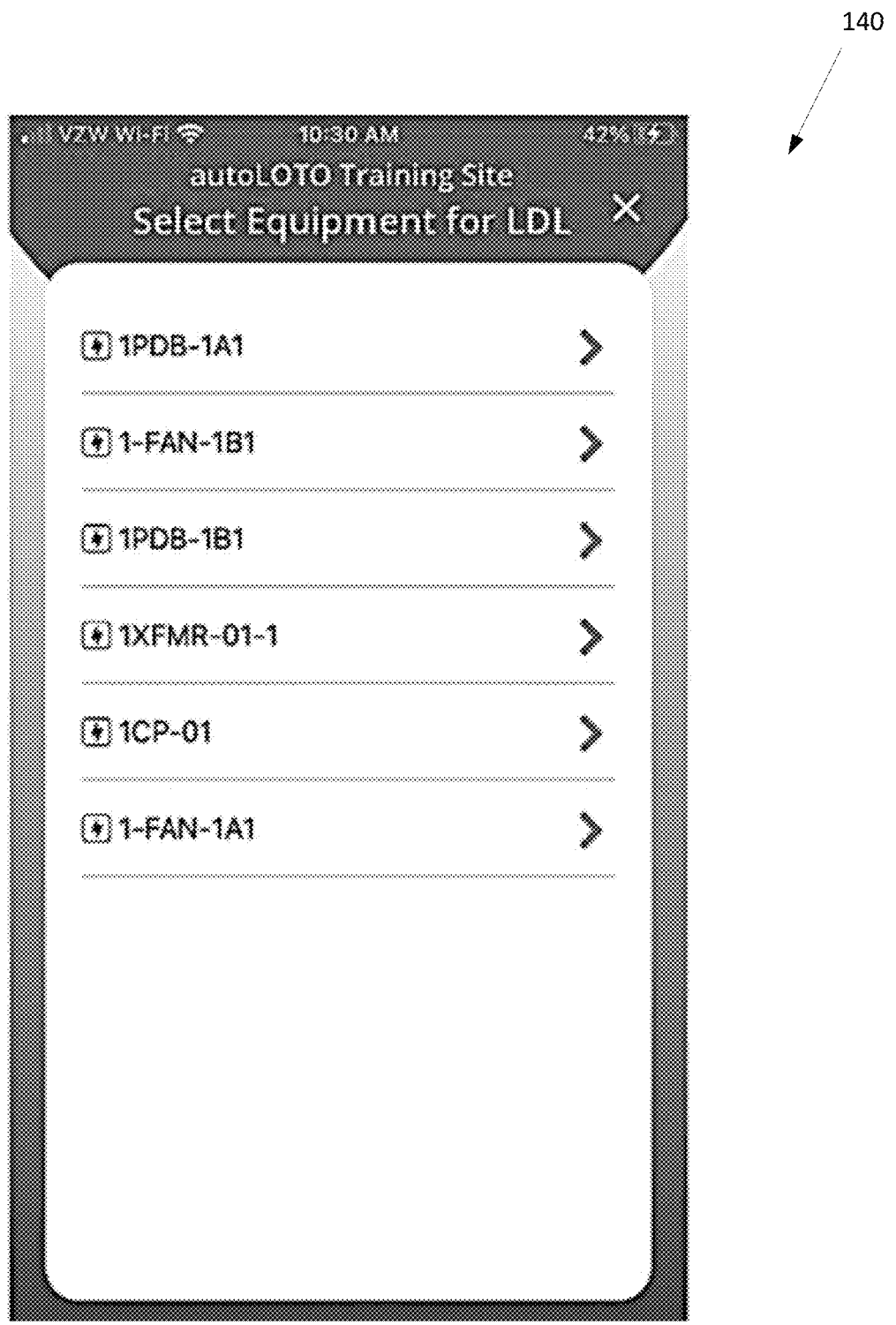
FIG. 65 shows a screen shot view of an example graphical user interface provided by an application on a personal electronic device communicatively connected to a back-end system of the system shown in FIG. 5, in accordance with one or more arrangements; the view showing an interface screen for adding live-dead-live tests to a LOTO; the interface provides a list of equipment in the LOTO that is isolated but not verified as safe; in this example the interface displays an isolated status icon indicating that the listed equipment is downstream of and protected by the active LOTO; if a live-dead-live is completed on the equipment the interface will display an icon indicating safe status; in this example the graphical user interface will guide the user though the live-dead-live if a user selects the carrot button beside a listed piece of equipment.
Figure 66:
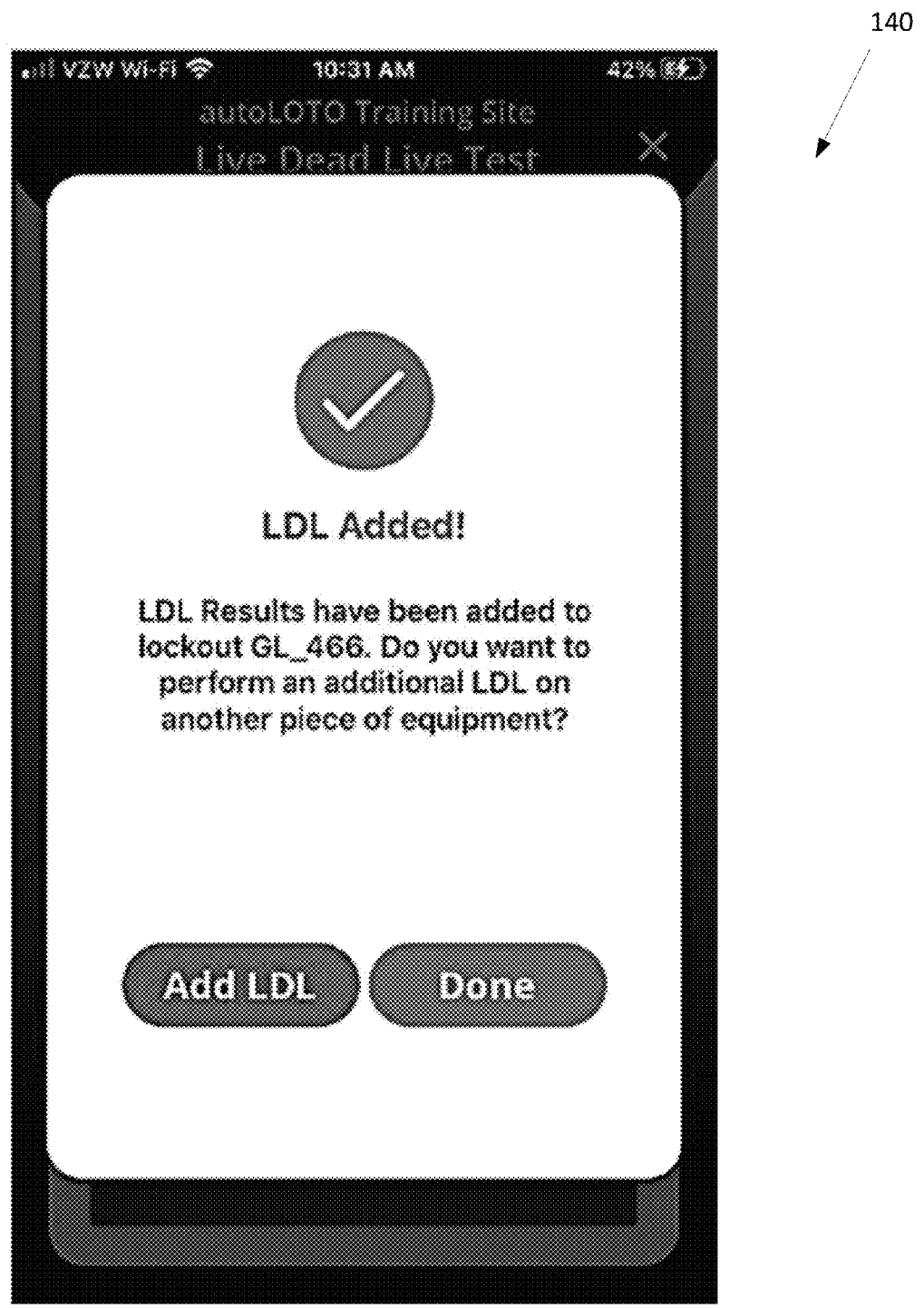
FIG. 66 shows a screen shot view of an example graphical user interface provided by an application on a personal electronic device communicatively connected to a back-end system of the system shown in FIG. 5, in accordance with one or more arrangements; the view showing an interface screen that is presented after completing a live-dead-live test for a LOTO.
Figure 67:
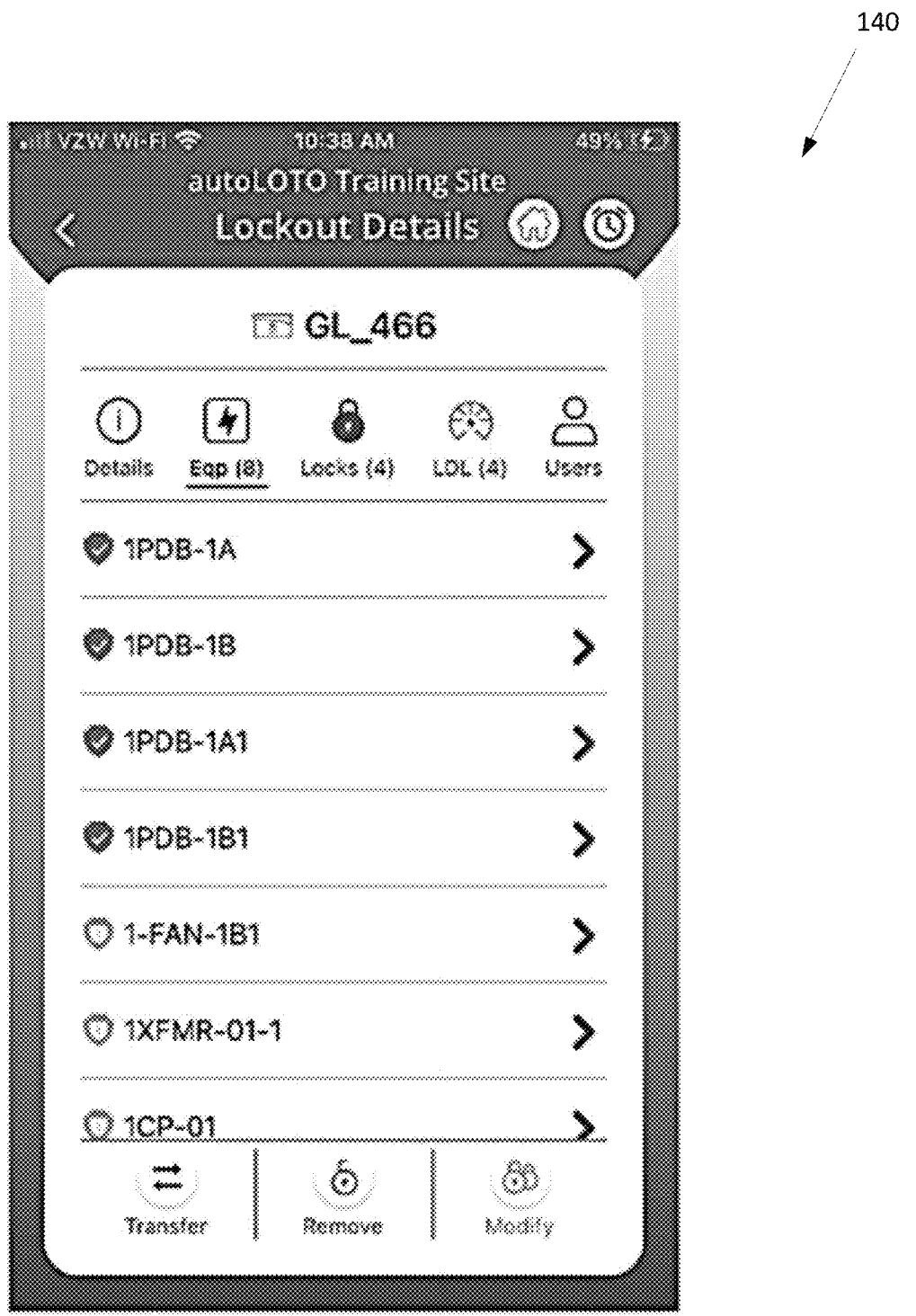
FIG. 67 shows a screenshot view of an interface screen for review and management of a LOTO as is shown in FIG. 62; the view showing an equipment tab of the interface that lists equipment included in the LOTO.
Figure 68:
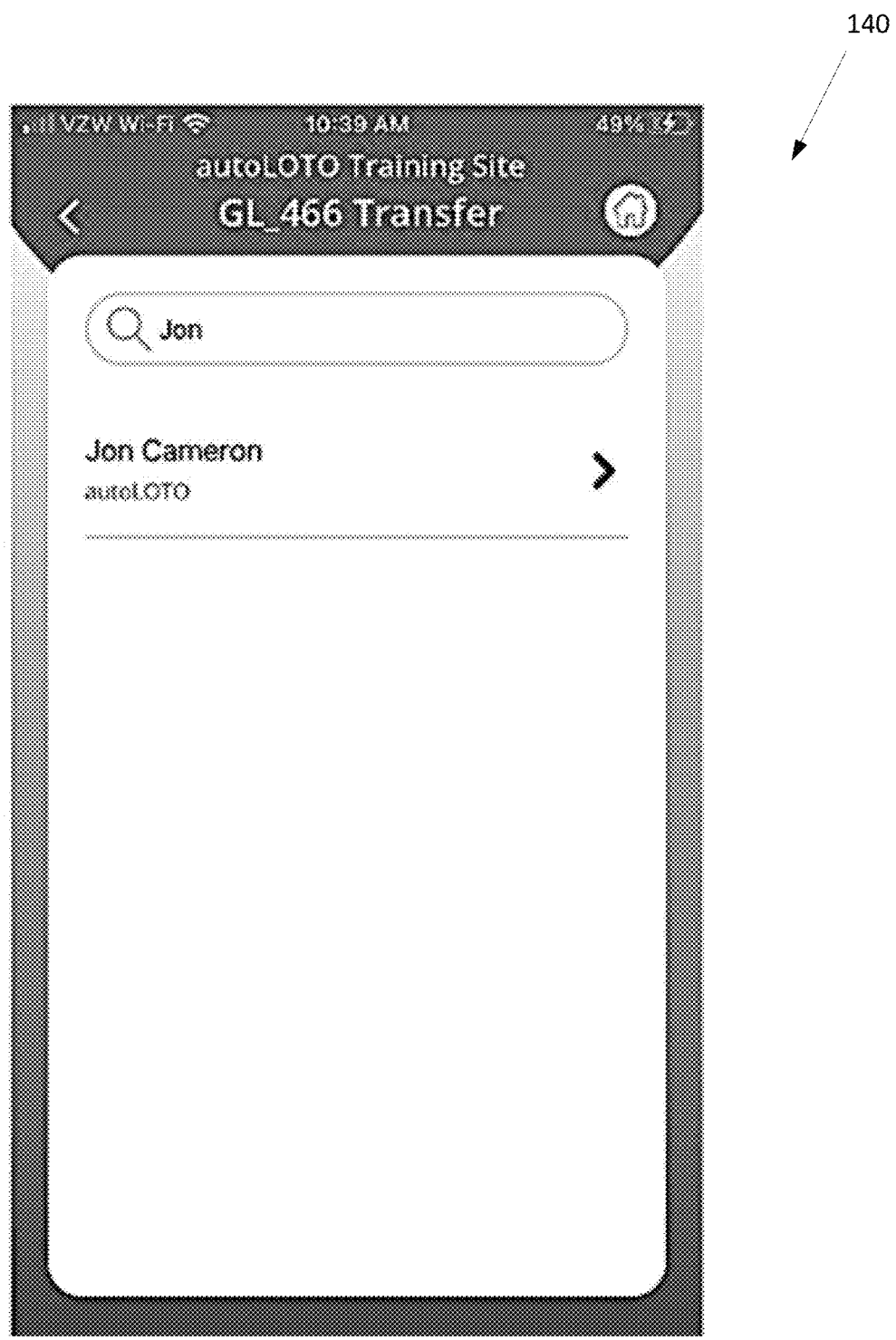
Figure 69:
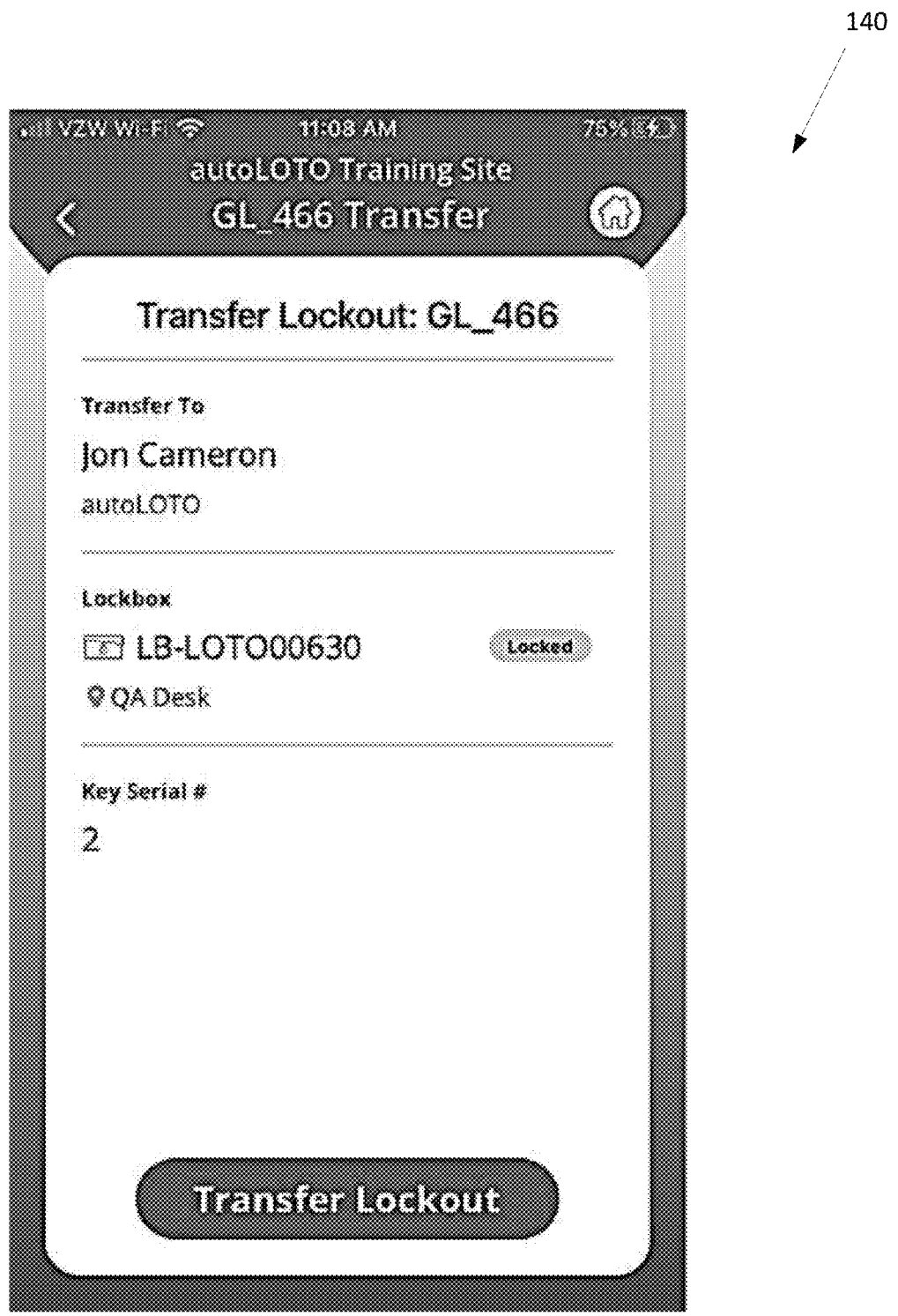
FIG. 69 shows a screen shot view of an example graphical user interface provided by an application on a personal electronic device communicatively connected to a back-end system of the system shown in FIG. 5, in accordance with one or more arrangements; the view showing a confirmation screen for transfer of LOTOs.
Figure 70:
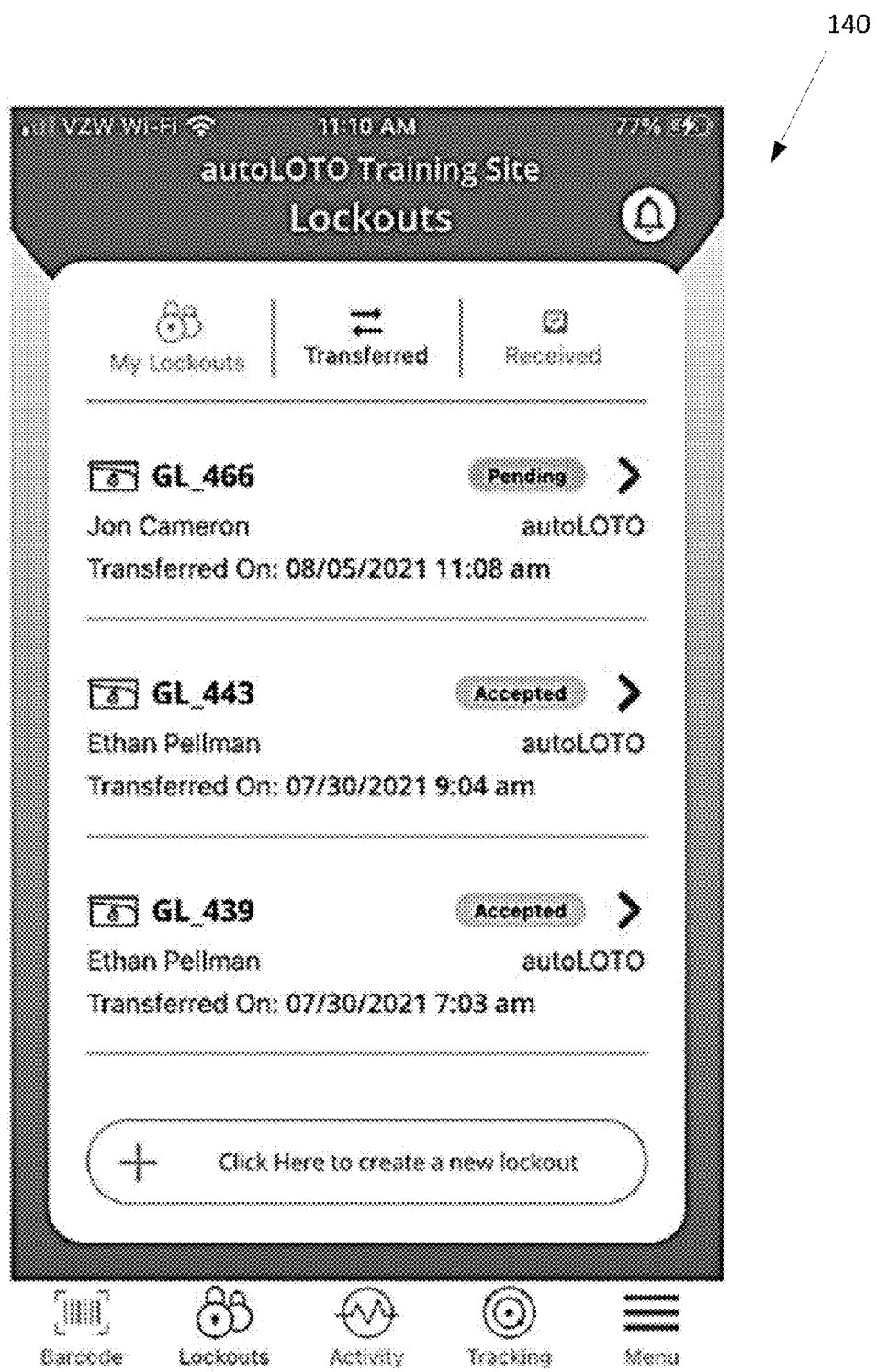
FIG. 70 shows a screenshot view of an interface screen for review and management of a LOTO as is shown in FIG. 62; the view showing a transferred tab of the interface that lists transfers of LOTOs to and/or from the user and status of such transfers.

Flag Group Tab:

In this example arrangement, the Flag Group tab navigates the user 16 to a Flag Group interface that permits admins, SMEs, and/or other authorized users 16 to create groups of equipment and designate them with flag group names (e.g., as shown in FIGS. 21-22).

In the example implementation shown in FIGS. 21-22, as one example, the Flag Group interface is provided in a pop-up window 1016 that is presented then the user 16 click the flag group one of the navigation tabs 1004

These flag groups of selected equipment place "flags" on equipment in the software that triggers a remote review from the flag group owners whenever a piece of equipment in the flag group is selected or affected by a LOTO operation. When that piece of equipment in the flag group is selected, all members of the remote review flag group are sent a notification (e.g., email, txt message, automated phone call, push notification, and/or any other type of message) generated by the back-end system 104. That notification lets the reviewer(s) know that their flag group has been tripped by a LOTO action and their review and approval is required for the LOTO operation to move forward. In this example arrangement, anyone listed as a reviewer on the flag group may approve or disprove the flag group LOTO operation request. In one or more arrangements, the reviewer may review the request by clicking on the flag group tab in worksite manager, then click on the correct flag group that initiated the review, and then click on the requests tab. In one or more arrangements, once in the requests tab, the reviewer will be able to approve the request, or disprove the request with a comment as to why it is being disproved.

Figure 20:
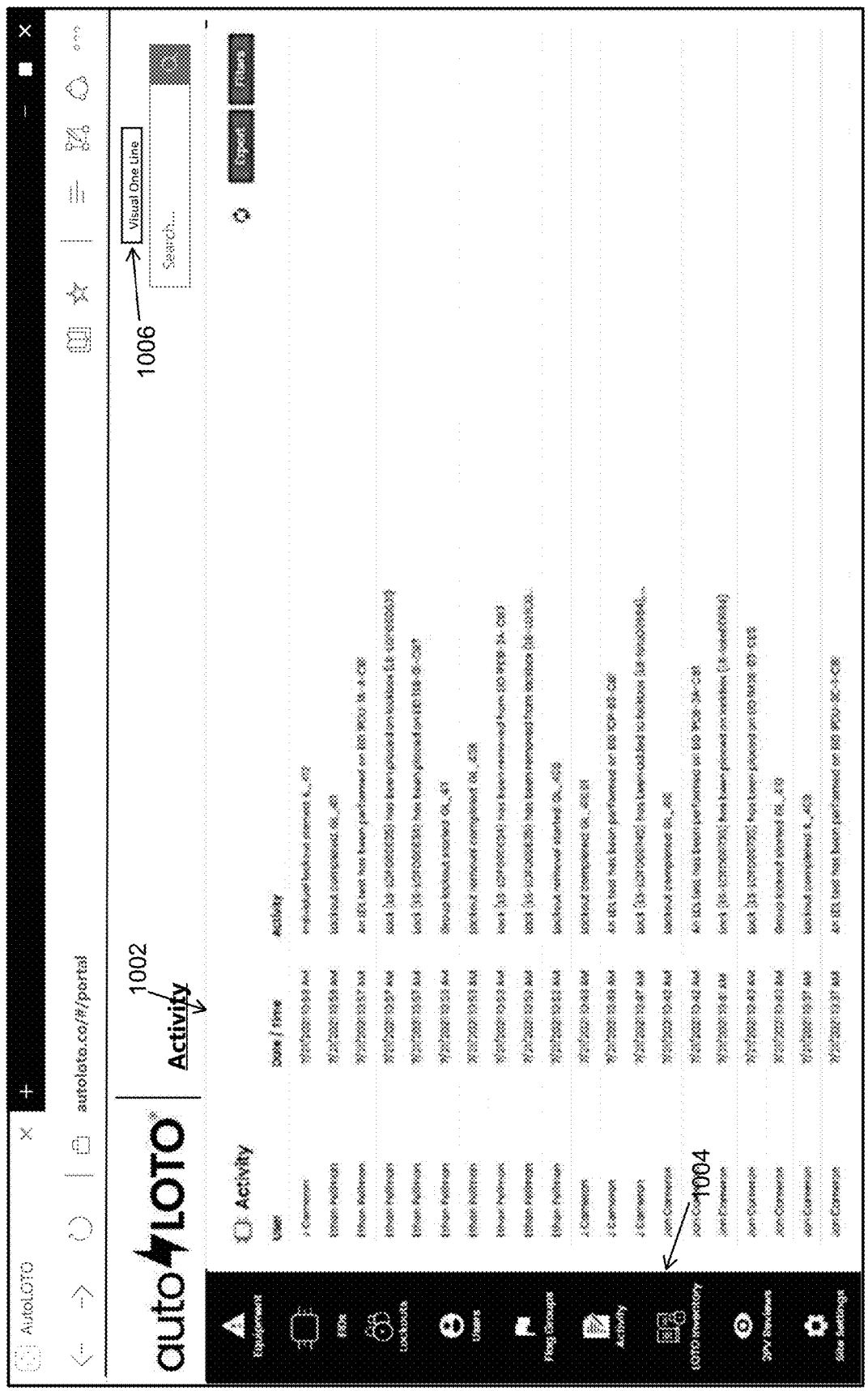
FIG. 20 shows a screen shot view of an example graphical user interface provided by management software of a back-end system of the system shown in FIG. 5, in accordance with one or more arrangements; the view showing an interface for review of LOTO activity of users.

Activity Tab:

In this example arrangement, the Activity tab navigates the user 16 to an Activity interface (e.g., as shown in FIG. 20) that shows every single tracked action from the project as it occurs in real time. In one or more arrangements, the Activity interface shows who made the action, the time and date the action took place, and the equipment, EID, or LOTO operation that was involved or acted on. In one or more arrangements, all the information is listed in chronological order with the most recent action listed at the top of the screen. However, the embodiments are not so limited. Rather, it is contemplated that in various arrangements, Activity interface may display information in any suitable format and/or in and arrangement.

Inventory Tab:

In this example arrangement, the Inventory tab navigates the user 16 to an Inventory interface (not shown) that permits users 16 to track their LOTO tool inventory across their entire project. For example, in one or more arrangements, the Inventory interface shows all locks, lock boxes, and voltmeters, which items have been checked out, by whom, and if they are being used or not, what has not been checked out yet and what is still available for use, and/or any other information relating to management of a worksite and LOTO. In one of more arrangements, Inventory interface may provide a mechanism to filter and/or search the information.

2PV Reviews Tab:

In this example arrangement, the 2PV Reviews tab navigates the user 16 to a 2PV Reviews interface (not shown) configured to facilitate two party review of edits to an electrical node data set 42 any time after electrical node data set 42 has been reviewed and locked in place. In this example arrangement, once that review cycle has been completed, any edit to the electrical node data set will require at least 2 admins with can manage connections permissions to review and approve the change in the 2PV Reviews interface.

As an illustrative example, an example 2PV review is initiated once an admin with the correct permissions submits an edit. The admin who is editing will acknowledge that his edit will remain in a pending status until one their peers can review and approve or disprove the edit request. A notification is automatically generated that is sent to all admins with data set edit permissions letting them know that a 2PV request has been made. Those reviewers will then log into the appropriate project, go to the 2PV tab and then check the pending connections or pending equipment tabs. They will then select the entry they want to review and will either approve the edit or disprove it with a comment. Once they either approve it or disprove it, the system 100 will generate a notification to the original editor telling them of the new approved or disproved status. In the 2pv Reviews interface, the entry will get moved to either approved connections/equipment tab or into the rejected connections/equipment tab based on the result of the $2^{nd}$ reviewer. If an edit is approved by a second reviewer, that edit will go live in the system if it does not impact any existing LOTO operations. Should an approved edit alter a live LOTO operation, that edit will get put into a pending status and the LOTO operation owner will be sent an email letting him know that a project edit has affected his LOTO. It will instruct the LOTO owner and any other user 16 on the LOTO to remove their locks so the LOTO can be placed into a modification status so the LOTO owner can modify the LOTO to account for the new change in the project data set.

Site Setting Tab:

In this example arrangement, the Site Settings tab navigates the user 16 to a Site Settings interface (e.g., as shown in FIGS. 23-30) to facilitate review and configuration of settings for a worksite. In the arrangement shown, as one example, the Site Settings interface contains the following tabs: Details, Reviews, Groups, Locations, Companies, IP types. Resources, Barcodes, Configuration Activity, and VOL Colors. In this example, the Details tab contains the name of the project, contact information for the project, address of the project, and kill button, that if enabled will not allow any editing to take place at all on the electrical node data set. In this example, the review tab is used to initiate and track the electrical node data set review process. Here, a user 16 can upload documents and other review materials for the other reviewers to look at and reference. Users 16 may also use this tab to mark when the review portion assigned to a specific user 16 is finished. Once all reviewers have finished and marked their reviews finished, the electrical node data set will be put into a "post review" status and all edits will now have to go through the 2PV review process and tab. In this example, the Groups tab is permits admins to set up groups and subgroups to better filter and classify EIDs and Equipment in the electrical node data set. In this example, the Locations tab permits admins set up room and project locations to better filter and organize EID and Equipment in the electrical node data set. In this example, the Companies tab is permits admins to create a list of companies working on the project to better filter and organize users 16. In this example, the IP types tab lists the different types of Isolation Points that can added to any piece of equipment as needed in the electrical node data set. In this example, the Resources tab lists of project specific users 16 that the project admins want all project participants to have their contact information. In this example, the Barcodes tab allow barcodes to be created and assigned to equipment, EIDs, IPs, Locks, lockboxes, and voltmeters. In this example, the Configuration Activity tab tracks all electrical node data set activity. who created, deleted, or edited the data set entry, the time and date it took place, what was created, deleted, or edited, and any other information relating to activity in the system 100. In this example, the VOL Colors tab permits a color key associated with the Visual One-Line Construction to be customized. From this tab users 16 assign various project milestones to different colors that can then be used in the visual one-line.

Figure 10:
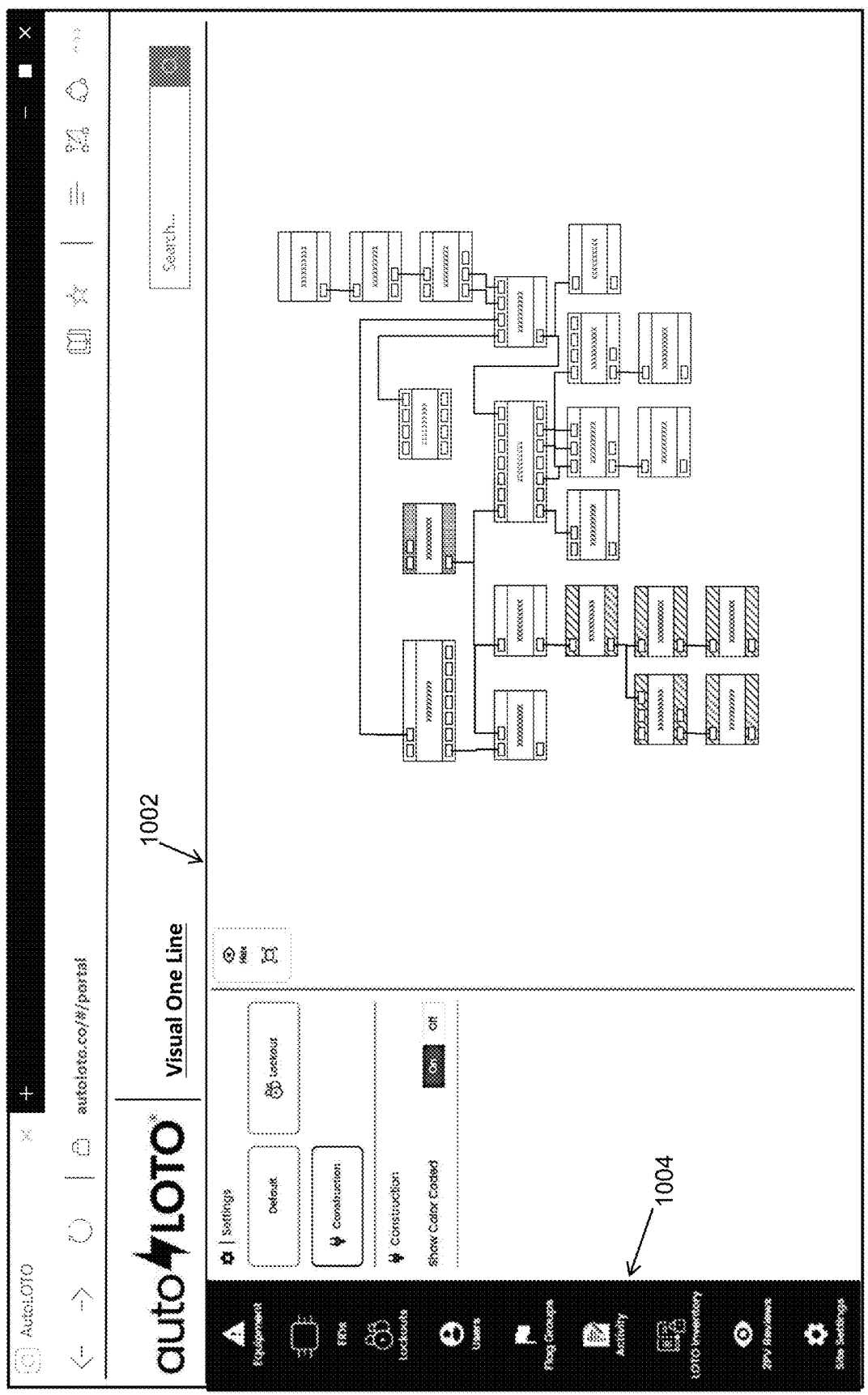
FIG. 10 shows a screen shot view of an example graphical user interface provided by management software of a back-end system of the system shown in FIG. 5, in accordance with one or more arrangements; the view showing an interface for display of one-line drawing representations of the electrical node data set for a worksite; the view showing an interface displaying example electrical one-line drawing representation of the electrical node data set in a construction display mode, where equipment, EIDs, and/or connections are visually coded to indicate milestone status.
Figure 11:
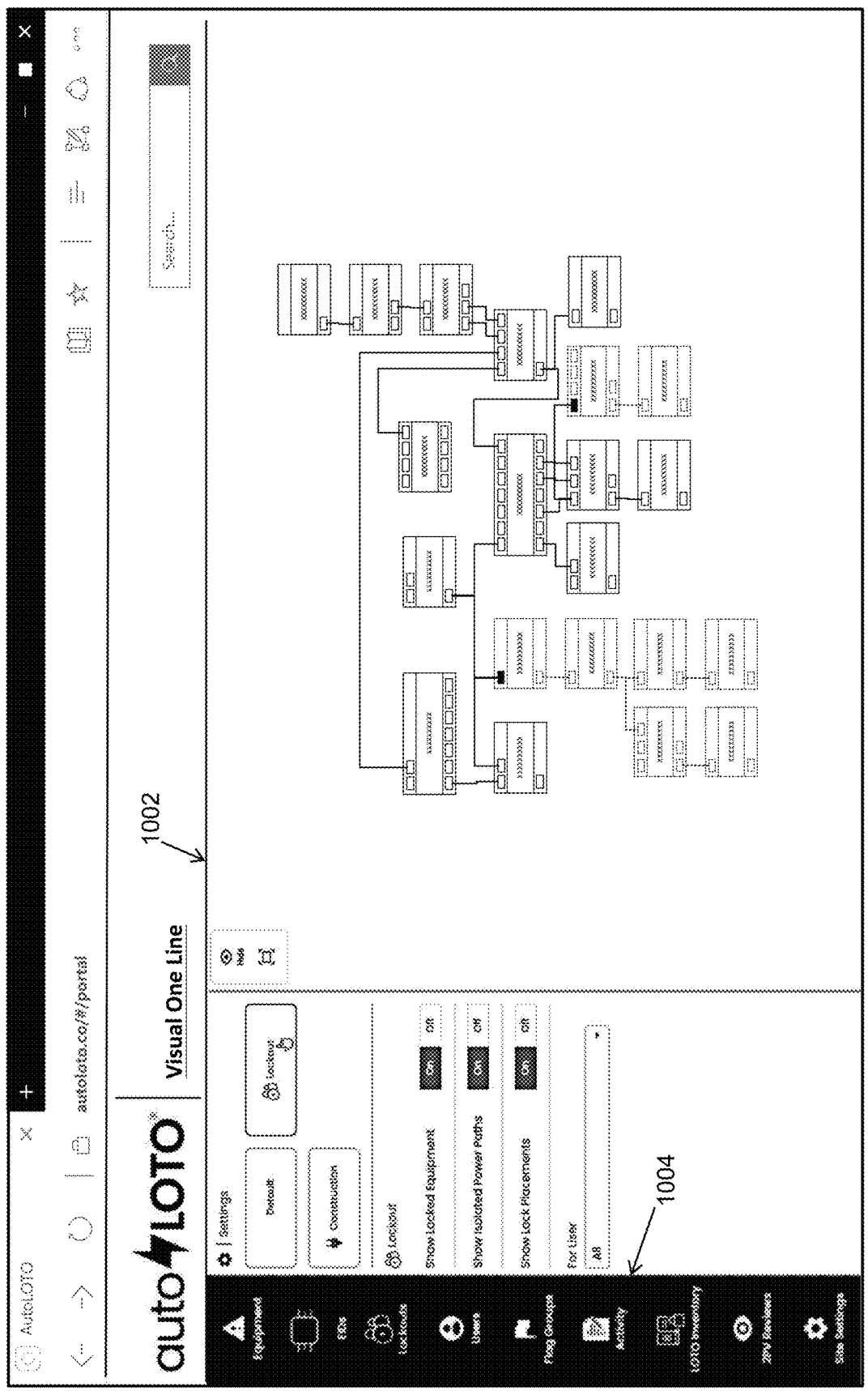
FIG. 11 shows a screen shot view of the one-line display interface shown in FIG. 10, in accordance with one or more arrangements; the view showing an interface displaying a one-line drawing representation of the electrical node data set a lockout display mode, where equipment, EIDs, and/or connections are visually coded to indicate isolation status; the view showing isolated equipment, EIDs and connection with dashed lines.
Figure 12:
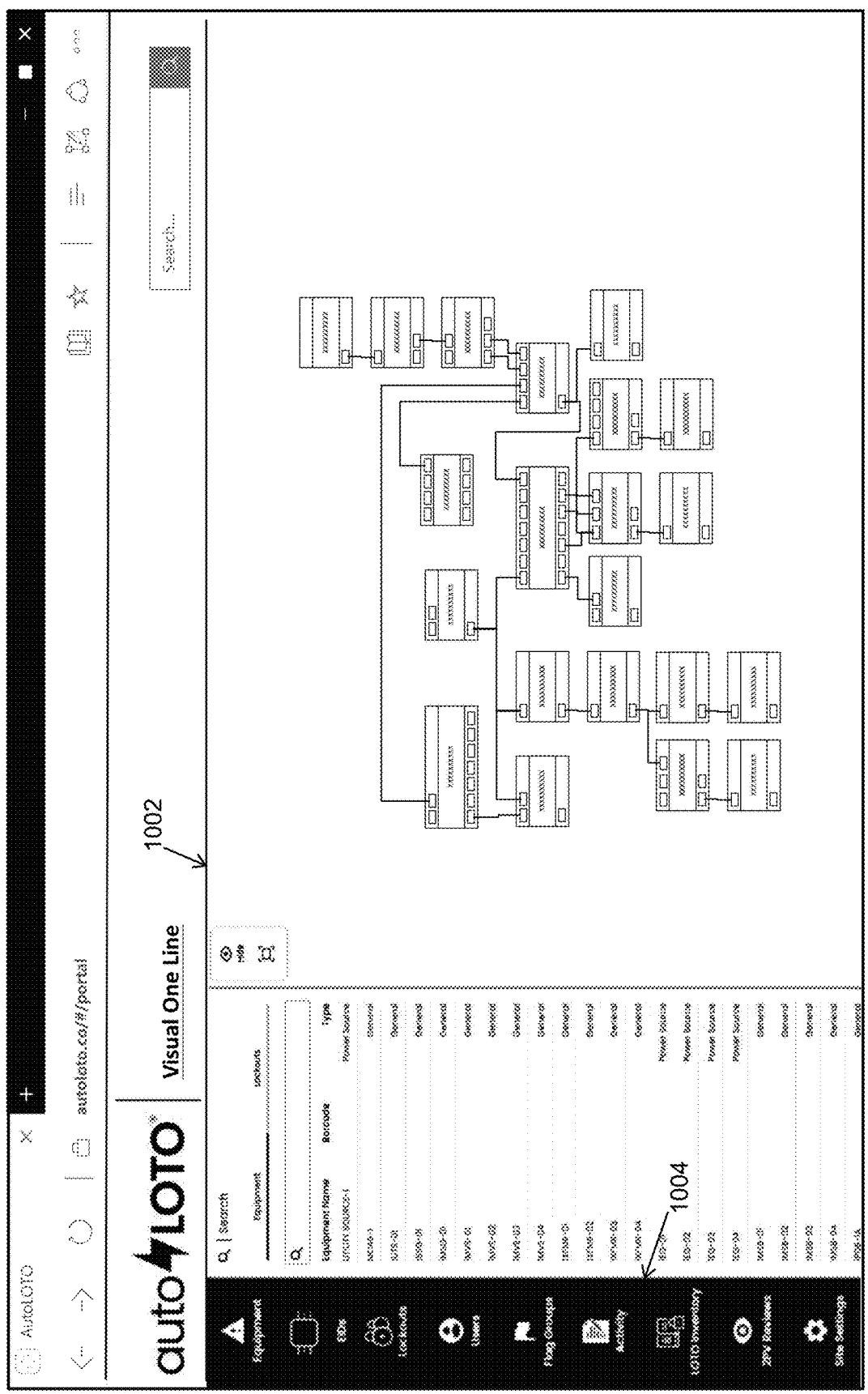
FIG. 12 shows a screen shot view of the one-line display interface shown in FIG. 10, in accordance with one or more arrangements; the view showing an interface displaying a one-line drawing representation of the electrical node data set a default display mode; the view showing a sub-interface for searching for particular equipment of the worksite.
Figure 13:
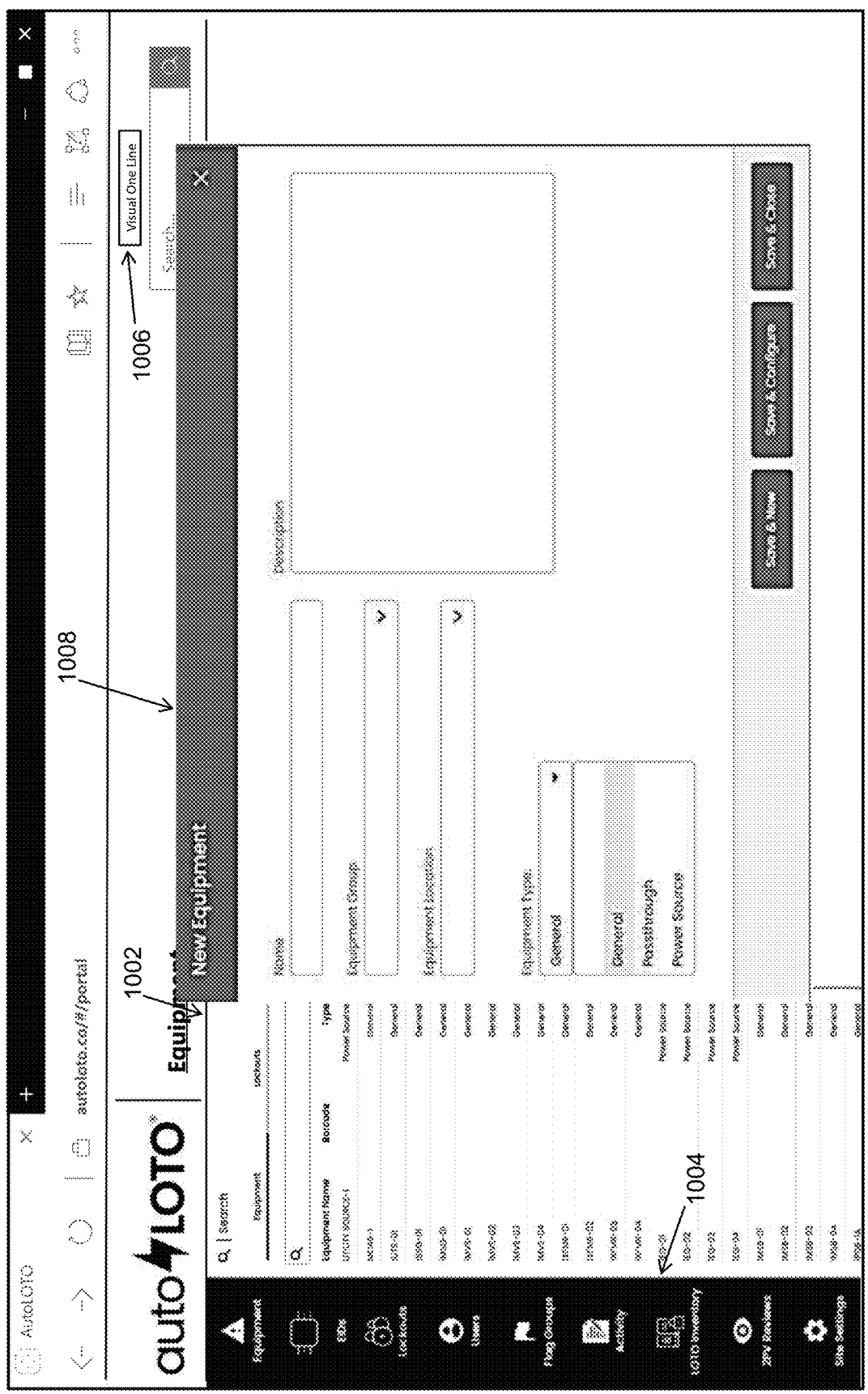
FIG. 13 shows a screen shot view of an example graphical user interface provided by management software of a back-end system of the system shown in FIG. 5, in accordance with one or more arrangements; the view showing an interface for management of equipment; the view showing a window interface for manual input of new equipment to the electrical node data set for a worksite.
Figure 14:
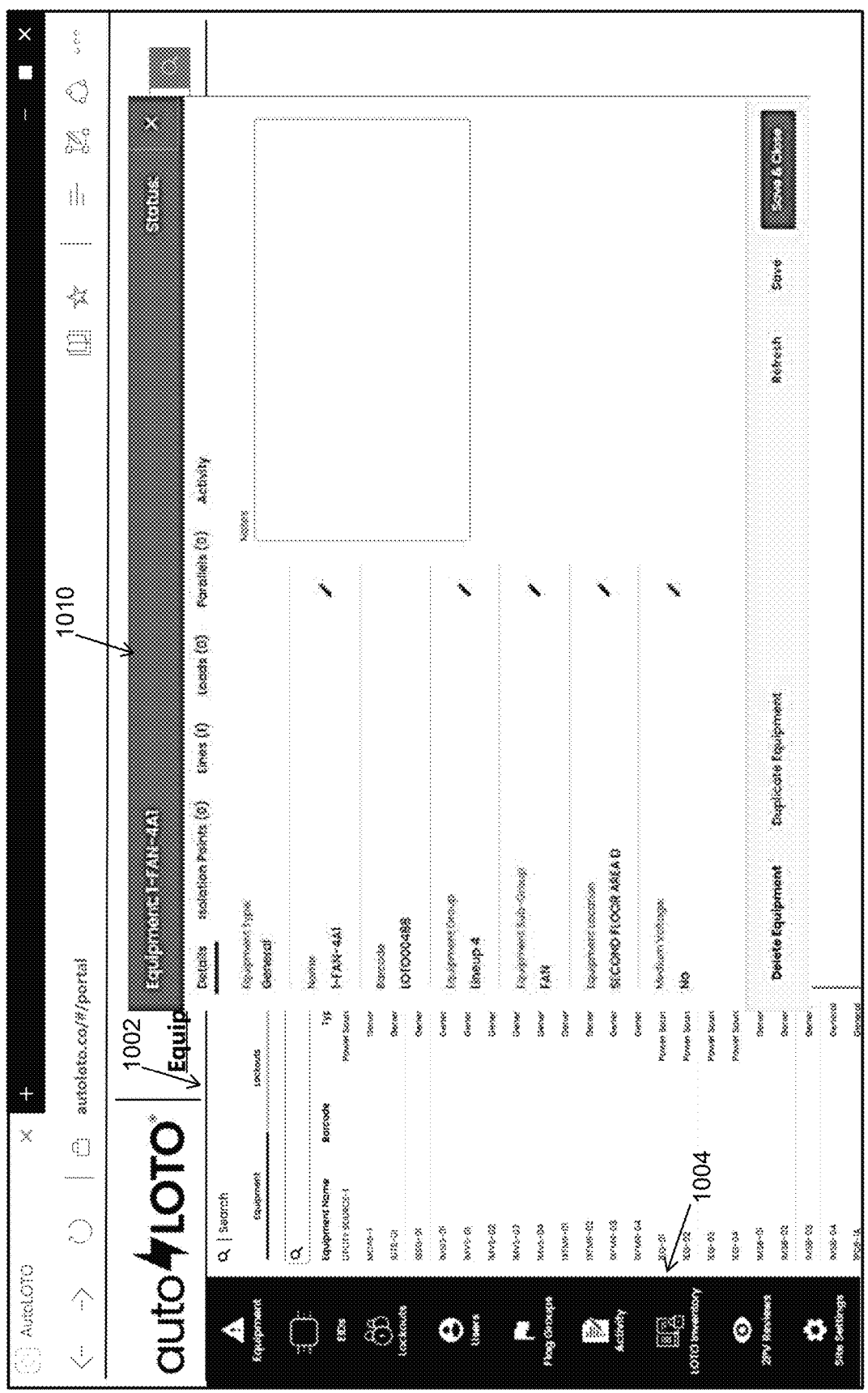
FIG. 14 shows a screen shot view of the interface for management of equipment shown in FIG. 13; the view showing a window interface for review and/or editing of details of equipment in the electrical node data set for a worksite.
Figure 15:
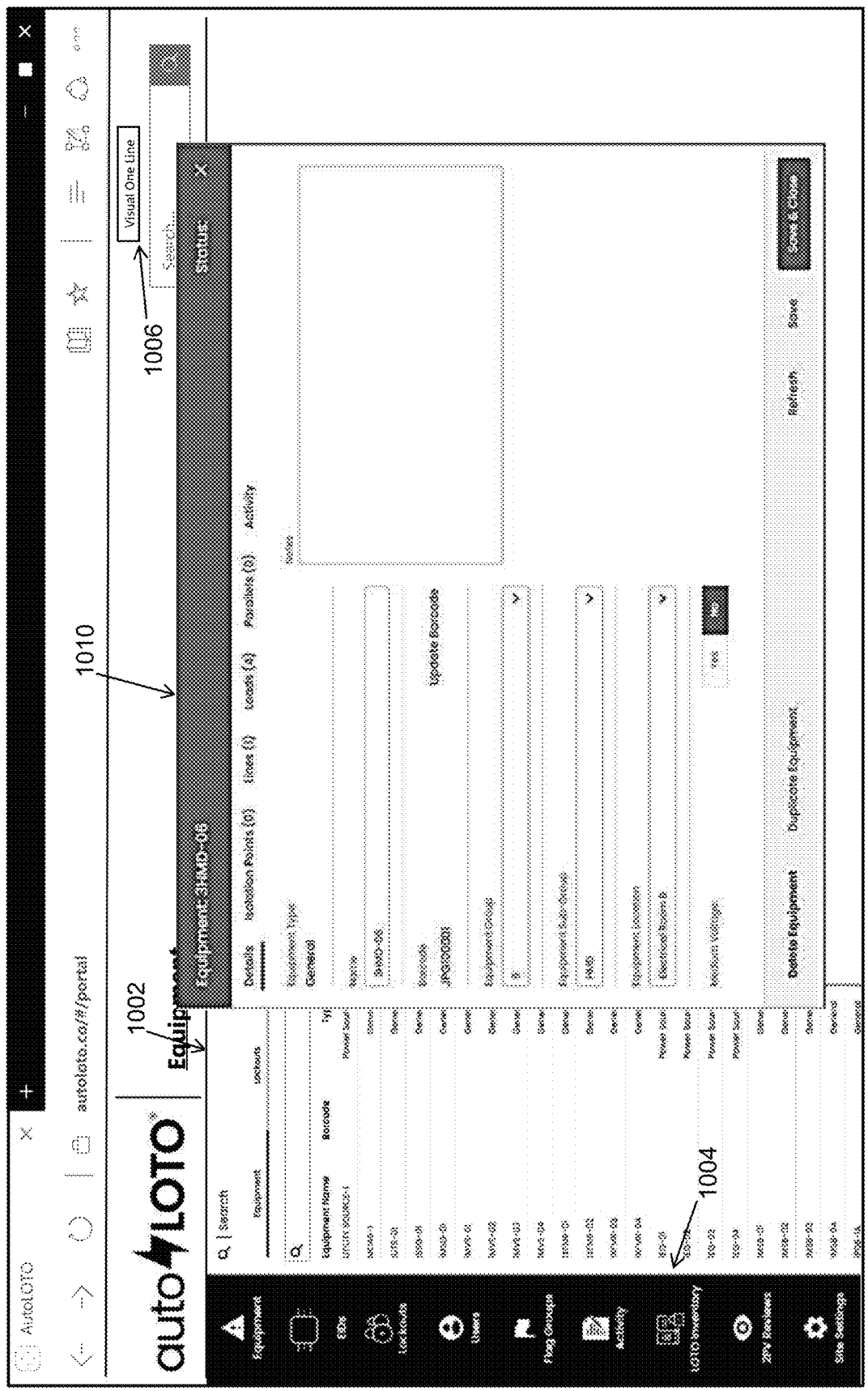
FIG. 15 shows a screen shot view of the interface for management of equipment shown in FIG. 13; the view showing a window interface for review and/or editing of another example piece of equipment in the electrical node data set for a worksite.
Figure 16:
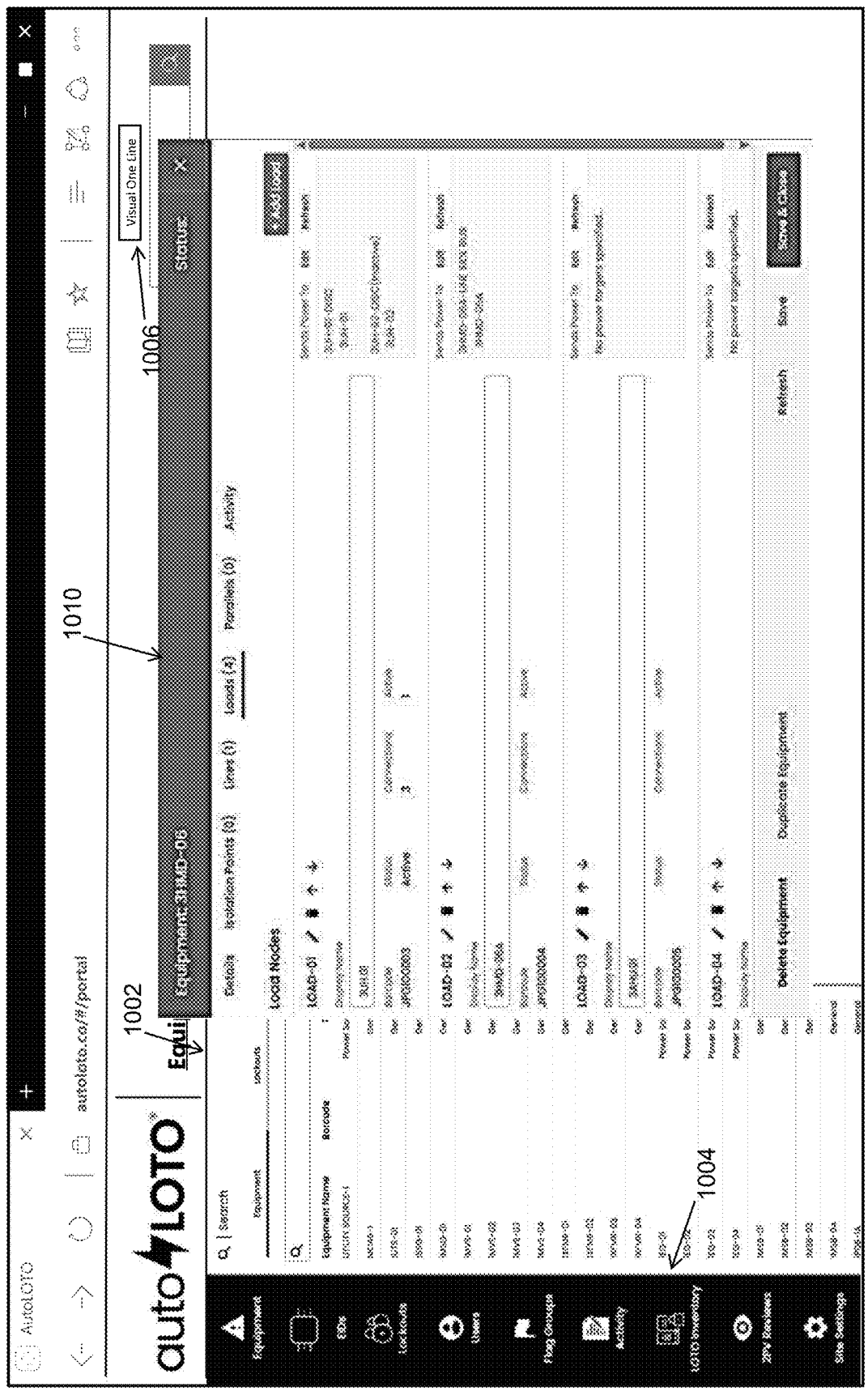
FIG. 16 shows the window interface for review and/or editing of another example piece of equipment in the electrical node data set for a worksite shown in FIG. 15; the view showing a tab of the window interface for review and/or editing of loads of the piece of equipment.

One-Line Drawing Interface:

In one or more arrangements, the interface provided by the software is configured to provide a One-Line Drawing Interface in content window 1002 (e.g., as shown in FIGS. 10-12) in response to a clicking on a button 1006 that is displays in other interfaces in this example. Additionally or alternatively, in some arrangements button 1006 may be included as one of the navigation tabs 1004. Additionally or alternatively, in some arrangements, the One-line drawing interface may be opened in a separate browsing window or browser tab when button 1006 is clicked.

In one or more arrangements, the One-Line Drawing interface is configured to generate and display an electrical one-line drawing representation of the equipment 44, EIDs 46, and electrical connections of the electrical node data set 42 in content window 1002 (also referred to as a visual one-line drawing. A visual one-line drawing is a visible representation of every single piece of tracked equipment, EIDs, and their connections. It is designed to replicate a paper or digital electrical one-line file issued by the project architect or shop drawing from an electrical contractor.

In one or more arrangements, the One-Line Drawing interface allows users 16 to adjust the electrical one-line drawing representation to display various status of the equipment 44, EIDs 46, and electrical connections (e.g., by color coding) including but not limited to, for example, deployment/isolation status, inspection status, isolation status, and/or any other pertinent status applicable to management of a worksite or LOTO processes.

For example, in one or more arrangements, the One-line Drawing interface is configured to provide three main display modes that can used with the visual one-line: 1) default display, 2) lockout display, and 3) construction display.

In this example, default display mode shows only the electrical node data set in its visual form. All equipment 44, EIDs 46, and their corresponding connections are shown here. In one or more arrangements each piece of equipment 44, EIDs 46, and even the connections themselves are individually clickable. If clicked on, a side tab on the left of the One-line Drawing interface is presented and depicts information for that piece of equipment 44, EID 46, or connection that would be shown for example, in the Equipment and EID interfaces for that same piece of equipment 44, EID 46, or connection. Additionally in some arrangements, the One-line Drawing interface may also visually highlight the selected component.

In this example, Lockout display mode shows the entire electrical node data set 42, but every single piece of equipment 44 is either color coded (e.g., green (isolated) or red (unsafe)) based on all active project LOTO operations. These LOTO operations are all listed on the left side of the screen. Users 16 can select each individual LOTO from the active list and the visual one-line will shift to display only that LOTO operations safety relationship with the project. In one or more arrangements, EIDs 46 are highlighted green if the EIDs 46 have active locks hanging on them. In one or more arrangements, the Lockout display mode can also be used to view personal safety status as well in respect to the visual one-line. For example, in one or more arrangement, if a user 16 is selected, pieces of equipment 44 that are confirmed safe for the user 16 to enter and work in are highlighted. In one or more arrangements, all this information is updated in real time as changes are made.

In this example, Construction display mode allows the user 16 to track "active" and "inactive" connection status visually, as well color code equipment 44, EIDs 46, and connections based on project milestones set up by project managers. For example, in one or more arrangements, EIDs 46 may be colored one color to represent connections that are currently "inactive" (which means that there is not physical way for hazardous electrical energy to flow between those 2 connection points) and a second color to represent an "active" flow path for hazardous energy. In one or more arrangements, a user 16 can then choose from several available colors to mark connections, EIDs 46, and equipment 44 to visually color code and track construction schedules and project milestones.

LOTO Control Processes 158 of Back-End System 104:

In one of more arrangements, LOTO control processes 158 are configured to perform various processes to facilitate management of LOTO operations requested by users 16 (e.g., via personal electronic devices 14). For example, in some various arrangements, LOTO control processes 158 are configured to create LOTO procedures dynamically on-demand as LOTO operation request are received from users 16 and manage review and approval of LOTO operations requested by users 16, among other various processes performed by back-end system 104.

Dynamic Creation of LOTO Procedures

In one or more arrangements, LOTO control process 158 are configured to dynamically generate a LOTO procedure from the electrical node data set 42/energy matrix 42 in response to receiving a LOTO request from the personal electronic device 14 of user 16 indicating a set of equipment 44 to be isolated. As previously described herein, dynamic creation of LOTO procedures can reduce time required for LOTO in the field when multiple pieces of equipment 44 are to be isolated because the procedures can be created to avoid unnecessary placement of redundant locks 38 on EIDs 56 and/or minimize the number of locks 38 required to be placed in order to isolate a user 16 specified set of equipment 44.

In various different arrangements, LOTO control process 158 may dynamically generate LOTO procedures for selected equipment 44 using various different methods and/ or processes. In one or more arrangements, LOTO control process 158 traverses all connections in the electric node data set 42 starting from the selected equipment 44 and branching outward through all interconnected active EID connections. In one or more arrangements, the process 158 follows all connected pathways until power sources are encountered and identified.

Once the LOTO control process 158 has identified the connected power sources, which can affect specified equipment 44, the process follows connections in the electrical node data set 42 backward from the identified powers sources and determines the most optimal EIDs 56 for placement of locks 38 to isolate all of the specified equipment 44 from the power sources.

Depending on how system 100 is configured, in one or more arrangements, EIDs 56 for isolation of equipment 44 may be optimized to achieve various different goals, including but not limited to, for example, minimizes the number of locks 38 required to be placed, minimizing disrupting operation to other equipment 44, avoiding isolation of critical equipment 44, and/or any other priority or goal.

The determination and optimization of EIDs 56 and/or verification test locations for a LOTO procedure are performed live on demand by system 100 in response to receiving a request to isolate the specified equipment 44. In other words, there are no predetermined lock placements or verification test locations. Testing of system 100 has shown that determination and optimization of EIDs 56 can be computed in approximately 1-20 seconds by back-end system 104, depending on the size of the project.

In one or more arrangements, after determining the set of EIDs 56 to be locked and verification test locations, LOTO control process 158 generates a procedure for LOTO, which is then communicated by back-end system 104 to the personal electronic device 14 of user 16. Upon receiving the LOTO procedure, the personal electronic device 14 provides graphical user interface that guides the user 16 though the LOTO procedure.

However, the embodiments are not so limited. Rather it is contemplated that in one or more arrangements, back-end system 104 may be configured to provide steps of the determined LOTO procedure to personal electronic device 14 sequentially, for example, as personal electronic device 14 provides confirmation that the user 16 has completed previous steps. Additionally or alternatively, in one or more arrangements, back-end system 104 may be configured to communicate the determined set of EIDs 56 to be locked and verification test locations to the personal electronic device 14, on which application 12 determines an appropriate LOTO procedure for the determined set of EIDs 56 to be locked and verification test locations.

Review/Approval Processes

In one or more arrangements, LOTO control processes 158 may be configured to restrict the ability of users 16 to perform certain actions without approval (e.g., isolation of certain equipment 44, installation or modification of project equipment 44 and/or connections on site, and/or editing of electrical node data set 42 for a project). The ability to restrict actions that users 16 are permitted to take may be useful, for example, to ensure that critical equipment 44 is not isolated while in use. For example, in a hospital setting, it is important to ensure that equipment 44 necessary for treatment is not isolated unless the downtime is scheduled in advance at a time the equipment 44 will not be needed.

In one or more arrangements, management software 160 is configured to provide a user interface for authorized users 16 to create and configure flag groups for pieces of equipment 44 or certain actions (e.g., to edit electrical node data set 42). For example, in one or more arrangements, a flag group may be created for a piece of equipment 44 that indicates a set of reviewers to be notified when the piece of equipment 44 is selected for isolation by a user 16. In one or more arrangements, when that piece of equipment 44 is selected, LOTO control processes 158 notify all members in the flag group (e.g., by email, SMS, automated phone call, push notification, or any other form of communication). The notification lets the reviewer know that their flag group has been tripped by a LOTO action and their review and approval is required before the requested LOTO operation may proceed. Any reviewer in the flag group may approve or disprove the flag group LOTO operation request, for example, via an interface provided by management software 160 of back-end system 104. In one or more arrangements, management software 160 permits the reviewer to be able approve the request or disprove the request with a comment as to why it is being disproved. In one or more arrangements, if the request is approved, the user 16 that selected the equipment 44 in the flag group for isolation will receive a notification by the GUI 140 on their personal electronic device 14 and be allowed to move forward with their LOTO operation. In one or more arrangement, if the LOTO operation is disproved, the user 16 will have their LOTO operation canceled. In some arrangements, the user 16 may be provided an option to modify the disapproved LOTO operation (e.g., to overcome the reason for disapproval indicated in the notification). The flag group will then log the request activity and approval/disproval as well as the LOTO record. In one or more arrangements, management software 160 requires approval of a second authorized personal in order to create or edit a flag group. In other words, management software 160 would not permit a reviewer to approve their own request to create and/or edit a flag group.

In one or more arrangements, management software 160 and LOTO control processes 158 may additionally or alternatively utilize permissible tiers 40 to determined approvals required by flag groups and/or restrict actions of users 16 as previously described. For example, in one or more arrangements, management software 160 may permit flag groups to require different approvals for different users 16 based on permissible tiers 40. It is contemplated that one or more arrangements, management software 160 and LOTO control processes 158 may additionally or alternatively utilize any other data metric to implement trigger approvals or restrictions on users 16.

Figure 7:
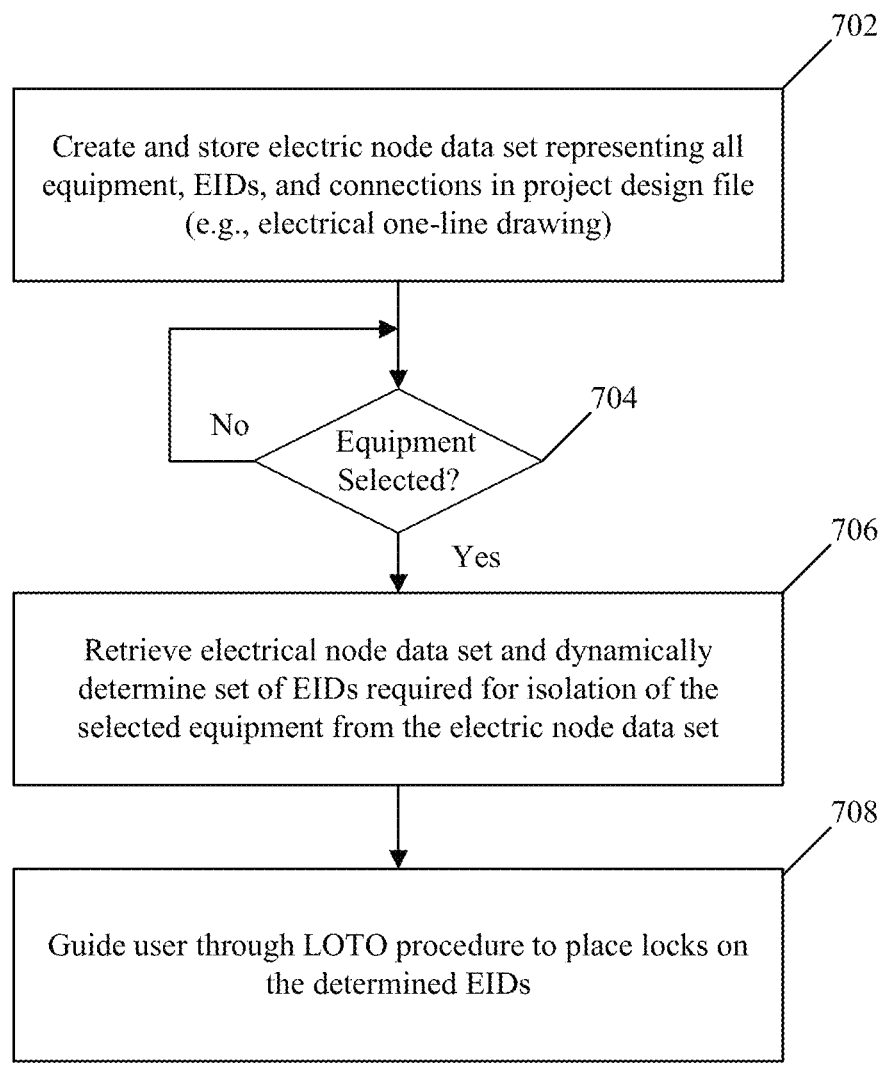
FIG. 7 is a flowchart diagram of an example process for management of LOTO processes by a hazardous energy control system, in accordance with one or more arrangements; the example process configured to dynamically determine EIDs required to be disabled for LOTO for isolation of a selected set of equipment based on an electrical node data set.

In Operation:

FIG. 7 shows a flow chart of an example high level process for management of LOTO processes by system, in accordance with one or more arrangements. At process block 702, an electrical node data set 42 representing all equipment 44, EIDs 46, and connections in a project design file (e.g., an electrical one-line drawing) is created and stored (e.g., in database 150 of back-end system 104. As previously discussed with reference to management software 160 of back-end system 104, system 100 may utilize various manual or automated processes to generate the electrical node data set 42. In this example, the process hangs at decision block 704 until a user 16 selects (e.g., via GUI 140 on personal electronic device 14) equipment 44 to be isolated. When equipment 44 to be isolated is selected by user, the process proceeds to process block 706, where system 100 retrieves the electrical node data set 42 and dynamically determines a set of EIDs 46 required for LOTO in order to isolate the equipment 44 selected by a user 16. At process block 708, system 100 guides user 16 through a LOTO procedure to place locks 38 on the determined EIDs 46 and thereby isolate the equipment 44 selected by the user 16.

Figure 8:
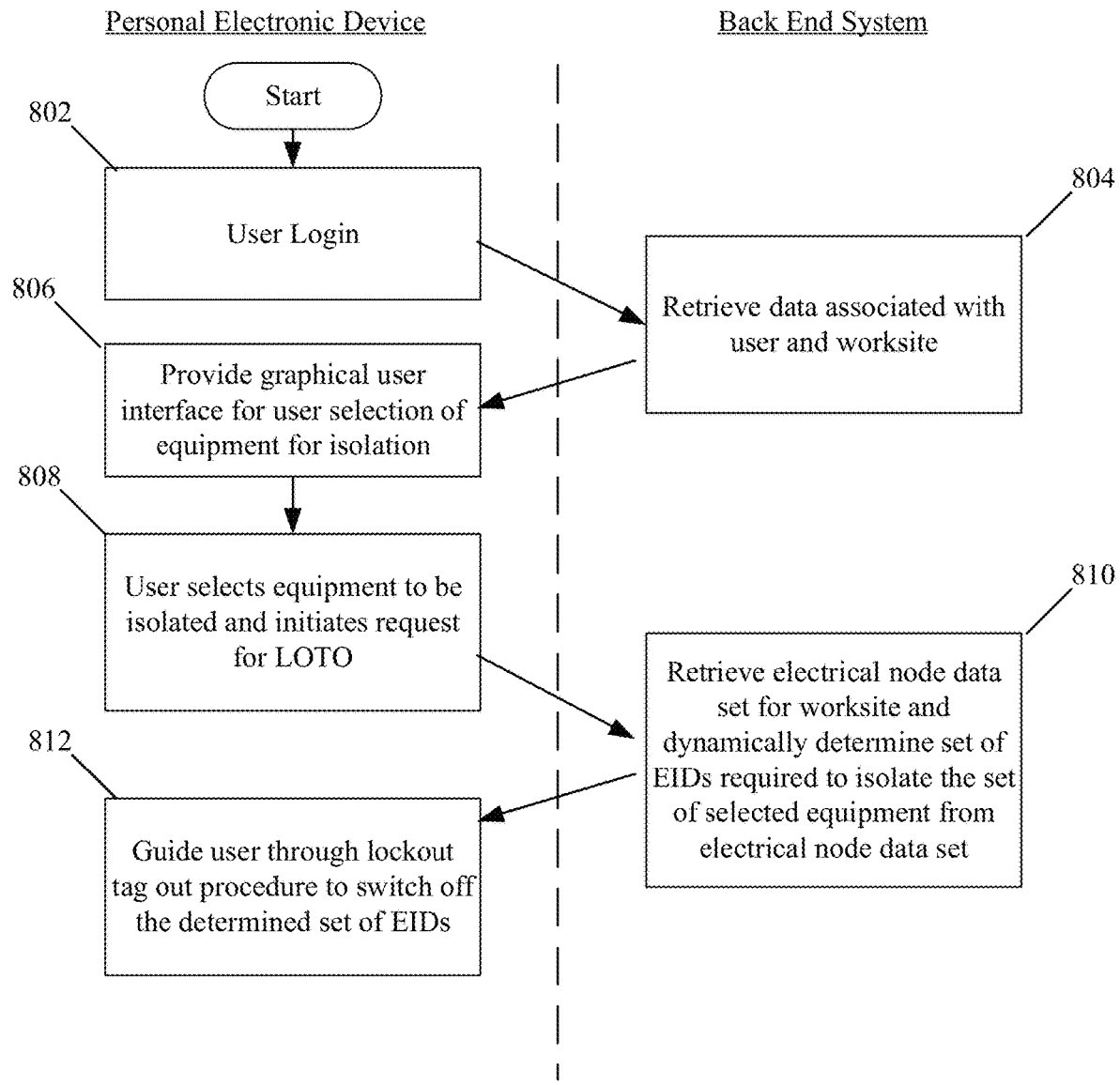
FIG. 8 is a flowchart diagram of an example process for management of LOTO processes by a hazardous energy control system, in accordance with one or more arrangements; the example process illustrating inter-operation and data flow between a personal electronic device and a back-end system.

FIG. 8 shows flow chart of an example process showing high level interaction between personal electronic device 14 and back-end system 104 in requesting and performing LOTO to isolate user-selected equipment, in accordance with one or more arrangements. In this example, the process is started at process block 802 when a user 16 logs in to application 12 on personal electronic device 14. At process block 804, the log in prompts back-end system 104 to retrieve data associated with the user 16 (e.g., from database 150). Such data may include but is not limited to, for example, personal information, a worksite associated with the user 16, electrical node data set 42 for such worksite, permissible tiers 40 of the user 16, flag group memberships, locks 38 assigned to the user 16, voltmeters 108 or other calibrated equipment assigned to the user 16, and/or any other information pertinent to LOTO operations of the user 16 and/or worksite.

In the arrangement shown, as one example, data is provided to personal electronic device 14 to facilitate providing of a graphical user interface (e.g., GUI 140) to the user 16 at process block 806 for the user 16 to select equipment 44 on the worksite for isolation and initiate a request for LOTO.

At process block 808, using the GUI 140, the user 16 selects equipment 44 on the worksite for isolation and initiates a request for LOTO. At block 810, back-end system 104 retrieves the electrical node data set 42 for the worksite containing the selected equipment 44 and dynamically determines from the electrical node data set 42 a set of EIDs 46 required to be disabled in order to isolate the selected set of the equipment 44. The determined set of EIDs 46 are provided to the personal electronic device 14, where GUI 140 of application 12 guides the user 16 through procedures for LOTO of the determined set of EIDs 46.

Figure 9:
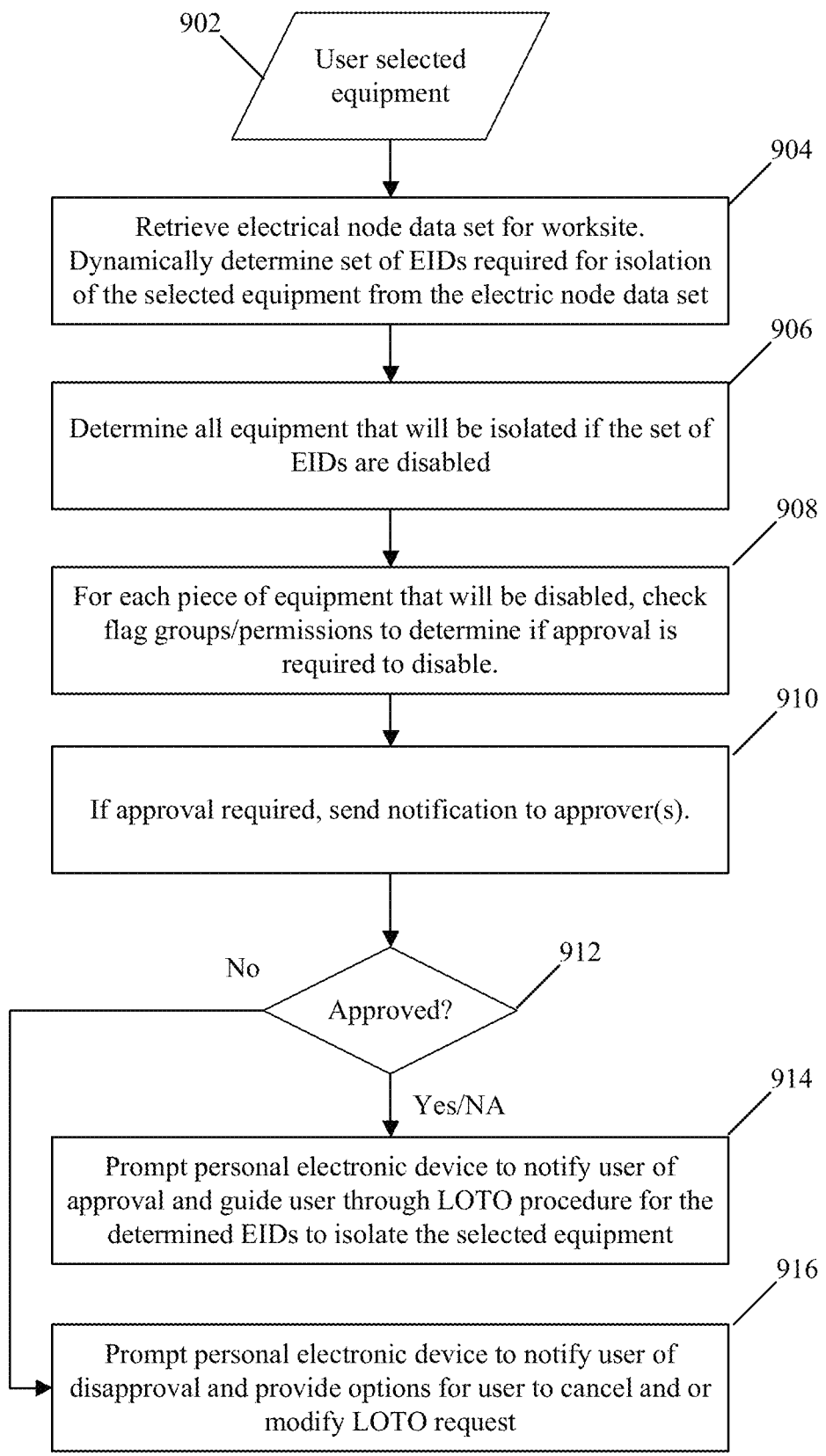
FIG. 9 is a flowchart diagram of an example process perform by a back-end system in management of LOTO processes by a hazardous energy control system, in accordance with one or more arrangements.

FIG. 9 shows an example an example high level process for management of LOTO processes by back-end system 104 in response to request for LOTO to isolate a selected set of equipment 902. In this example, at process block 904 back-end system 104 retrieves the electrical node data set 42 for the worksite containing the selected equipment and dynamically determines from the electrical node data set 42 a set of EIDs 46 required to be disabled in order to isolate the selected set of equipment 902 from hazardous power sources as previously described.

In this example process, back-end system 104 determines if LOTO of the determined set of EIDs 46 will isolate any equipment 44 on the worksite that requires approval (e.g., as specified in a flag group). At process block 906, back-end system 104 determines all equipment 44 on the worksite that will be disabled if the determined set of EIDs 46 are disabled. At process block 908, for each piece of equipment 44 that will be isolated, back-end system 104 checks to determine if approval is required for isolation of the equipment (e.g., based on flag groups and/or user permissions tiers). For instance, in one or more arrangements, the determination if approval is required may involve checking if the piece of equipment in included in any flag groups and if so, checking to see if trigger conditions specified in the flag group to required approval are satisfied. If approval is required, back-end system 104 provides notification to one or more reviewer (e.g., listed in the flag groups) for approval for isolation of the piece of equipment. In one or more arrangements, the back-end system 104 may also provide notification to the user 16 that the requested LOTO is pending approval.

If LOTO of the affected equipment 44 is approved at decision block 912, or if no approval is required, the process proceeds to process block 914, where the personal electronic device 14 is prompted to notify the user 16 requested isolation was approved (if previously notified that approval was pending) and personal electronic device 14 is prompted to guide the user 16 through procedures for LOTO of the determined EID to isolate the user-selected equipment. If isolation of the any affected equipment 44 is disapproved at decision block 912, the process proceeds from decision block 912 to process block 916, where personal electronic device 14 is prompted to notify the user 16 of the disapproval and provide options for the user 16 to either cancel the requested LOTO of modify the requested LOTO to avoid isolation of the equipment for which isolation was not approved.

In one or more arrangements, system 100 may be configured to reassess the electrical node data set 42 to see if a different set of EIDs exists that can isolate the user-selected equipment 902 without isolating the disapproved equipment. For example, in some arrangements, system 100 may located several different alternative LOTO procedures (which may require LOTO of different numbers of EIDs) for a user 16 to select as possible options to proceed. In some arrangements, system 100 may further determine is approval is needed for any of the alternative LOTO procedures and indicate to the user 16 which alternative LOTO procedures would require approval.

Example Guide Through LOTO:

In various different arrangements, system 100 may utilize various different processes to guide a user 16 through procedures for LOTO and verify that steps are properly performed. Furthermore, in various different arrangements, system may utilize multiple types of LOTO operations. For example, in one or more arrangements, system may be configured to facilitate four types of LOTO operations: Individual LOTO, Group LOTO, Subject Matter Expert (SME) LOTO, and Access Control LOTO.

Individual—In this example, an individual LOTO operation is designed to protect ONLY the user 16 and no one else. The system 100 will not allow any other users 16 to join this LOTO. A completed individual LOTO confers a safety and isolation status.

Group—In this example, a Group LOTO operation is designed to protect multiple users 16. This type of LOTO will be visible to any users 16 who need to work on equipment 44 covered by the group LOTO and such users 16 will be given the option by the software to join this group LOTO. A completed group LOTO confers a safety and isolation status.

Subject Matter Expert (SME)—In this example, an SME LOTO operation is designed for high risk or one-off conditions that require input of an authorized human input instead of solely software computation. SME LOTOs are for uncommon situations that may arise during operations, maintenance, testing, construction, and commissioning. It allows the most qualified individuals to establish their own isolation points and LDL testing locations. In one or more arrangements, a Subject Matter Expert Lockout (SME LOTO) can only be performed by someone with SME or Admin permissions level status at the worksite. However, some arrangements may permit SME LOTO to be performed by users 16 with other permissions levels. In some arrangements, SME LOTOs can be toggled to require other user 16 participation. In some arrangements, SME LOTOs can be made "invisible" so only those that know about the SME LOTO can join it. A completed SME LOTO process does not confer a safety status as system 100 is not involved in computing and verifying isolation points.

Access Control—In this example, an access control LOTO operation is not used to safeguard life but is only used to curtail access to equipment 44. For example, also access to some equipment may not present a safety risk, it may be desirable to require certain permissions and/or approval for users 16 to access the equipment.

In one or more arrangements, a user 16 may be provided multiple options for LOTO depending on whether the determined EIDs 56 are part of an existing group LOTO. In practice, determination of EIDs 56 for a LOTO request may presents three possible options for the user 16 to proceed with LOTO:

Option 1: No existing group lockout exists that meets the user's 16 specified needs. In such case the user 16 must complete their own LOTO operation.

Option 2: A group LOTO exists that has already made your selected equipment 44 isolated. In such case, the user 16 may opt to join the selected LOTO operation and complete the required verification test (live-dead-live test) to begin safe work (e.g., by the user completing the verification test themselves or attesting that they witness another user perform the verification test).

Option 3: Two or more active group LOTOs exist that have already made the selected equipment 44 isolated. The user 16 may opt to join the selected LOTO operations and complete the required verification tests to begin safe work.

In one or more arrangements, after determining EIDs, system 100 determines and presents available LOTO options to the user 16 so they may select how to proceed. Based on the selection by the user 16, system 100 then guides the user 16 through LOTO procedures for placement of any additional locks 38 and/or performing any required verification tests. In one or more arrangements, the process performed by the user 16 for LOTO may differ depending on which option is selected.

Example Process for LOTO of Determined EIDs:

Step 1—System 100 prompts the user 16 to select if they are creating a new LOTO or joining an existing group LOTO (if suitable group LOTO is available). If creating a new LOTO, system 100 prompts the user 16 to select which type of LOTO operation the user 16 would like to start. To creates a new individual LOTO the process proceeds as follows.

Step 2—System 100 prompts the user 16 to scan or otherwise identify a lock box (e.g., by scanning a QR code or barcode on the lock box using camera 120 on personal electronic device 14) to assign the lock box to the LOTO operation and enter its storage location.

Step 3—System 100 prompts the user 16 to acknowledge the safety/training notice(s).

Step 4—System 100 prompts the user 16 to review the entire list of EID isolation points that have been selected by system 100 and for placement of locks 38 and select one of the unlocked EIDs as the next location for the LOTO operation.

Step 5—System 100 prompts the user 16 to select the type of lock 38 user 16 will be using during this LOTO operation.

Step 6—System 100 prompts the user 16 to scan or otherwise identify the EID identified as a required isolation point (e.g., by scanning a QR code or barcode on the EID using camera 120 on personal electronic device 14). Should the user 16 scan or otherwise identify the wrong EID, System 100 provides the user 16 with a warning (e.g., a POP UP) telling them that the EID they have scanned/identified is not compatible with their LOTO procedure and will not protect them from hazardous electrical energy. System 100 then prompts the user 16 to re-scan/identify the correct EID and provides the user 16 the location of the EID, its name, the name of the equipment 44, and the barcode identifier of the correct EID again. System 100 will not allow the user 16 to continue this LOTO operation until the user 16 has scanned/identified the correct EID. This ensures compliance and reduces human error in this process.

Step 7—System 100 prompts the user 16 to scan or otherwise identify the lock 38 that the user 16 will place on the EID to physically stop the flow of hazardous electrical energy (e.g., by scanning a QR code or barcode on the lock 38 using camera 120 on personal electronic device 14). In this example, upon scanning/identifying the lock 38, system electronically couples the lock 38 to this EID and records this lock placement for this LOTO on the equipment's 46 activity log, on the EIDs activity log, and on the lock's 38 activity log. If the user 16 has grabbed a lock 38 that is not checked out directly to the user 16, system 100 indicates to user 16 that they cannot use this lock 38 because it is either owned by someone else or it has not been checked out for use by the user 16.

Step 8—Once the lock 38 is scanned/identified, system 100 prompts the user 16 to place the lock 38 on the EID, per procedure, and then take a picture of the hanging lock 38 using camera 120 on personal electronic device 14. System 100 stores this picture is stored as part of the LOTO record.

Step 9—Following the picture, system 100 prompts the user 16 to take the key from the lock 38 and place it into the lockbox.

Steps 4-9 are repeated until all locks 38 have been placed and recorded on all required EIDs 46. In one or more arrangements, after all required locks 38 are placed, system 100 may require the user 16 to perform a key confirmation starting at step 10.

Step 10—System 100 prompts the user 16 to take pictures as one group or smaller groups of the keys from the locks 38 placed on EIDs on the project, with their serial numbers visible in the picture. The pictures and keys are taken inside the lock box. Once all keys have a picture associated with them, the process may proceed with the next step.

Step 11—System 100 prompts the user 16 to scan or otherwise identify a lock 38 to be placed on the lock box to secure it shut. This lock 38 is referred to as the master lock. If the lock 38 scanned/identified is not checked out the user 16 or is owned by another user 16, system 100 will inform the user 16 and instruct him to check out the lock 38 or retrieve another lock 38.

Step 12—Once the master lock is scanned/identified, system 100 prompts the user 16 to lock the lock box and take a picture of the locked lock box. This picture is then associated with the LOTO record.

In this example arrangement, after all required locks 38 are placed, system 100 requires the user 16 to perform Live Dead Live (LDL) tests at computed test locations to ensure selected equipment is properly isolated. An example process for performing LDL tests begins at step 13.

Step 13—System 100 prompts the user 16 to review a listing of all the live computed LDL test locations, and to select one of the untested locations for LDL testing. In this example, the same information is listed here as the lock placements review page. All equipment names, locations, EID names, and the barcode for the specific EIDs are listed.

Step 14—System 100 prompts the user 16 to scan or otherwise identify the EID 46 that the user 16 intends to test (e.g., by scanning a QR code or barcode on the EID 46 using camera 120 on personal electronic device 14). If the user 16 does not scan/identify the correct EID 46, system 100 provides a warning (e.g., a POP UP) telling them that the EID they have scanned/identified is not compatible with their LOTO procedure and will not protect them from hazardous electrical energy. The user 16 will not be able to move forward with this LDL until the correct EID is scanned/identified.

Step 15—Once the correct EID 46 is scanned/identified, system 100 prompts the user 16 to scan or otherwise identify a voltmeter 108 (or other voltage measure device) that the user 16 will use for LDL testing (e.g., by scanning a QR code or barcode on the voltmeter 108 using camera 120 on personal electronic device 14). In one or more arrangements, system is configured to assess the scanned/identified voltmeter 108 to verify that the voltmeter 108 is an appropriate type and/or that calibration of the voltmeter 108 has not expired. An example process for assessment of the voltmeter 108 is provided in steps 15A-15C.

Step 15A—System 100 checks to see that the voltmeter 108 is registered to be used on the worksite. If it is not, system 100 presents a warning (e.g., a pop up) to inform the user 16 the voltmeter 108 is not registered, and they will need to register it or find another measuring device that is registered.

Step 15B—System 100 checks to see if voltmeter 108 is within its calibration window. If it is not, system 100 informs the user 16 that they cannot trust the data from this device and they must use another device until this device has been re-calibrated and updated in system 100.

Step 15C—System 100 checks to ensure that the scanned/identified voltmeter 108 matches the voltage tags on the equipment 44 or EID and thus is a proper type of voltmeter for the LDL test. For example, a medium voltage registered device must be used on medium voltage registered EIDs. A medium voltage device cannot be used for equipment 44 not registered as medium voltage and vice versa for devices rated for less than medium voltage or 1000 Volts.

Step 16—First Live Test—Once the voltmeter 108 has been authenticated, system 100 prompts the user 16 to perform a first measurement at a live voltage location and enter the measure voltage. In this example, the user 16 must input a value of greater than 50 Volts to prove to system 100 that voltage is present and the voltage measuring device is picking up the presence of voltage. In this example, if the user 16 enters a value of less than 50 Volts or greater than 999 Volts, system 100 provides the user 16 an indicator (e.g., orange highlighting of entry) and warning (e.g., pop up) to indicate to the user 16 that they need to find another voltage source or potentially swap out the measuring device if the user 16 believes it is not measuring the correct voltage. In this example, if a value of between 50 Volts and 999 Volts is entered, system 100 provides an indicator (e.g., green highlighting of the entry) to the user 16 that the entry will be accepted.

Step 17—Dead Test—System 100 prompts the user 16 to perform a second measurement at a test location where power should be disabled (e.g., at the EID) and enter the measure voltage. In this example, system 100 will accept any value entered less than 1 Volt as passing provides an indicator (e.g., green highlighting of the entry) to the user 16 that the entry will be accepted. In this example, if a value of 1 Volt or greater, system 100 will not accept the entry and provides a warning (e.g., a pop up) to the user 16 to indicate that the entry is not accepted and provides a procedure for safely exiting this unsafe situation and provides a project configurable list of the people to contact. The example process will not allow user 16 to move forward until a voltage less than 1 Volt is entered.

Step 18—Second Live Test—System 100 prompts the user 16 to perform a second measurement at a known live location to ensure that the voltmeter 108 is still functioning properly. Similar to step 16, the user 16 must input a value of greater than 50 Volts to prove to system 100 that voltage is present and the voltage measuring device is picking up the presence of voltage. In this example, if the user 16 enters a value of less than 50 Volts or greater than 999 Volts, system 100 provides the user 16 an indicator (e.g., orange highlighting of entry) and warning (e.g., pop up) to indicate to the user 16 that they need to find another voltage source or potentially swap out the measuring device if the user 16 believes it is not measuring the correct voltage. In this example, if a value of between 50 Volts and 999 Volts is entered, system 100 provides an indicator (e.g. green highlighting of the entry) to the user 16 that the entry will be accepted.

Once all entries have been accepted at steps 16-18, the user 16 may continue with more LDL locations following the exact same steps from 13-18, or if they have completed all LDL operations, the LOTO will be complete and their unique LOTO operations identifier will show up on the screen in a green and let the user 16 know this LOTO is now complete and active.

Although some example LOTO process may be described with reference to scanning of locks 38, lock boxes, equipment 44, EIDs 46, voltmeters 108, and/or other components, the embodiments are not so limited. Rather, it is contemplated that various arrangements may be adapted to utilize any means or method for a user to locks 38, lock boxes, equipment 44, EIDs 46, voltmeters 108, and/or other components. For example, in one or more arrangements, graphical user interface 140 of system 100 may be configured to permit the user 16 to manually enter an identifier (e.g., an equipment name or serial number on a tag of the locks 38, lock boxes, equipment 44, EIDs 46, voltmeters 108, and/or other components) to confirm the user 16 is at, testing, or using the correct device and/or location. As another example, in one or more arrangements, a user may utilize a search interface to locate and identify a particular to confirm the user 16 is at, testing, or using the correct device and/or location. As another example, in one or more arrangements, a user may browse through an index, or hierarchical listing, or other arrangement to locate and identify a particular to confirm the user 16 is at, testing, or using the correct device and/or location.

Example Group LOTO Process:

In one or more arrangements, the process for Group LOTO is similar to the above process for individual LOTO with the following revisions:

Modified step 1—If a user 16 selects pieces of equipment 44 that are on the isolated or protected list of an active group LOTO, the user 16 will be given a separate review page notifying them that an active group LOTO already exists and prompts them to join the existing active group LOTO. This page lets the user 16 virtually review the active group LOTO and provides the following information: the unique LOTO identifier, the name of the LOTO creator/Owner, the time stamps associated with this LOTO, all locks 38 placed for this LOTO, including their pictures, locations and time stamps, all LDL information for this LOTO, and a list of all active users 16 that are currently locked out on this group LOTO already.

Modified steps 2-12.—If the user elected to join the group LOTO, in lieu of steps 2-2 the user 16 is prompted to scan or otherwise identify the lock box associated with the correct active group LOTO at step 2. Should they scan/identify the wrong lock box, system 100 notify the user 16 (e.g., via a pop up) to tell the user 16 they scanned/identified the incorrect lock box and give them the lockbox number they are looking for. The software will not allow them to continue until they have selected the correct lock box. Once the correct lock box has been identified, the user 16 will be asked to scan or otherwise identify their lock 38 that they will place on the lock box. If the user 16 owns this lock 38 and it is correctly checked out to them, they will successfully scan/identify and lock the lock 38 on the lock box. User 16 is then prompted to take a picture of their lock 38 on the lock box.

Modified steps 13-18—Following modified steps 2-12, in this example LDL sequence, the user 16 is presented two options for LDL testing: 1) they can perform LDL testing as indicated in steps 13-18 or 2) they may perform "witnessed LDL" testing in lieu of steps 13-18. If witnessed LDL is selected, system 100 requires user 16 to acknowledge that they witnessed an individual perform LDL testing on the equipment. For example, in one or more arrangements, the user 16 is provided a list of the individuals that have recorded actual LDL data for this active live group LOTO. The user 16 will select the individual from this list and acknowledge a prompt that says they did actually witness this test in person. Once selected, their LOTO operation will be completed, and a green screen will tell them unique LOTO identifier has been created and their equipment 44 specified for the LOTO is safe to begin work.

Example Access Control Lockout:

In one or more arrangements, access control lockouts may be created by anyone with supervisor permissions level status of higher at the worksite and is used to control access to a specific piece of equipment 44 for non-maintenance related reasons. However, some arrangement may permit placement of access control locks with other permissions levels. These access control locks will not be placed on electrical components themselves but rather on the closest physical access point. In this example, an access control lockout may be created in the same manner as a group lockout Example SME LOTO Process:

SME LOTO follows a very similar process in steps 1-18 but EIDs are specified by the user 16 instead of being dynamically computed by system 100. That is instead of selecting which pieces of equipment 44 the user 16 wants to completely isolate, the user 16 selects the pieces of equipment 44 that they are going to dictate to system 100 where they will be placing locks. For instance, rather than the user 16 selecting the EID for placement of lock at step 5 from the computed list presented at step 4, the user 16 may scan/identify an EID of their choosing at step 6. In this example, system 100 then checks this equipment list against each EID scanned/identified by the user 16 to ensure that EID is associated with a piece of equipment 44 in this list. In this way it ensures that the user 16 is still placing their locks in the correct positions on the correct pieces of equipment 44. The LOTO process then proceed in the same manner as indicated in steps 7-18.

In one or more arrangements, one an SME LOTO is completed, the user 16 has the ability to be toggled from visible to invisible. An invisible SME LOTO will not notify other users 16 of its active status in system 100 and will not show up as an option to join this LOTO. A visible SME LOTO will require users 16 to join the LOTO if they select a piece of equipment 44 that triggers the protection logic of system 100 based on the SME LOTOs purpose and protection requirements. These protection requirements for joining are based off the LDL equipment list specified by the LOTO creator.

It should be understood that the embodiments are not limited to the example LOTO processes provided herein. Rather, it is contemplated that in one or more arrangements system 100 may utilize various alternative LOTO processes with various steps added, modified, and/or omitted.

From the above discussion and accompanying figures and claims it will be appreciated that the disclosed systems offer many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A hazardous energy control system, comprising:
   a back-end system;
   the back-end system having a memory;
   wherein the back-end system is configured to store in the memory data indicating a set of equipment at a worksite;
   a personal electronic device communicatively connected to the back-end system;
   wherein the personal electronic device is configured to provide a user interface for a user to select a first subset of equipment, from a set of equipment at the worksite, for electrical isolation from hazardous energy sources via lockout/tagout (LOTO);
   wherein in response to receiving a request for LOTO of the first subset of equipment, the back-end system is configured to determine a LOTO procedure for electrical isolation of the first subset of equipment from the hazardous energy sources;
   wherein the back-end system is configured to store in the memory data indicating a second subset of equipment of the set of equipment that require approval before being isolated;
   the data file indicating one or more reviewers authorized to give the approval;
   wherein the back-end system is configured to determine all of the pieces of equipment that will be isolated by the LOTO procedure; and
   notify the one or more reviewers that approval is required in response to determining one or more of the second subset of equipment will be isolated by the LOTO procedure.

2. The system of claim 1, wherein the back-end system is further configured to communicate the LOTO procedure to the personal electronic device in response to at least one of the one or more reviewers approving isolation of the second subset of equipment.

3. The system of claim 1, wherein the back-end system is further configured to cause the personal electronic device to guide the user through LOTO of the set of equipment using the determined LOTO procedure.

4. The system of claim 1, wherein the user interface provided by the personal electronic device is a web-based application hosted by the back-end system.

5. The system of claim 1, wherein the user interface provided by the personal electronic device is a local application downloaded from the back-end system.

6. The system of claim 1, wherein the back-end system is configured to dynamically determine the LOTO procedure from an electrical node data set indicating the set of equipment at the worksite, a set of electrical isolation devices (EIDs) at the worksite, and electrical connections between the set of equipment and the set of EIDs.

7. The system of claim 1, wherein the back-end system is further configured to cause the personal electronic device to guide the user through LOTO of the set of equipment using the determined LOTO procedure;
   wherein in guiding the user through LOTO of the set of equipment, the personal electronic device requires the user to measure voltage of at least one location to verify that the set of equipment is electrically isolated from the hazardous energy sources;
   wherein the measuring of the voltage includes performing a live-dead-live test using a voltmeter;
   wherein the personal electronic device is configured to verify that the voltmeter is the correct type of voltmeter for the at least one location;

wherein the personal electronic device is configured to verify that the voltmeter is within its calibration window.

8. The system of claim 1, wherein the back-end system is configured to optimize the LOTO procedure to minimize a number of locks that will need to be placed on electrical isolation devices at the worksite.

9. The system of claim 1, wherein the back-end system is configured to optimize the LOTO procedure to minimize electrical isolation of pieces of equipment that are not included in the first subset of equipment.

10. The system of claim 1, wherein the back-end system is configured to optimize the LOTO procedure to avoid electrical isolation of the pieces of the set of equipment that are identified as critical equipment in the memory of the back-end system.

11. A hazardous energy control system, comprising:
a back-end system;
a personal electronic device communicatively connected to the back-end system;
wherein the personal electronic device is configured to provide a user interface for a user to select a first subset of equipment, from a set of pieces of equipment at a worksite, for electrical isolation from hazardous energy sources via lockout/tagout (LOTO);
wherein in response to the user selecting the first subset of equipment, the personal electronic device is configured to communicate the first subset of equipment to the back-end system;
wherein in response to receiving a request for LOTO of the first subset of equipment, the back-end system is configured to determine a LOTO procedure for electrical isolation of the first subset of equipment from the hazardous energy sources;
determine a second subset of equipment of the set of equipment that will be disabled by the LOTO procedure;
evaluate permissions data for the set of equipment to determine if approval is required before isolating one or more of the second subset of equipment;
in response to determining approval is not required, communicating data indicative of the determined LOTO procedure to the personal electronic device;
in response to determining approval is required for one or more of the second subset of equipment, communicating an approval request to an approver;
in response to the approver approving the approval request, communicating data indicative of the determined LOTO procedure to the personal electronic device.

12. The system of claim 11, wherein the back-end system is further configured to cause the personal electronic device to guide the user through LOTO of the set of equipment using the determined LOTO procedure.

13. The system of claim 11, wherein the user interface provided by the personal electronic device is a web-based application hosted by the back-end system.

14. The system of claim 11, wherein the user interface provided by the personal electronic device is a local application downloaded from the back-end system.

15. The system of claim 11, wherein the back-end system is configured to dynamically determine the LOTO procedure from an electrical node data set indicating the set of equipment at the worksite, a set of electrical isolation devices (EIDs) at the worksite, and electrical connections between the set of equipment and the set of EIDs.

16. The system of claim 11, wherein the back-end system is configured to optimize the LOTO procedure to minimize a number of locks that will need to be placed on electrical isolation devices at the worksite.

17. The system of claim 11, wherein the back-end system is configured to optimize the LOTO procedure to minimize electrical isolation of the pieces of the equipment that are not included in the first subset of equipment.

18. The system of claim 11, wherein the back-end system is configured to optimize the LOTO procedure to avoid electrical isolation of pieces of the set of equipment that are identified as critical equipment in the memory of the back-end system.

19. A hazardous energy control system, comprising:
a data processing system;
the data processing system having a memory;
wherein the data processing system is configured to store in the memory data indicating a set of equipment at a worksite;
wherein in response to receiving the request for LOTO of the first subset of equipment, the data processing system is configured to determine a LOTO procedure for electrical isolation of the first subset of equipment from the hazardous energy sources;
wherein the data processing system is configured to store in the memory data indicating a second subset of equipment of the set of equipment that require approval before being isolated;
the data file indicating one or more reviewers authorized to give the approval;
wherein the data processing system is configured to determine all of the pieces of equipment that will be isolated by the LOTO procedure; and
notify the one or more reviewers that approval is required in response to determining one or more of the second subset of equipment will be isolated by the LOTO procedure.

20. The system of claim 19, wherein the data processing system is configured to receive the request from a personal electronic device operated by a worker at the worksite;
wherein the data processing system is configured to cause the personal electronic device to guide the worker through a procedure for LOTO of the set of equipment.

* * * * *